United States Patent [19]
Atherton

[11] Patent Number: 5,461,239
[45] Date of Patent: Oct. 24, 1995

[54] METHOD AND APPARATUS FOR CODING AND READING INFORMATION IN DIFFRACTION GRATINGS USING THE DIVERGENCE OF DIFFRACTED LIGHT BEAMS

[75] Inventor: Peter S. Atherton, Turramurra, Australia

[73] Assignee: Mikoh Pty Ltd, Wahroonga, Australia

[21] Appl. No.: 157,107

[22] Filed: Dec. 3, 1993

[30] Foreign Application Priority Data

| Jun. 5, 1991 | [AU] | Australia | PK6482 |
| Jun. 18, 1991 | [AU] | Australia | PK6723 |
| Jul. 17, 1991 | [AU] | Australia | PK7232 |
| Jul. 17, 1991 | [AU] | Australia | PK7233 |
| Sep. 3, 1991 | [AU] | Australia | PK8105 |
| Nov. 26, 1991 | [AU] | Australia | PK9673 |
| Dec. 17, 1991 | [AU] | Australia | PL0042 |

[51] Int. Cl.⁶ ..................................................... G06K 7/10
[52] U.S. Cl. ........................................... 250/566; 235/494
[58] Field of Search .................................. 250/271, 550, 250/555, 556, 557, 566, 568, 569; 235/494

[56] References Cited

U.S. PATENT DOCUMENTS

| 4,023,010 | 5/1977 | Horst et al. | 235/61.11 E |
| 4,034,211 | 7/1977 | Horst et al. | 235/61.12 N |
| 4,072,098 | 2/1978 | Granzow et al. | 101/32 |
| 4,204,638 | 5/1980 | Laude | 235/454 |
| 4,537,504 | 8/1985 | Baltes et al. | 356/71 |
| 4,641,017 | 2/1987 | Lopata | 235/457 |
| 5,162,929 | 11/1992 | Roddy et al. | 359/17 |
| 5,237,164 | 8/1993 | Takada | 235/487 |

FOREIGN PATENT DOCUMENTS

| 0145473A2 | 6/1985 | European Pat. Off. | B42D 15/02 |
| 0375833A1 | 4/1990 | European Pat. Off. | B42D 15/02 |
| 0360969A1 | 4/1990 | European Pat. Off. | G06K 19/08 |
| 0366858A1 | 5/1990 | European Pat. Off. | G06K 19/08 |
| 0439092A2 | 7/1992 | European Pat. Off. | B42D 15/02 |
| 2193591 | 10/1988 | United Kingdom | B42D 15/02 |

*Primary Examiner*—Edward P. Westin
*Assistant Examiner*—Steven L. Nichols
*Attorney, Agent, or Firm*—Fitch, Even, Tabin & Flannery

[57] ABSTRACT

An optical memory diffraction grating having a plurality of spaced ridges each having a plurality of optically reflective facets. When illuminated with an incident light beam the grating produces a number of diffracted beams corresponding to the number of facets. The diffracted beams can be machine read by a reading device which produces a reading light beam directed at the grating. The reading device has a plurality of detectors positioned to be illuminated by the diffracted light beams. Information can be stored in the optical memory by locally changing the optical properties of the grating. The grating may be employed in security cards and documents. The grating may be arranged as a bar code or as a pixelgram. Reading, writing and erasing devices are also claimed.

3 Claims, 26 Drawing Sheets

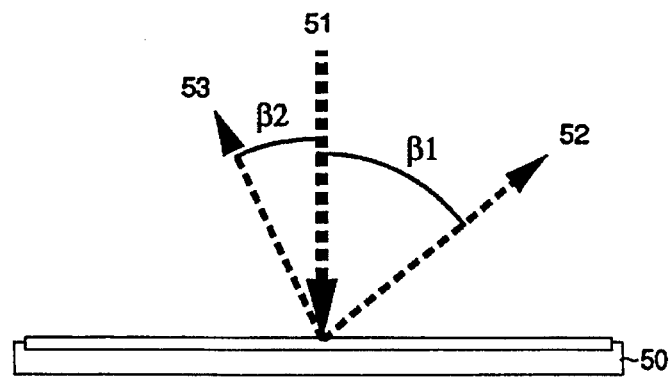
F I G. 5
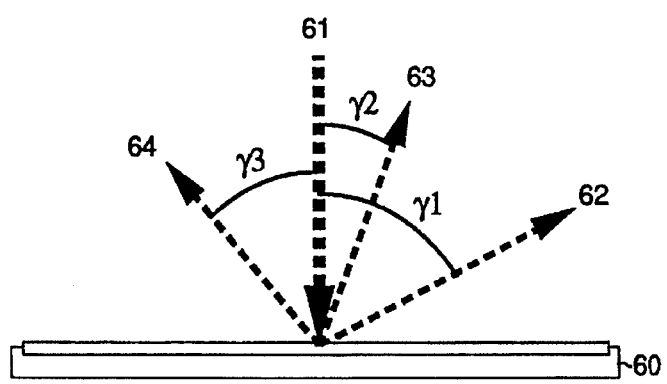
F I G. 6
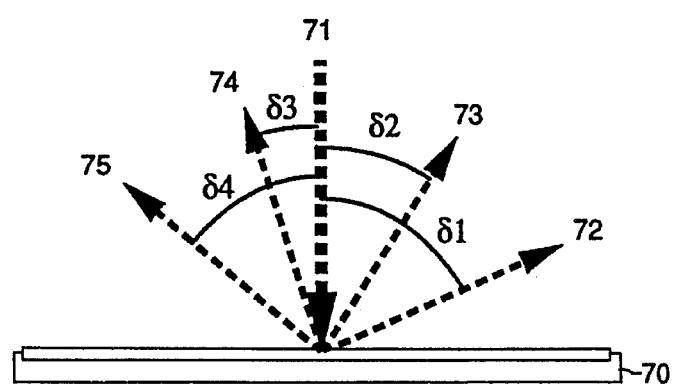
F I G. 7

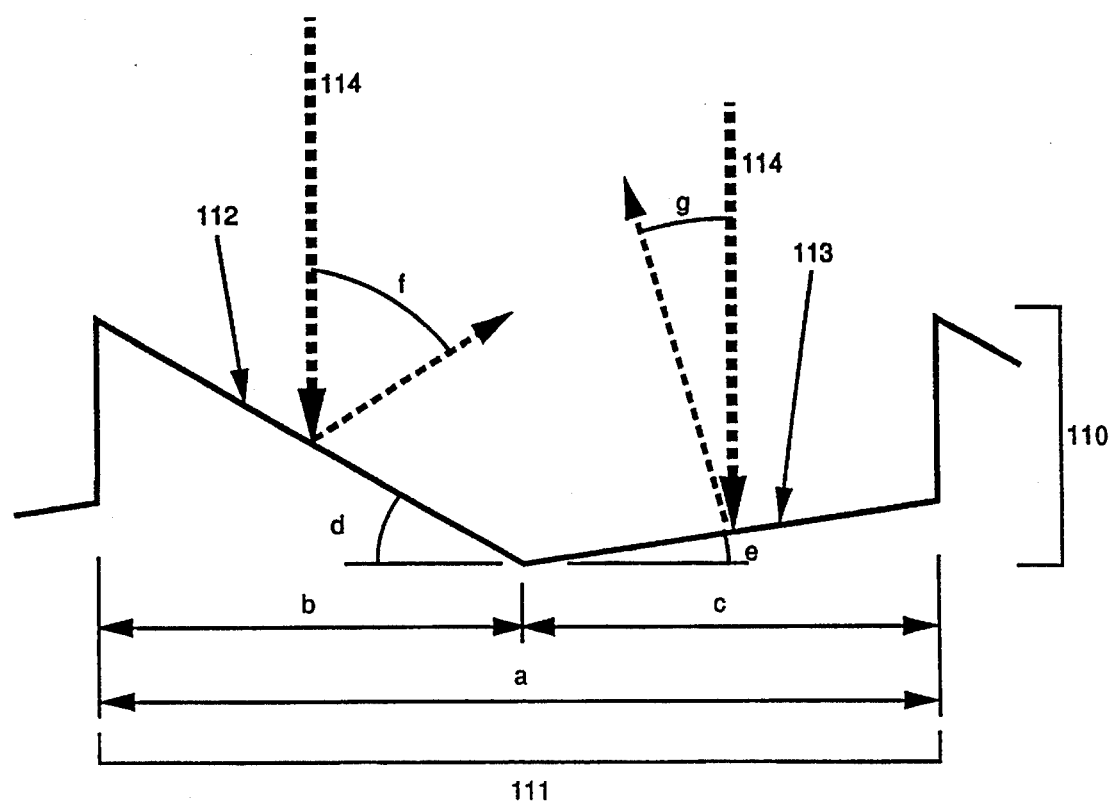
FIG.II(a)
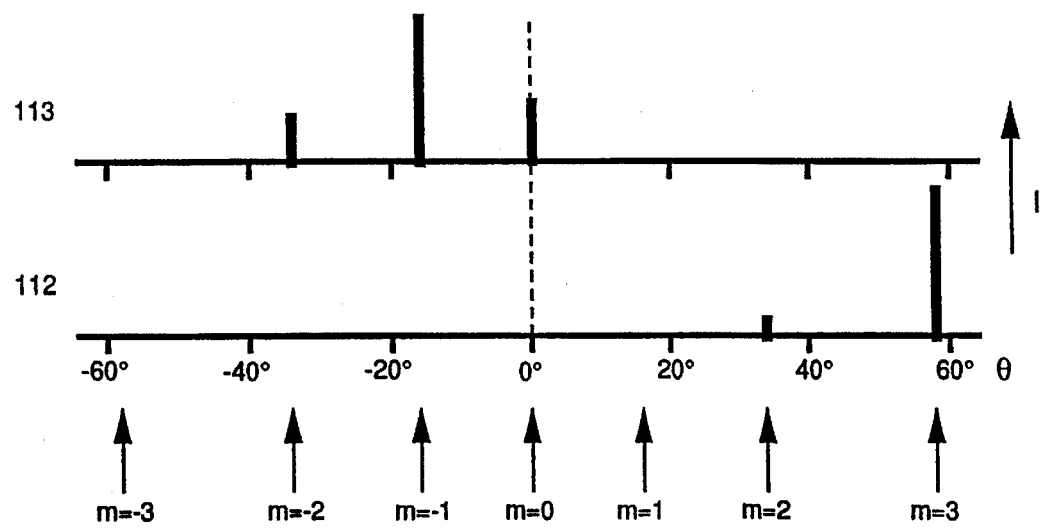
FIG.II(b)

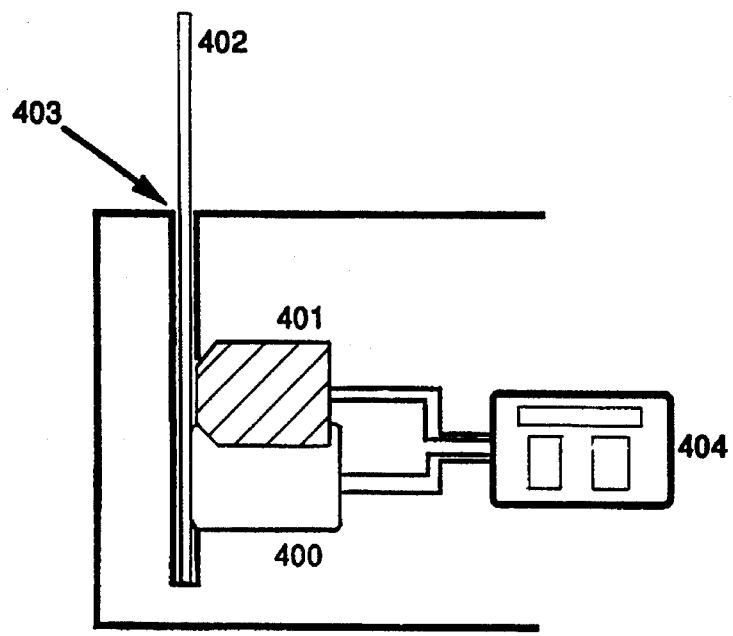
F I G. 40
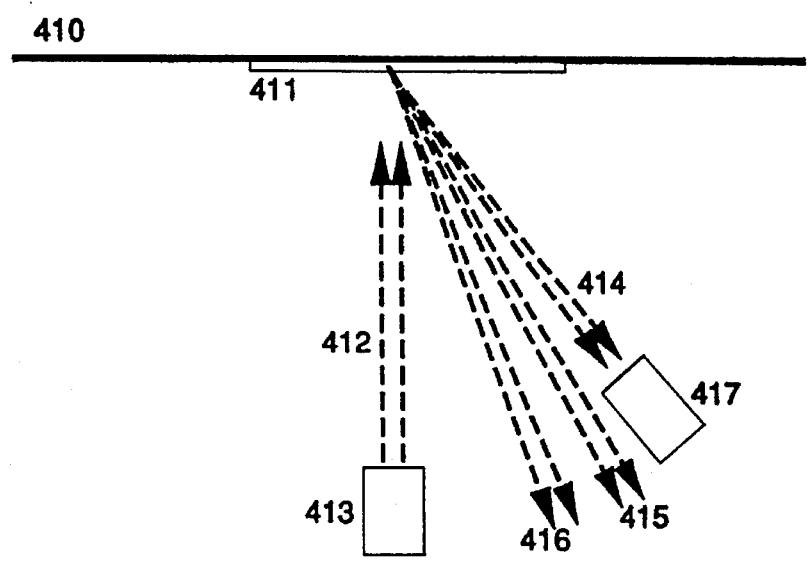
F I G. 41

METHOD AND APPARATUS FOR CODING AND READING INFORMATION IN DIFFRACTION GRATINGS USING THE DIVERGENCE OF DIFFRACTED LIGHT BEAMS

TECHNICAL FIELD

The present invention relates to optical memory technology, and applications thereof to bar codes, data storage cards, such as credit cards and security cards, and methods for the manufacture, reading and modification of the information contained on the cards, or other items such as bank notes, cheques and currency notes.

BACKGROUND OF THE INVENTION

Credit card fraud is now becoming a substantial problem due to the ease with which magnetic stripe memories can be modified and copied. This problem also exists in the field of security cards and prepaid card systems.

Methods have been proposed to overcome the above problems employing holographic patterns and kinegrams.

For example a known kinegram card contains a computer generated holographic pattern extending along one or more tracks across the card. The pattern resembles a conventional hologram but is much brighter and can be made to display a greater degree of movement when viewed at different angles. When the card is used, for example when making a telephone call, it is inserted in a reader slot and the available balance is displayed. After connection, the equipment automatically emits metering pulses. The pulses sequentially decrement the card by destroying each bit by thermal energy. The hologram is read by directing at the pattern light, which is reflected. The angle of reflection is in a direction determined by the hologram. A detector is positioned to be activated by the reflected light.

Swiss Patent 622896 (Application No 2995/78) describes the use of a hologram, in which the reflected light includes a first reflected beam detected by a first sensor, while a second sensor detects scattered light reflected in a second direction. More particularly, the light reflected in the second direction includes a narrow beam and a diverging beam. The narrow beam is blocked so that only the diverging beam is delivered to the second sensor.

Australian Patent Application 19576/83 describes the use of kinegrams for visual verification of the authenticity of the article carrying the kinegram. The kinegram provides diffractive images which move in a predetermined manner with a change in relative orientation. There is no consideration of nor is this particular arrangement adapted to be machine readable.

Similarly Australian Patent Application 44674/85 describes the use of diffractive patterns and the use regarding visual security elements. Similarly Australian Applications 30841/89 and 53729/90 describe techniques for producing visual security images.

European Patent Application 81110234.2 (Publication No 0 060 937) describes the use of optical marks on numerical rollers of a counter mechanism. The optical marks can be a reflective hologram or a refractive grid. A reading beam is directed at each mark and a single beam reflected. Each mark directs the reflected beam at a different angle, with a plurality of detectors being arranged to be illuminated by the appropriate beam.

Swiss Patent Application No 16084/76 (Patent 604279) describes the use of discrete optical marks (which may consist of a diffractive grating or a hologram) which are erased to record information. There is little discussion of reading techniques and the properties of the optical marks.

European Patent Publication 0 015 307 (European Application 79104004.1) describes the use of a stored value card. The card has a series of optical marks arranged in discrete units. The marks are sequentially erased in order to decrease the value of the card.

Swiss Patent 638632 (Application No 929/79) also describes the use of optical marks on a card. The marks are arranged in a predetermined order and are used for identification purposes.

Swiss Patent Application 6836/81 shows the use of optical marks for the purposes of determining the authenticity of a document. The reading beam changes in wavelength which alters the direction of the refracted beam. A detector is then used to determine this change in direction as a means of determining the authenticity of the document.

European Patent Publication 0 051 271 (European Application No 81109503.3) describes the use of optical markings to produce two refracted narrow light beams. Measurement of the intensity of the light beams is used to verify the authenticity of the document.

European Publication No 0 366 585 (Application No 89108121.8) discloses the use of diffraction gratings arranged in a bar code. However the bars are applied to the carrier in a predetermined order in order to record information.

The above discussed optical diffraction techniques still lend themselves to unauthorised use particularly unauthorised reproduction of the holograms, and/or are not suitable for normal commercial use.

A stored value system is one in which the user purchases a memory device which represents usage of some service or facility up to a certain value. A good example can be found in many telephone systems, where users can purchase a stored value card which allows usage of the telephone system up to a specified value.

A stored value system depends on being able to sell to the user a memory device which can be altered to reflect usage of the system. This memory usually comes in the form of a card, a good example being a telephone card. The requirements on this stored value card are that it should be inexpensive; it must contain a write-once stored value memory so that once the value of the card has been decremented, the decrement is permanent; it should resist copying or fraudulent production; and preferably it should be capable of retaining a large number of the units of value for the system, so that the user does not have to replace the card too frequently.

These requirements together place restrictions on the technologies which can be applied to stored value memories. In general the stored value memories currently in use do not meet all of these requirements. For example, optical memories are used in stored value telephone cards in some countries, but these are generally limited to a relatively small number (several hundred or so) of stored value units, making them unsuitable for a number of other potential applications.

OBJECT OF THE INVENTION

It is the object of the present invention to overcome or substantially ameliorate the above disadvantages.

SUMMARY OF THE INVENTION

There is disclosed herein an optical memory diffraction area comprising:

an optical memory medium;

a diffraction grating applied to said medium to diffract a reading light beam to simultaneously produce at least two diffracted light beams; and wherein said grating is adapted so that said diffracted light beams are only pencil beams and extend from said medium at different predetermined angles, determined by diffraction characteristics of the grating and the angle and wavelength of the reading light beam.

There is also disclosed herein a method of recording information using an optical memory diffraction area, said method including the steps of:

providing an optical memory medium;

applying to said medium a diffraction grating to diffract a reading light beam to produce at least one diffracted light beam having a predetermined configuration and/or angle; and altering optical properties of portions of said grating, at spaced locations so that the spaced portions do not provide said beam when illuminated by the reading beam.

There is further disclosed herein an optical reading device to simultaneously read at least two diffracted pencil beams, said device comprising:

means to engage a medium having a diffraction grating so that the device is located at a predetermined position relative to the medium;

a light source positioned so as to be directed in use at said medium, said source when activated providing a reading beam; and a plurality of optical detectors positioned relative to said source to simultaneously detect a plurality of pencil light beams diffracted from the medium at predetermined angles to intersect with the detectors.

There is still further disclosed herein an optical reading device to read a diffraction bar code, said device comprising:

means to engage a medium having a diffraction grating providing a bar code strip, so that the device is located at a predetermined position relative to the medium;

a light source positioned to direct a reading light beam, in use, at said medium;

at least one optical sensor to be activated by a diffracted light beam produced by the reading light beam and the grating; and wherein said means to engage said medium provides for relative movement between the device and the medium so that the device passes along the bar code to activate the optical sensor to produce a sequence of electrical signals indicative of information contained in the bar code.

There is yet further disclosed herein a device to record information in a medium having a diffractive grating arranged to provide a diffraction bar code optical memory, said device comprising:

means to support the medium in the device;

deformation means adapted to induce a change in an optical property of the medium;

motor means to provide relative movement between the medium and deformation means in the direction of extension of the bar code; and control means to co-ordinate the motor means and deformation means so that transverse, longitudinally spaced portions of the medium will have said change induced.

There is also disclosed herein an optical memory area comprising:

a diffraction layer providing a means to diffract into an optical sensor all or part of an incident light beam of a particular wavelength or range of wavelengths;

a photosensitive layer overlaying said diffraction layer adapted to become opaque upon exposure to a wavelength different to said specific wavelength or range of wavelengths, thereby becoming opaque to light at said specified wavelength or range of wavelengths to inhibit the diffraction of light at said specified wavelength or wavelengths.

There is also disclosed herein an erase device for an optical memory area, said area including a photosensitive layer, to be selectively changed from transmissive to opaque by the device, overlaying a diffractive grating, said device comprising:

a reading assembly having a laser to be directed at said area, and a sensor positioned to be activated by a diffracted beam;

an erasing laser to be directed at said area and adapted to change at least a portion of said layer to opaque;

means to cause relative movement between the strip and the lasers; and control means to co-ordinate the lasers and means to cause relative movement, said reading laser providing a signal for the control means so that said control means can activate the erasing laser and position the area via said means to cause relative movement, so that a portion of said layer is changed to opaque.

There is still further disclosed herein an optical reading device to read a diffracted light beam, said device comprising:

means to engage a medium, having a diffraction grating providing an optical memory diffraction area, so that the device is located at a predetermined position relative to the medium;

a light source positioned so as to direct in use at said medium a focused reading light beam; and at least one optical sensor to be activated by a diverging diffracted light beam produced by the reading light beam and the grating, said sensor including at least two spaced detectors to provide signals indicative of the divergence of a diffracted beam illuminating the sensor.

BRIEF DESCRIPTION OF THE DRAWINGS

Preferred forms of the present invention will now be described by way of example with reference to the accompanying drawings wherein:

FIG. 5 is a schematic illustration of a first preferred embodiment of a multiple beam grating illustrating the diffractive properties of said first preferred embodiment;

FIG. 6 is a schematic illustration of a second preferred embodiment of a multiple beam grating illustrating the diffractive properties of said second preferred embodiment;

FIG. 7 is a schematic illustration of a third preferred embodiment of a multiple beam grating illustrating the diffractive properties of said third preferred embodiment;

FIGS. 11(a), 11(b) and 11(c) are schematic illustrations of a further example of a specific reflective double blazed grating design and the diffractive properties of said double blazed grating;

FIG. 26(a), is a schematic illustration of the stamping process utilised in recording non-diffractive strips of a diffraction bar code while

FIG. 36(a) is a schematic illustration of an optical read/erase head for use in a stored value or diffraction bar code read/erase device such as that illustrated in FIG. 35, while

FIG. 40 is a schematic illustration of a device for reading a hybrid card of the type illustrated in FIG. 39; and FIG. 41 is a schematic illustration of a technique for avoiding the successful colour photocopying of diffractive surfaces.

DETAILED DESCRIPTION OF THE PREFERRED EMBODIMENTS

The following describes a new optical memory technology known as diffraction bar code technology. Diffraction bar codes utilise diffractive surface structures with specialised properties which make such structures difficult to copy, forge or imitate. Such diffractive structures have numerous security related applications in addition to the diffraction bar code application. Hence further applications of the diffractive surfaces used in diffraction bar codes are also described below. These further applications include the above-described stored value systems.

The diffraction bar code technique can be used as the basis for a read-only optical memory or a write-once optical memory. A read-only memory is one which cannot be modified in any way after initial data recording, while additional data can be added to a write-once memory without modification to previously recorded data.

It should be appreciated that diffraction bar codes could be implemented in a number of different ways. Two specific implementations are referred to herein. The first involves incorporating diffraction bar codes into data cards, while the second involves using diffraction bar codes as labels attached to documents or other objects to allow authentication and identification, and/or to provide information. The principles and techniques described below apply both to data cards containing diffraction bar codes and to diffraction bar code labels, and descriptions couched in terms of one implementation are applicable also to the other implementations.

Note that for simplicity in this statement an opaque material is defined as a material which prevents a significant proportion of an incident light beam, either at some specified wavelengths or at all wavelengths, from passing through it, but does not necessarily provide a complete block to an incident light beam.

Figure 1A:
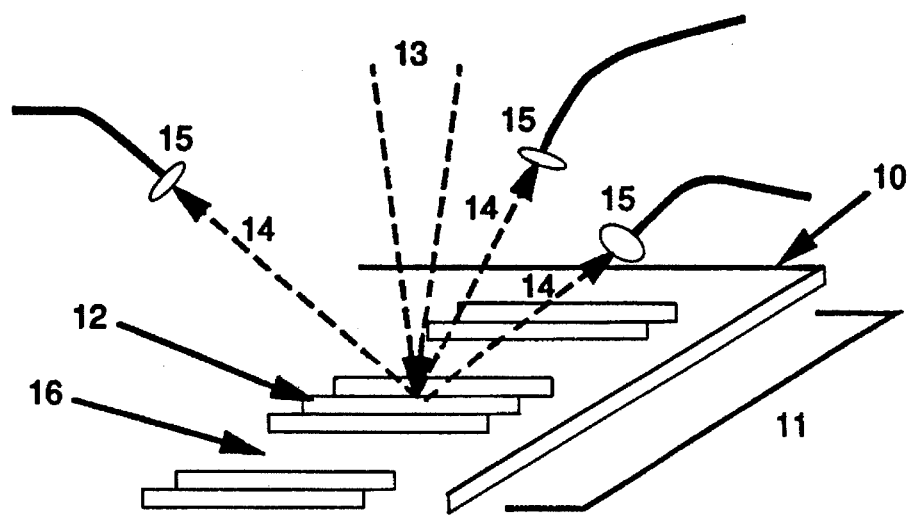
FIGS. 1(a) and 1(b) are schematic illustrations of reflective and transmissive diffraction bar codes respectively.
Figure 1B:
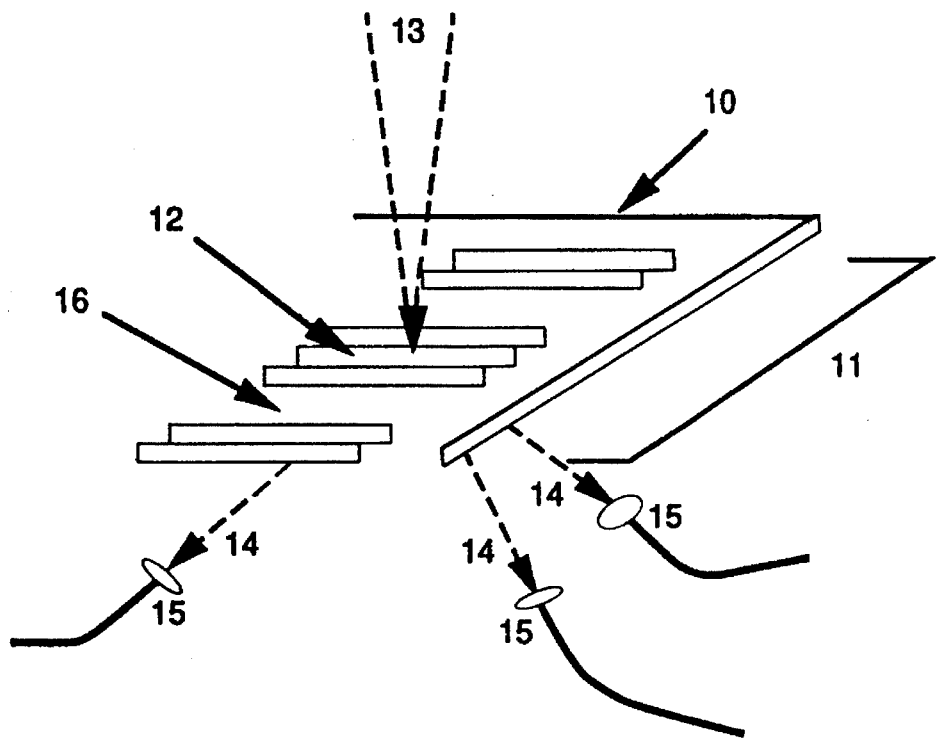

The general principle behind diffraction bar codes is illustrated in FIG. 1, which is a schematic illustration of a data card or document 10 containing a diffraction bar code 11. FIG. 1(a) illustrates a reflective diffraction bar code, while FIG. 1 (b) illustrates a transmissive diffraction bar code. The diffraction bar code 11 is made up of a number of parallel optically diffractive strips 12, each of which is capable of diffracting all or part of an appropriate incident light beam 13 into a number of separate, well defined diffracted beams 14 which can be separately detected by one or more optical detectors 15, thereby resulting in electrical signals produced by the optical detectors 15 indicative of the presence of the diffractive strip. The non-diffractive strips 16 which also make up the bar code 11 do not result in alight signal reaching the optical detectors 15 and therefore do not produce electrical outputs from the detectors 15. The diffractive and non-diffractive strips form a sequence representing the information retained in the diffraction bar code 11. In FIG. 1(a) the diffraction process is of the reflective type, while in FIG. 1(b) the diffraction process is of the transmissive type. The diffractive structures in the diffractive strips 12 making up the diffraction bar code 11 should be designed to produce well defined diffracted beams, which beams may be either narrow pencil-like beams or diverging beams, in specified directions depending on the wavelength and orientation of the incident light beam 13.

To produce a high level of data security, the diffraction gratings utilised in diffraction bar codes or related technologies should be difficult to copy or forge or produce fraudulently by any means. Furthermore, in order to achieve high security the diffracted beam patterns produced by such diffraction gratings should be difficult or impossible to imitate using standard well known diffraction grating structures. To achieve this, it may be necessary to utilise sophisticated diffractive structures, such as are described herein, to produce a number of diffracted beams in non-standard specified directions as illustrated in FIG. 1. It should be appreciated, however, that the diffraction bar code can be implemented with any type of diffractive structure, whether standard (such as a known straight line grating, or a known blazed grating) or non-standard (such as some of the diffractive structures described herein).

Relative motion of the diffraction bar code 11 and the light beam 13 plus optical detectors 15 along the axis of the diffraction bar code results in a series of electrical signals produced by the optical detectors, which series of signals is indicative of the information retained in the diffraction bar code. The optical detectors 15 confirm that each of the diffractive strips 12 has the correct diffractive property and is therefore authentic. A diffractive strip with incorrect diffractive properties will not result in diffraction of the incident light beam 13 onto the optical detectors 15 in the correct manner, and therefore will not be confirmed as authentic.

Note that variations are possible on the embodiment illustrated in FIG. 1. For example, in one variation two or more light beams, possibly with different wavelengths, are directed from different directions to the same spot on the diffraction bar code in order to produce a specified combination of diffracted beams.

In a further variation, two or more light beams, possibly with different wavelengths, are directed simultaneously or alternately to the same spot or to different spots on the diffraction bar code to produce separately a number of specified diffracted beam configurations, which configurations may be confirmed and differentiated by a number of optical detectors.

Various "classes" of diffraction bar code can be produced and utilised. Each class of diffraction bar code is characterized by incorporating a particular and unique diffractive property into the diffractive strips making up the diffraction bar code. In this context "diffractive property" refers to the directions and power levels of the diffracted light beams for a particular combination of wavelengths and/or orientations of the reading light beam(s) incident on the diffraction bar code. (Note that different wavelength components in the reading beam(s) will in general be diffracted in different directions.) Hence in terms of the reading apparatus, different diffractive properties could imply different optical detector positions (due to different diffracted beam directions) and/or different reading beam wavelengths and/or different reading beam orientations. Therefore each class of diffraction bar code will require an equivalent class of reader device which is distinguished from other classes of reader by a particular reading beam wavelength and orientation, and/ or a particular combination of optical detector positions. A diffraction bar code of a particular class therefore can not in general be read in a reader designed for a different class of diffraction bar code.

Figure 2A:
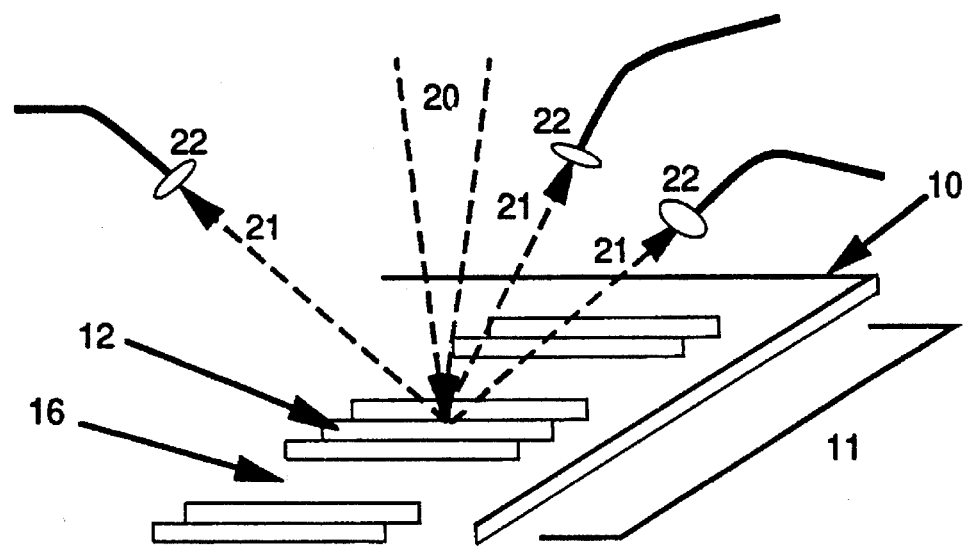
FIGS. 2(a) and 2(b) are schematic illustrations of two possible classes of reflective diffraction bar code.
Figure 2B:
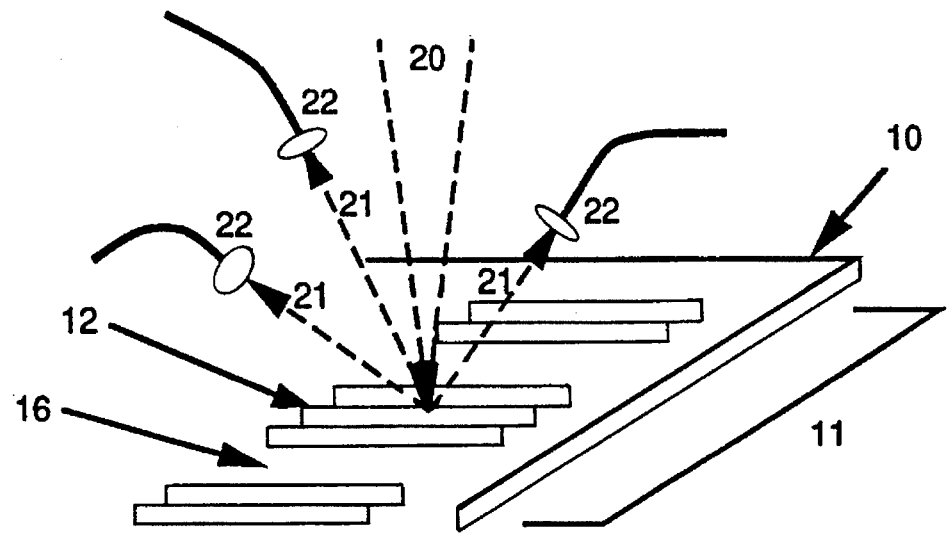

FIG. 2 below illustrates two different classes of diffraction bar code in FIGS. 2(a) and 2(b). In both cases the diffractive strips in the diffraction bar code memory are designed to produce three well defined diffracted beams, although other classes of diffraction bar code may produce greater or lesser numbers of diffracted beams. The incident light beam 20 is the same in FIGS. 2(a) and 2(b), although this need not be the case. The diffractive strips in FIGS. 2(a) and 2(b) differ principally in the directions of the diffracted beams 21 produced from the incident beam 20, so that optical detectors 22 configured to detect the diffracted beams 21 in FIG. 2(a) will not be able to detect the diffracted beams 21 in FIG. 2(b) since these beams are produced in different directions.

Note that in FIG. 2 only the directions of the diffracted beams differ in FIGS. 2(a) and 2(b). However, in some cases different classes of diffraction bar code will require also different directions and/or wavelengths for the incident reading light beams.

In practice it would most likely prove simplest for all classes of diffraction bar code to utilise the same reading beam wavelength and orientation, with each class of diffraction bar code producing a unique combination of the number of diffracted beams and directions for the diffracted beams and therefore requiring a unique combination of the number of optical detectors and positions for the optical detectors in the corresponding reading apparatus.

Using various classes of diffraction bar code has several advantages.

Firstly, it makes copying or forging of a diffraction bar code more difficult, since not only must the correct bar code sequence be recorded but also the correct diffractive property must be incorporated into the bar code.

Secondly, the various classes of diffraction bar code could be used for different types of application. Consequently, information pertaining to a certain type of application could not be read by all diffraction bar code readers, but would require the correct class of reader, thereby ensuring a higher level of confidentiality and security for the information.

Thirdly, different classes of diffraction bar code could be incorporated into a single optical memory, each class being used for a particular type of application. Since each class of bar code can only be read in the equivalent class of reader, the incorporation into a single optical memory of various types of information will not compromise the privacy, confidentiality or security of the information—a reader for a particular application will only have access to information pertaining to that application. In other words, the information corresponding to the different classes of diffraction bar code can be incorporated into a single optical memory with no possibility of "cross-connection" or "leakage" between the different types of information.

It should be noted that the reflective diffraction bar code technique described above is well suited to developing and utilising different classes of diffraction bar code, since the techniques used in producing reflective "background" diffraction gratings for subsequent recording of the diffraction bar codes are likely to be readily adaptable to incorporating different types of diffractive properties into the background diffraction gratings and hence into the resulting diffraction bar codes.

The diffraction bar code technique is intended to provide substantial information storage capacity. To achieve this the parallel strips making up a diffraction bar code must be narrow.

An estimate of the memory capacity available from the diffraction bar code memory technique can be made by assuming that the narrowest strip in a bar code sequence has a width of 10 microns, and that this represents one "bit" of information. This leads to a capacity of 1 kBtt per cm of bar code, which is substantially higher than is available from conventional bar codes or magnetic stripes. A width of 10 microns for the strips is feasible both in terms of the recording and the reading procedures. For example, a spot size of 10 microns which would be required during the reading process is substantially larger than that already available from compact disc technology.

In addition to the diffraction bar code application, diffraction gratings can be used in a number of other security related applications. For example, when recorded on a thin foil they can be incorporated into documents or objects as authentication and/or data storage devices. In such applications, as in the diffraction bar code application, it is an advantage for the diffraction grating to be difficult to copy forge or imitate and to possess unique diffractive properties which can be readily detected and confirmed—these factors increase the level of security provided by the diffraction grating. In order to achieve this, new diffraction gratings can be used in such applications, with said new diffraction gratings possessing unique diffractive properties which can readily be detected and confirmed by a reader device and which cannot be imitated by conventional diffraction gratings. Furthermore, said new diffraction gratings should preferably be difficult to copy or forge.

A simple reflective diffraction grating could be utilised in the diffractive strips making up a diffraction bar code. However, this type of grating has the disadvantage that it produces a simple diffracted beam pattern and is relatively easy to copy or forge.

Instead of a simple diffraction grating, a so-called "blazed" grating could be utilised in the diffractive strips making up a diffraction bar code. Blazed gratings are well known and are described in many optics texts—a brief description is also included below. A conventional blazed grating has the advantage over a simple diffraction grating that it concentrates most or all of the diffracted light into a single beam which, in the case of diffraction bar codes, will be directed to in optical detector. However, a disadvantage of using conventional blazed gratings is that they are presently utilised in a range of applications and therefore if applied to the diffraction bar code technology would not possess diffractive properties unique to the diffraction bar code application. Furthermore, techniques used to fabricate blazed gratings are well known.

In applications where security is not important, conventional known diffractive structures can be used in diffraction bar codes, stored value memories and related technologies as described herein. However, applications where security is important, the obvious disadvantage with conventional diffractive structures is that such structures can be forged, since the manufacturing techniques are relatively straightforward and are well known, and furthermore in many cases conventional diffraction gratings can be copied directly via a relatively simple process. Even in those instances where it is difficult to produce an exactly identical diffractive structure by copying or forging, be possible to imitate a grating through the use of another simpler conventional grating which produces a similar diffraction effect.

A simple reflective diffraction grating implies a grating which consists of a regular sequence of straight line perturbations on a reflective background. Said perturbations act as scattering centres for an incident light beam and do not necessarily have any specified structure—they could for example be lines, grooves, scratches or sinusoidal ripples. Such gratings are well known and are commonly used, for example, in cosmetic foils on various products or packages. A monochromatic light beam incident on such a grating will be diffracted into a number of beams, corresponding to different diffraction "orders". This is illustrated schematically in FIG. 3, where the simple reflective diffraction grating 30 is illuminated by a monochromatic incident light beam 31, producing a number of diffracted beams of various orders, with the order of each diffracted beam being represented by the letter "m" which can have a positive or negative integer value depending on whether the corresponding beam is on one side or the other of the incident beam 31, as illustrated in FIG. 3.

Figure 3:
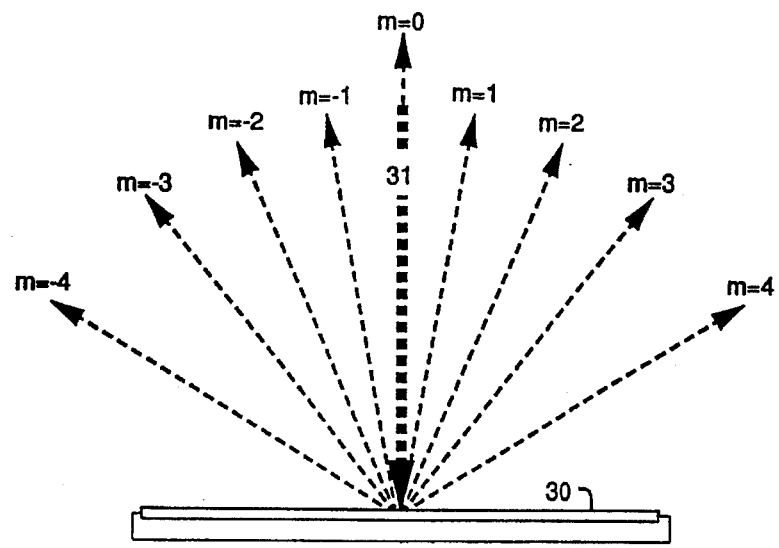
FIG. 3 is a schematic illustration of the diffractive properties of a simple straight line diffraction grating.

A simple diffraction grating such as that illustrated in FIG. 3 could be utilised in a diffraction bar code or in simple authentication labels. However, this has the disadvantage that a simple diffraction grating is easy to copy or forge and would therefore not provide a high degree of security.

Figure 4A:
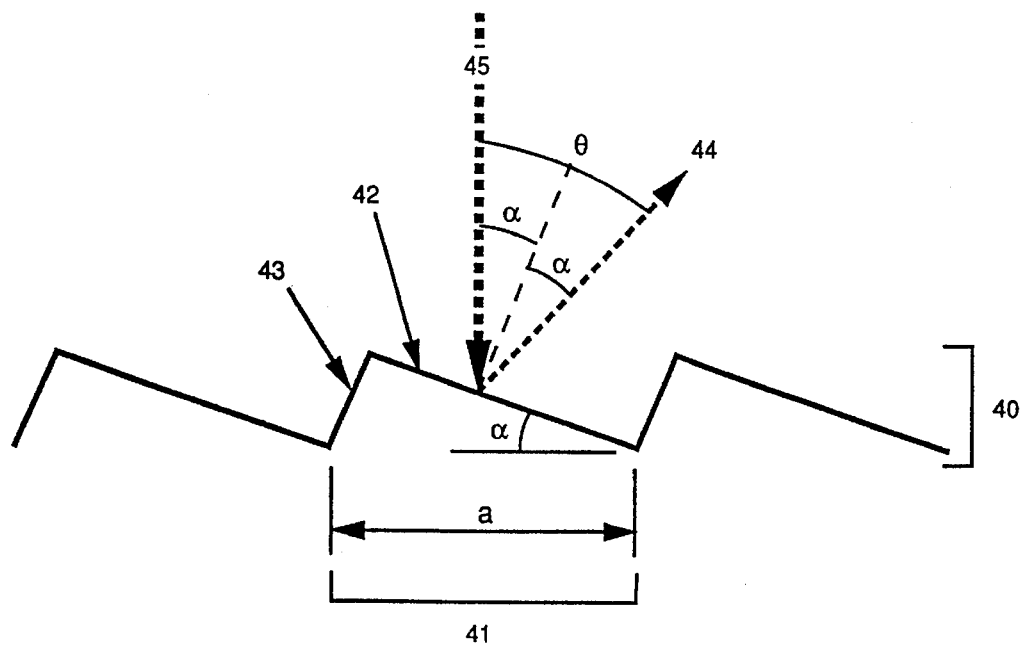
FIGS. 4(a) and 4(b) are schematic illustrations of the design and diffractive properties of a reflective blazed diffraction grating.
Figure 4B:
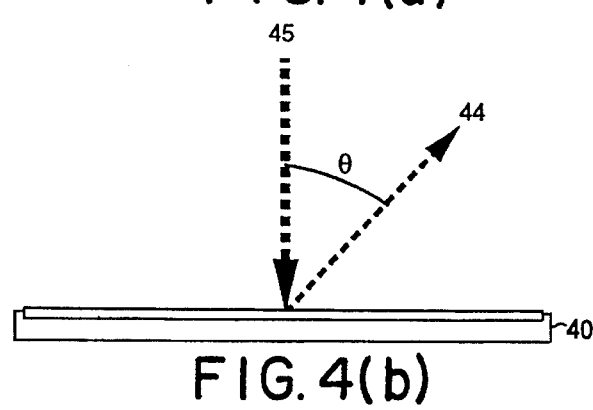

So-called "blazed" reflective diffraction gratings could be used instead of simple reflective diffraction gratings in diffraction bar codes and simple authentication labels. A blazed grating is a known device. FIG. 4 illustrates schematically the design and operation of reflective blazed grating. The design of the grating is illustrated in cross section in FIG. 4(a) while FIG. 4(b) illustrates the characteristic of the grating in side view. The principle of operation as follows. The reflective blazed grating 40 consists of a regular sequence of straight parallel ridges 41, each ridge being made up of two facets 42 and 43. One of the facets—in this case the facet 42—is optically reflective, while the other facet 43 may or may not be optically reflective. The facets 42 are designed to produce a single diffracted beam 44 from a monochromatic incident beam 45 of specified wavelength and orientation. Formation of the single diffracted beam 44 occurs as follows.

Interference of the light scattered from a large number of the ridges 41 leads to the allowed diffraction directions being given by the well known grating equation which applies to a monochromatic light beam incident at right angles to the overall grating face:

$$a \sin\theta = m\lambda \qquad \text{equation 1}$$

where the length "a" and the angle θ are defined in FIG. 4, λ is the wavelength of the monochromatic incident light beam 45, and "m" is the order of the diffracted beam (as described above in relation to FIG. 3) which can take on positive or negative integer values. (The directions of the diffracted beams shown in FIG. 3 for a simple diffraction grating are also given by equation 1.)

Each of the facets 42 acts as a plane mirror resulting in specular reflection (i.e. the type of reflection which occurs at a planar mirror) of the incident beam 45 through an angle 2α, where α is the blaze angle of the facets 42 as shown in FIG. 4(a).

In a blazed grating the blaze angle α of the facets 42 is chosen to produce specular reflection through the angle 2α in a direction corresponding to one of the diffraction orders (i.e. one of the "m" values) given by equation 1 for the incident beam 45 of a particular wavelength λ and orientation—in other words the angle 2α is equal to a value of θ corresponding to one of the possible "m" values in equation 1 for the incident beam 45. [Commonly the angle 2α will be chosen to be equal to a value of θ corresponding to the first diffraction order on one side or the other of the incident beam 45 i.e. m =1 or m=−1.3.] This specular reflection through the angle 2α, combined with the interference effects represented by equation 1, results in all, or almost all, of the light diffracted from the blazed grating 40 being concentrated into a single beam 44 at the angle θ=2α. In other words the specular reflection from the facets 42 serves to select just one of the diffraction "orders", or "m" values, given by equation 1, and concentrates all or most of the diffracted optical power into this diffraction order.

As shown by equation 1, the angle θ varies with the wavelength λ of the incident light beam 45, and hence, since the blaze angle α cannot be altered once a grating has been made, the blazed grating 40 will be designed to operate optimally at a particular wavelength, although typically a blazed grating will provide useful operation over a range of wavelengths.

A conventional blazed grating such as that illustrated in FIG. 4 could in principle be utilised in security applications—for example in the diffractive strips of a Diffraction Bar Code or in simple authentication labels. A disadvantage of using conventional blazed gratings in security applications is that such gratings are commonly used in other applications (for example, in scientific instrumentation) and therefore would not have diffractive properties unique to the security applications in which they would be used. Furthermore, production techniques for conventional blazed gratings are well known and therefore such gratings are vulnerable to forging.

The following descriptions refer to a new class of diffraction grating known as multiple beam gratings and in particular refer to the properties of multiple beam gratings when illuminated by a monochromatic (i.e. single wavelength) or near monochromatic light beam. This is appropriate since multiple beam gratings will commonly be used in security applications, in which case a monochromatic or near monochromatic beam of light will commonly be used to illuminate the multiple beam gratings and thereby produce a characteristic diffracted beam pattern. However, it should not be interpreted from this that multiple beam gratings must be illuminated by a monochromatic light beam or that they exhibit diffractive properties which cannot be imitated by conventional diffraction gratings only when illuminated by a monochromatic light beam.

Multiple beam gratings produce from a single monochromatic (or near monochromatic) incident light beam two or more diffracted beams. These diffracted beams will commonly (but not necessarily) be arranged asymmetrically either about the direction of the incident light beam or about the direction of the m=0 diffraction order—in the case of an incident light beam normal to the face of a diffraction grating these two directions are the same. The key point is that the configuration of diffracted beams produced by a multiple beam grating cannot be imitated by existing "conventional" diffraction gratings such as are described above—a multiple beam grating produces a configuration of diffracted beams which differs from the diffracted beams produced by a conventional diffraction grating in terms of (i) the number of diffracted beams, and/or (ii) the combination of directions of the diffracted beams, and/or (iii) the distribution of optical power among the diffracted beams.

FIG. 5 is a schematic illustration, as shown in side view, of a first preferred embodiment of a multiple beam grating. The multiple beam grating 50 is designed to produce diffractive properties which cannot be imitated by existing "conventional" diffraction grating designs such as those described above. A monochromatic light beam 51 of wavelength λ is incident on the multiple beam grating 50 at right angles to the face of the grating. The grating 50 produces from the incident light beam 51 two diffracted beams 52 and 53—one on either side of the incident beam 51. The two diffracted beams 52 and 53 are distributed asymmetrically about the incident light beam 51, so that the diffraction angles β1 and β2 are different in magnitude (see FIG. 5). The diffraction angles β1 and β2 need not be related in any way and in particular there is no requirement for the diffracted beams 52 and 53 to belong to the same set of diffraction orders—i.e. the angles β1 and β2 are not required to both obey equation 1 above for the same values of "a" and λ. The multiple beam grating illustrated in FIG. 5 will commonly be intended to be such that the diffracted beams 52 and 53 can not both belong to the same set of diffraction orders (or more accurately, not for any reasonable value of "a" in equation 1).

[Note that diffracted beams are referred to herein as belonging to the same set of diffraction orders if they all obey equation 1 for the same values of "a" and λ, in which case the value of "m" (see equation 1) corresponding to a particular diffracted beam is known as the "order" of the diffracted beam.]

It should be appreciated that variations on the grating described above in relation to FIG. 5 are possible, an example being a grating which is similar to that shown in FIG. 5 but for which the diffracted beams 52 and 53 do both belong to the same set of diffraction orders—in other words the diffraction angles β1 and β2 are different in magnitude while both still obeying equation 1 above for the same values of "a" and λ. An example of another variation on the grating illustrated in FIG. 5 is a grating which produces two diffracted beams, both of which are on the same side of the incident light beam.

FIG. 6 is a schematic illustration, as shown in side view, of a second preferred embodiment of a multiple beam grating. As with the grating described above in relation to FIG. 5, the multiple beam grating 60 is designed to produce diffractive properties which cannot be imitated by existing "conventional" diffraction grating designs such as those described above. A monochromatic light beam 61 of wavelength λ is incident on the grating 60 at right angles to the face of the grating. The grating 60 produces from the incident light beam 61 three diffracted beams 62, 63 and 64. Two of the diffracted beams, namely beams 62 and 63, are on one side of the incident beam 61 while the remaining diffracted beam 64 is on the other side of the incident beam 61 as shown in FIG. 6. The arrangement of diffracted beams 62, 63 and 64 is therefore asymmetric about the incident beam 61 and in FIG. 6 is such that all three diffraction angles $\gamma 1$, $\gamma 2$ and $\gamma 3$ for the diffracted beams 62, 63 and 64 respectively (see FIG. 6) are different in magnitude. The diffraction angles $\gamma 1$, $\gamma 2$ and $\gamma 3$ need not be related in any way, and in particular the three diffracted beams are not required to belong to the same set of diffraction orders—i.e. the angles $\gamma 1$, $\gamma 2$ and $\gamma 3$ need not all obey equation 1 for the same values of "a" and λ.

It should be appreciated that variations on the grating design illustrated in FIG. 6 are possible, an example being a grating similar to that shown in FIG. 6 but which differs in that all three diffracted beams 62, 63 and 64 lie on the same side of the incident beam 61. Another possible variation is that two or more of the diffracted beams 62, 63 and 64 may belong to the same set of diffraction orders.

FIG. 7 is a schematic illustration, as shown in side view, of a third preferred embodiment of a multiple beam grating. As with the gratings described above in relation to FIGS. 5 and 6, the multiple beam grating 70 is designed to produce diffractive properties which cannot be imitated by existing "conventional" diffraction grating designs such as those described above. A monochromatic light beam 71 of wavelength λ is incident on the grating 70 at right angles to the face of the grating. The grating 70 produces from the incident light beam 71 four diffracted beams 72, 73, 74 and 75. In the design illustrated in FIG. 7, the diffracted beams 72 and 73 are on one side of the incident light beam 71, while the diffracted beams 74 and 75 are on the other side of the incident light beam 71, as illustrated in FIG. 7. The four diffracted beams 72, 73, 74 and 75 are distributed asymmetrically about the incident light beam 71. In the case of the multiple beam grating shown in FIG. 7, the diffraction angles $\delta 1$, $\delta 2$, $\delta 3$ and $\delta 4$ of the diffracted beams 72, 73, 74 and 75 respectively (see FIG. 7) are all different in magnitude. The diffraction angles $\delta 1$, $\delta 2$, $\delta 3$ and $\delta 4$ in FIG. 7 need not be related in any way, and in particular the four diffracted beams 72, 73, 74 and 75 are not required to belong to the same set of diffraction orders—i.e. the angles $\delta 1$, $\delta 2$, $\delta 3$ and $\delta 4$ need not all obey equation 1 for the same values of "a" and λ.

However, in some specific grating designs of the type illustrated in FIG. 7 two or more of the diffracted beams 72, 73, 74 and 75 may belong to the same set of diffraction orders. For example, in some embodiments the diffracted beams $\delta 2$ and $\delta 4$ may belong to one set of diffraction orders so that the angles $\delta 1$ and $\delta 3$ obey equation 1 for "a"=a1, while the diffracted beams 73 and 75 may belong to a different set of diffraction orders so that angles $\delta 2$ and $\delta 4$ obey equation 1 for "a"=a2, where a1 and a2 are different. In another example of a possible embodiment the four diffracted beams 72, 73, 74 and 75 may belong to the same set of diffraction orders while still being arranged asymmetrically around the incident light beam 71.

Another possible variation on the preferred embodiment described above in relation to FIG. 7 is that the four diffracted beams 72, 73, 74 and 75 may not be arranged such that two diffracted beams lie on either side of the incident light beam 71. For example, three of the diffracted beams may lie on one side of the incident beam with one of the diffracted beams on the other side of the incident beam.

One important variation which applies to the multiple beam gratings described above in relation to FIGS. 5, 6 and 7 and applies to all multiple beam gratings is that the diffracted beams produced by a multiple beam grating need not be constrained to all lie in a common plane—in other words the diffracted beams may be produced in any direction.

It should be appreciated that many different designs of multiple beam grating are possible, with the different designs producing different diffracted light beam configurations either in terms of the number of diffracted light beams or the directions of the diffracted light beams, or the distribution of optical power among the diffracted beams. It is not feasible to describe in this statement all possible designs of multiple beam grating, and so the following description refers to typical examples of a particular type of multiple beam grating design referred to herein as multiple blazed gratings.

Multiple blazed gratings are a new type of diffraction grating thus named because they are an extension of the abovedescribed blazed grating concept to produce a particular type of multiple beam grating. However, it should be appreciated that the descriptions below do not cover all possible multiple blazed grating designs, and that other multiple blazed grating designs can be utilised, and in particular that any or all of the following variations can apply:

(i) different numbers and directions of possible diffraction orders can be utilised;

(ii) different combinations of actual diffracted beams, distributed among the possible diffraction orders, can be utilised;

(iii) different distributions of optical powers among the diffracted beams can be utilised.

It must be stressed that the principles described below can be applied to the design and understanding of all types of multiple blazed grating.

Figure 8A:
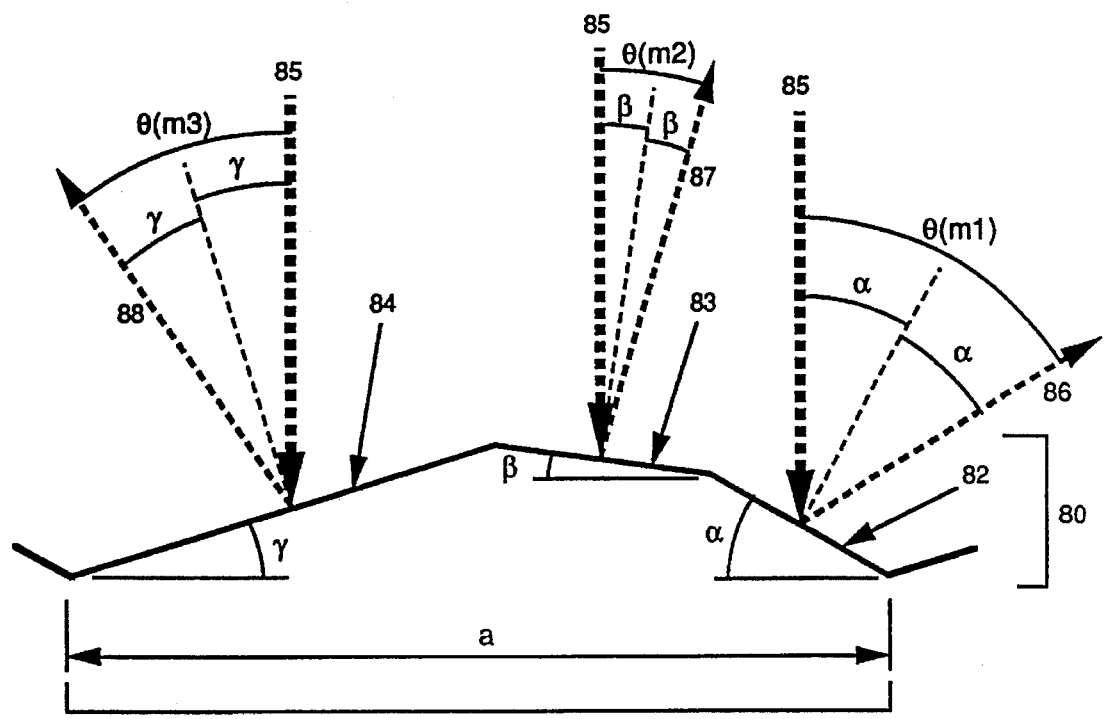
FIGS. 8(a) and 8(b) are schematic illustrations of designs for a reflective triple blazed grating.
Figure 8B:
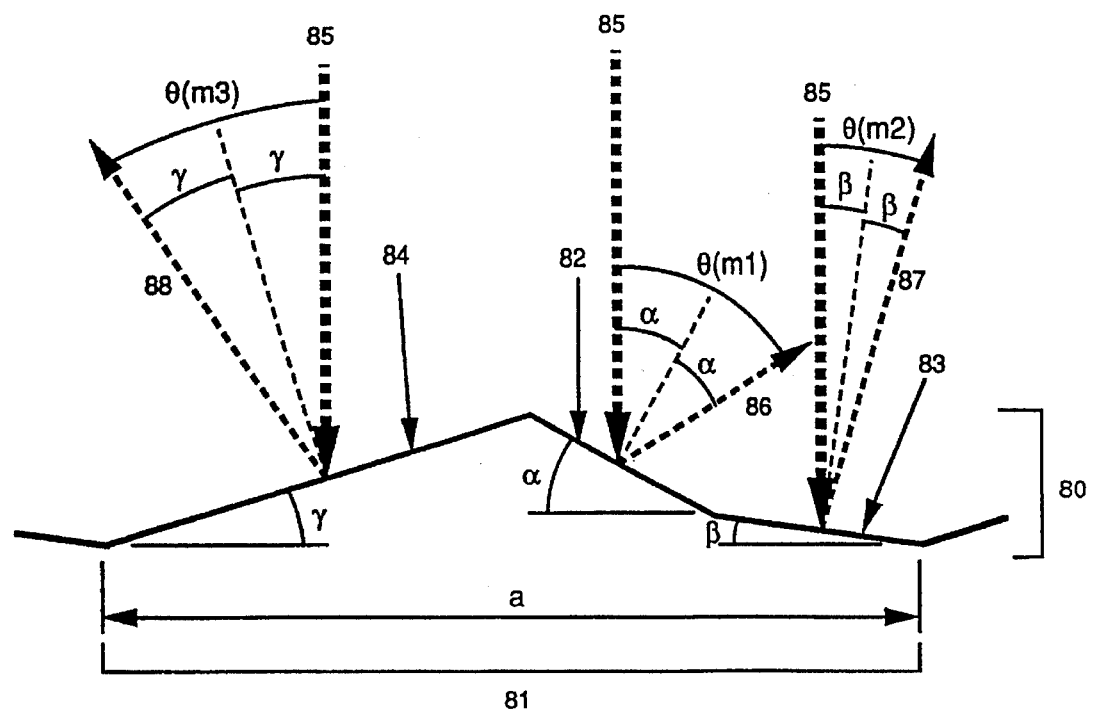

FIG. 8 is a schematic illustration of cross sectional views of two variations on a reflective triple blazed grating, which is a typical example of a multiple blazed grating and is characterised by the fact that each "ridge" in the grating surface has three planar reflective facets—hence the use of the term "triple". The two variations on the triple blazed grating design are shown in FIGS. 8(a) and 8(b).

The triple blazed grating 80 consists of a surface comprising a regular sequence of parallel, straight, identical, equally spaced ridges 81 as illustrated in FIG. 8, with each of said ridges comprising three planar optically reflective facets 82, 83 and 84.

The width of each ridge 81 is denoted by the symbol "a", as shown in FIG. 8. In this preferred embodiment the triple blazed grating is intended for operation with a monochromatic (or near monochromatic) light beam 85 of wavelength X which is incident at right angles to the overall face of the triple blazed grating BO, as illustrated in FIG. 8.

The regular arrangement of ridges B1 acts as a diffraction grating which restricts the possible diffraction angles e for the triple blazed grating to one of the angles obeying equation 1 above (the grating equation) and therefore restricts the diffraction directions to one of the diffraction orders corresponding to a positive or negative integer value of "m" in equation 1. A diffraction angle corresponding to a particular "m" value is denoted θ(m) in this statement.

Each of the planar reflective facets 82, 83 and 84 will act as a plane mirror when the width of the facet is large compared with the wavelength of the incident light. Under these conditions the portion of an incident light beam impinging on the facet will be reflected according to the usual law governing specular reflection—i.e. the angle of incidence equals the angle of reflection. When this condition is met, each of the facets 82, 83 and 84 will act as a plane mirror, which when oriented correctly can reflect part of the incident beam 85 in the direction of one of the allowed diffraction orders or "m" values, thereby selecting out that particular diffraction order with little or no optical power being diffracted into other diffraction orders. This is the principle of operation of a conventional blazed grating, as discussed above. Hence under these conditions when oriented correctly the three facets can produce three different diffracted beams corresponding to three of the allowed diffraction orders.

In practice, most multiple blazed gratings will include reflective facets with widths comparable with or less than the wavelength of the incident light. In this case so-called "single slit diffraction effects", which affect reflection from each individual facet, will become significant and will alter somewhat the characteristics of the multiple blazed grating. This can be understood as follows. Each of the reflective facets, such as the facets 82, 83 and 84 illustrated in FIG. 8, is a long thin rectangular facet which has a diffractive effect on an incident beam similar to the effect of a narrow slit of similar dimensions. Hence reflection from such a facet will cause significant diffractive effects, resulting in an angular spread of the reflected light. The angular intensity distribution of the light reflected from a single narrow mirror is given by the well known single slit diffraction pattern which is discussed in many optics texts. The angular spread of the reflected beam depends on a number of factors, but depends principally on the wavelength of the incident light and the width of the facet. As a result of this single slit diffraction, either an increase in the incident light wavelength or a decrease in the facet width will result in an increased angular spread in the light reflected from the facet, although the intensity distribution of the reflected light will still be centred around the specular reflection angle. As discussed above, the allowed diffraction orders, or "m" values, produced by a light beam incident on a diffraction grating result from interference between light diffracted from the different ridges in the diffraction grating. In the case of a multiple blazed grating this interference still occurs, and results in the light diffracted from the single facets being concentrated into one or more of the possible diffraction orders or "m" values for the grating. The selectivity of the interference process in concentrating the light into said diffraction orders depends on the number of ridges illuminated by the incident beam (as with conventional gratings), so that the diffraction orders become more sharply defined as a greater area of the diffraction grating is illuminated.

It should be noted that the formulae for single slit diffraction effects will provide an indication only of the relative intensities of light in the various possible diffraction orders of a multiple blazed grating—for an accurate determination of these intensities the single slit diffraction effects from all reflective facets must be taken into account (including interference between light diffracted from the different facets), along with the interference effects between light diffracted from different so-called "ridges" in the diffractive structure.

In the case of the multiple blazed gratings shown in FIG. 8, the facets 82 of the multiple blazed grating 80 are oriented at angle α—the so called blaze angle—as shown in FIG. 8, resulting in a specular reflection angle of 2α as shown. In FIG. 8 the angle α is selected so that the reflection angle 2α is equal to the diffraction angle θ(m1) obeying equation 1 for the diffraction order m1, although this constraint is not essential, as shown in the examples described below. Hence specular reflection from the facets 82 would result in the facets 82 collectively acting as a conventional blazed grating to produce a single diffracted beam 86 in the direction θ(m1)=2α, corresponding to m=m1, or in other words corresponding to the m1 diffraction order. In fact the facets 82 will normally have a width comparable with or less than the wavelength of the incident light 85. Consequently the single slit diffraction effects from the facets 82 will result in a spreading of the reflected light and could result in significant proportions of the light incident on the facets 82 being diffracted into diffraction orders around the diffraction order m1. However, the maximum diffracted beam intensity will normally occur in the diffraction order nearest to the specular reflection angle for the corresponding facet—in this case the m1 order.

Similarly, the facets 83 are oriented at angle β as shown in FIG. 8 resulting in a specular reflection angle of 2β as shown. In FIG. 8 the angle β is selected so that the reflection angle 2β is equal to another of the diffraction angles θ(m2) obeying equation 1 for the diffraction order m2. Hence specular reflection from the facets 83 would result in the facets 83 collectively acting as a conventional blazed grating to produce a single diffracted beam 87 in the direction θ(m2)=2β, corresponding to m=m2, or in other words corresponding to the m2 diffraction order. In fact the facets 83 will normally have a width comparable with or less than the wavelength of the incident light 85. Consequently the single slit diffraction effects from the facets 83 will result in a spreading of the reflected light and could result in significant proportions of the light incident on the facets 83 being diffracted into diffraction orders around the diffraction order m2.

Similarly, the facets 84 are oriented at angle y as shown in FIG. 8 resulting in a specular reflection angle of −2γ as shown (the negative sign indicates reflection through an anti-clockwise angle). In FIG. 8 the angle γ is selected so that the reflection angle −2γ is equal to another of the diffraction angles θ(m3) obeying equation 1 for the diffraction order m3. Hence specular reflection from the facets 84 would result in the facets 84 collectively acting as a conventional blazed grating to produce a single diffracted beam 88 in the direction θ(m3)=−2γ, corresponding to m=m3, or in other words corresponding to the m3 diffraction order. In fact the facets 84 will normally have a width comparable with or less than the wavelength of the incident light 85. Consequently the single slit diffraction effects from the facets 84 will result in a spreading of the reflected light and could result in significant proportions of the light incident on the facets 84 being diffracted into diffraction orders around the diffraction order m3.

The design described above in relation to FIG. 8 utilises specular reflection angles which correspond to diffraction orders. However, this is not essential, and some of the preferred embodiments described below utilise specular reflection angles which do not correspond to diffraction orders.

The diffraction directions θ(m1), θ(m2) and θ(m3) depend on the wavelength of the incident light beam 85, whereas the specular reflection angles 2α, 2β and −2γ are independent of wavelength. Hence, as with a conventional blazed grating, a multiple blazed grating will be designed to produce a specified pattern of diffracted beams at a specified incident optical wavelength, although most multiple blazed gratings will operate over a range of wavelengths.

Hence the multiple blazed gratings shown in FIG. 8 produce from a single monochromatic incident light beam 85 a number of diffracted beams corresponding to the different possible diffraction orders or ""m" values. As discussed above, the pattern of diffracted beams will depend on the geometry of the reflective facets and the wavelength and orientation of the incident light. The pattern of diffracted beams will in general be asymmetric about the m=0 diffraction order both in terms of the directions of the diffracted light beams (i.e. the combination of diffraction orders) and in terms of the powers of the diffracted light beams. The multiple blazed grating therefore provides a unique diffractive property which cannot be imitated by existing diffractive structures such as those described above.

The two triple blazed grating designs shown in FIGS. 8(*a*) and 8(*b*) are similar in that they comprise the same reflectrye facets 82, 83 and 84 arranged in a different order. The design shown in FIG. 8(*b*) results in more strongly peaked "ridges" 81 and can be advantageous in reducing the possibility of obstruction of the diffracted beams by neighbouring ridges.

The above description illustrates that the width of each reflectrye facet in a multiple blazed grating can influence strongly the overall behaviour of the multiple blazed grating, and yet the designs shown in FIGS. 8(*a*) and 8(*b*) do not allow any independent variation in the width of each facet. Furthermore, the width of a facet affects the proportion of the incident beam intercepted by the facet, and hence the proportion of the incident beam power in the light diffracted from the facet. It is therefore advantageous to be able to vary independently the facet widths in a multiple blazed grating in general it is possible to enable independent variation in the facet widths in a multiple blazed grating by incorporating Into the grating design a step discontinuity. The depth or height of the step discontinuity can be adjusted to account for variations in the widths or angles of the facets. In this way for example different gratings with the same facet angles but different facet widths, and hence different resulting diffracted beam patterns and powers, can be designed. However, the use of a step discontinuity with a convex arrangement of facets—i.e. an arrangement in which the facets form ridges which protrude outwards from the surface of the grating—will result in obstruction of at least one of the diffracted beams, which is undesirable. This can be overcome by using a concave arrangement of reflective facets in conjunction with the step discontinuity, as In the grating designs described below.

FIG. 9 is a schematic illustration of an example of a triple blazed grating—FIG. 9(*a*) illustrates the triple blazed grating design in cross section, while FIG. 9(*b*) illustrates schematically and qualitatively the characteristics of the grating design illustrated in FIG. 9(*a*).

FIG. 9(*a*) shows in cross section a specific example of a triple blazed grating design utilising a concave arrangement of reflective facets and a step discontinuity—the grating design is drawn approximately to scale with the following lengths and angles: a=2335 nm, b=584 nm, c=584 nm, d=1167 nm, e=23.1°, f=12.7°, g=29°, h=46.2°, i=25.4° and j=58°. It must be stressed that this is only one example of many different possible designs of multiple blazed grating which can be utilised in various applications. Other design examples are also shown below. The triple blazed grating 90 is made up of a regular sequence of parallel, identical straight line "ridges" 91, each of width "a" as shown. Each of the ridges 91 is made up of three planar optically reflective facets 92, 93 and 94, the three facets having different specified orientations. For a light beam 95 of wavelength λ incident at right angles to the overall face of the grating as shown, the presence of a regular sequence of straight line perturbations of spacing "a" results in a set of possible diffraction directions θ(m) given by equation 1 above for the different diffraction orders "m". In the design shown in FIG. 9 (and in the designs shown in FIGS. 10 and 11 ) the incident wavelength is assumed to be 660 nm and the grating spacing "a" is assumed to be 2335 nm. Hence according to equation 1 the possible diffraction orders "m" produced by the grating 90 in combination with the incident beam 95 are restricted to m=0, ±1, ±2, ±3 with the corresponding diffraction directions θ(m) set out below in Table 1, as calculated from equation 1.

(Note that the m=0 diffraction order corresponds to specular reflection of the incident beam 95 from the overall face of the grating and is of no interest in most applications.)

TABLE 1

| "m" | 0 | ±1 | ±2 | ±3 |
|---|---|---|---|---|
| θ (m) | 0° | ±16.4° | ±34.4° | ±58° |

It should be appreciated that the incident wavelength of 660 nm and grating spacing of 2335 nm are chosen arbitrarily and that other combinations of incident wavelength λ and grating spacing "a" could be used, resulting in different possible diffraction directions and in some cases a different number of possible diffraction orders. For example, increasing the grating spacing "a" can also increase the number of possible diffraction orders, as given by equation 1. The wavelength of 660 hm has some practical significance since it is accessible using compact and inexpensive semiconductor lasers.

In the design illustrated in FIG. 9(*a*) two of the optically reflective facets, namely facets 92 and 93, are designed to have specular reflection angles lying between angles corresponding to diffraction orders, while the facets 94 have a specular reflection angle corresponding exactly to one of the diffraction orders.

The widths of the facets 92, 93 and 94 are comparable with or less than the wavelength of the incident light beam 95, and hence each facet will produce significant single slit diffraction effects which may result in significant levels of diffracted optical power in diffraction orders around the specular reflection direction. An approximate idea of the magnitude of the single slit diffraction effects, and hence the power diffracted from a single facet into the various possible diffraction orders, can be obtained using well known single slit diffraction theory. As discussed above, this will provide a qualitative idea of the single slit diffraction effects, but a more sophisticated model is required to obtain accurate quantitative predictions.

The facets 92 have a width b of 584 nm (as measured parallel to the overall face of the grating, i.e. perpendicular to the incident light beam 95), which is approximately one quarter of the ridge spacing "a" of 2335 nm. and a blaze angle e of 23.1°. Hence the facets 92 have a specular reflection angle h of 46.2°, which is half way between the direction of the m=3 diffraction order (58°) and the direction of the m=2 diffraction order (34.4°). Single slit diffraction theory, which is well known, indicates that diffraction from a single facet 92 will be substantial in the direction of both the m=3 diffraction order and the m=2 diffraction order. Diffraction in the direction of the m=1 and m=0 diffraction orders will be weaker but still significant, while diffraction in the directions of the remaining diffraction orders will be very weak. Hence the facets 92 will collectively result in significant diffracted power in the and m=2 diffraction orders, with a lower but significant level of diffracted power in the m=1 and m=0 diffraction orders (with less power in the m=0 order than in the m=1 order), and with insignificant diffracted power levels in the remaining diffraction orders. The diffracted power levels in the m=3 and m=2 diffraction orders due to the facets 92 will be of a comparable magnitude.

The facets 93 have a width c of 584 nm (as measured parallel to the overall face of the grating, i.e. perpendicular to the incident light beam 95), which is approximately one quarter of the ridge spacing "a" of 2335 nm, and a blaze angle f of 12.7°. Hence the facets 93 have a specular reflection angle i of 25.4°, which is half way between the direction of the m=2 diffraction order (34.4°) and the direction of the m=1 diffraction order (16.4°). Single slit diffraction theory, which is well known, Indicates that diffraction from a single facet 93 will be substantial in the direction of both the m=2 diffraction order and the m=1 diffraction order. Diffraction in the direction of the m=3 and diffraction orders will be weaker but still significant, with even weaker but still significant diffraction in the direction of the m=−1 diffraction order and insignificant diffraction in the directions of the remaining diffraction orders. Hence the facets 93 will collectively result in significant diffracted power in the m=2 and m=1 diffraction orders, with a lower but significant level of diffracted power in the and m=0 diffraction orders, an even lower level of diffracted power in the m=−1 diffraction order, and insignificant diffracted power levels in the remaining diffraction orders. The diffracted power levels in the m=2 and m=1 diffraction orders due to the facets 93 will be of a comparable magnitude.

The facets 94 have a width d of 1167 nm (as measured parallel to the overall face of the grating, i.e. perpendicular to the incident light beam 95), which is approximately one half of the ridge spacing "a" of 2335 nm, and a blaze angle g of −29°. Hence the facets 94 have a specular reflection angle j of −58°, which corresponds to the m=−3 diffraction order as set out in table 1 above. Hence the facets 94 will result in diffraction of the incident beam 95 principally into the m=−3 diffraction order. Single slit diffraction theory, which is well known, indicates that diffraction from a single facet 94 will be significant in the direction of the m=−2 diffraction order although considerably weaker than in the direction of the m=−3 diffraction order, and that diffraction in the directions of the remaining diffraction orders will be very weak. Note that diffractive spreading of light reflected from facet 94 is less than from facets 92 or 93, due to the greater width of facet 94. Hence the facets 94 will collectively result in significant diffracted power in the m=−3 diffraction order, with a significant but very much lower level of diffracted power in the m=−2 diffraction order and negligible diffracted power in the remaining diffraction orders.

It should also be remembered that in the grating design illustrated in FIG. 9, a facet either of the type 92 or of the type 93 intercepts half as much of the incident optical power from the beam 95 as a facet of the type 94, and hence the combined power diffracted from the facets 92 and 93 is approximately equal to the power diffracted from the facets 94.

Consequently the triple blazed grating design illustrated in FIG. 9(a) will produce from the monochromatic incident light beam 95 an asymmetric configuration of diffracted beams which can be detected, or "read", using the reading technique described below, and which cannot be imitated by other diffraction grating designs such as the conventional grating designs described above.

Figure 9A:
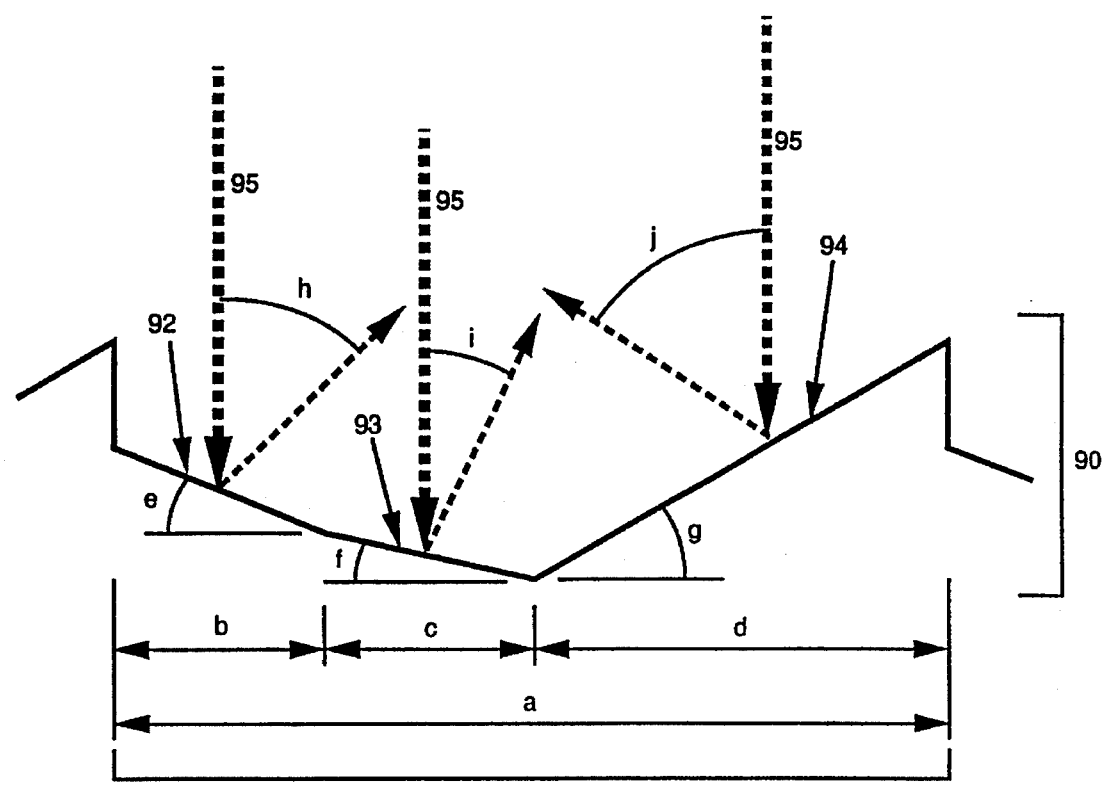
FIGS. 9(a) and 9(b) are schematic illustrations of an example of a specific reflective triple blazed grating design and the diffractive properties of said triple blazed grating.
Figure 9B:
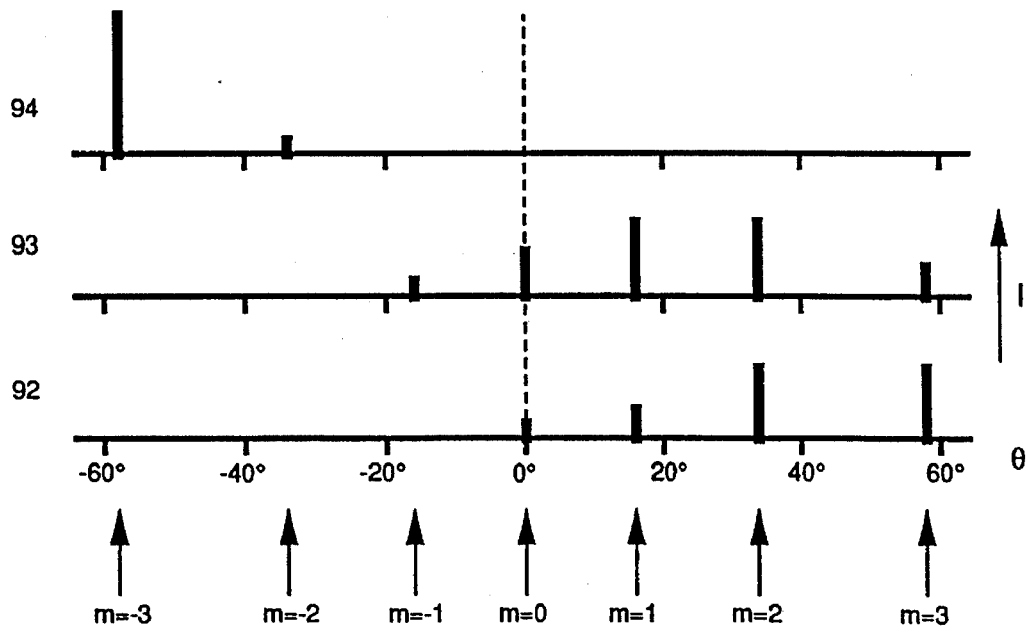

FIG. 9(b) shows in schematic and qualitative form the diffracted beam intensities produced in the directions of the diffraction orders by each of the facets 92, 93 and 94 of the triple blazed grating illustrated in FIG. 9(a) from the incident light beam 95. In FIG. 9(b) the optical intensity I of the diffracted beams is plotted over a range of diffraction angles θ, with the possible diffraction orders (or "m" values) marked, as shown, according to table 1 above, As discussed above, the diffracted power is concentrated by interference effects into the possible diffraction orders, and the total resulting diffracted beam pattern is asymmetric about the m=O diffraction order. Such a diffracted beam pattern cannot be produced or imitated by other diffraction grating designs such as the existing grating designs discussed above.

FIGS. 10 and 11 illustrate other possible multiple blazed grating designs. For simplicity the designs shown in FIGS. 10 and 11 utilise the same incident beam orientation, the same incident beam wavelength of 660 nm, and the same grating ridge width "a" of 2335 nm as in FIG. 9. Consequently, the grating designs illustrated in FIGS. 10 and 11 will result in the same possible diffraction orders, ranging from m=−3 to m=3, as set out above in table 1.

Figure 10A:
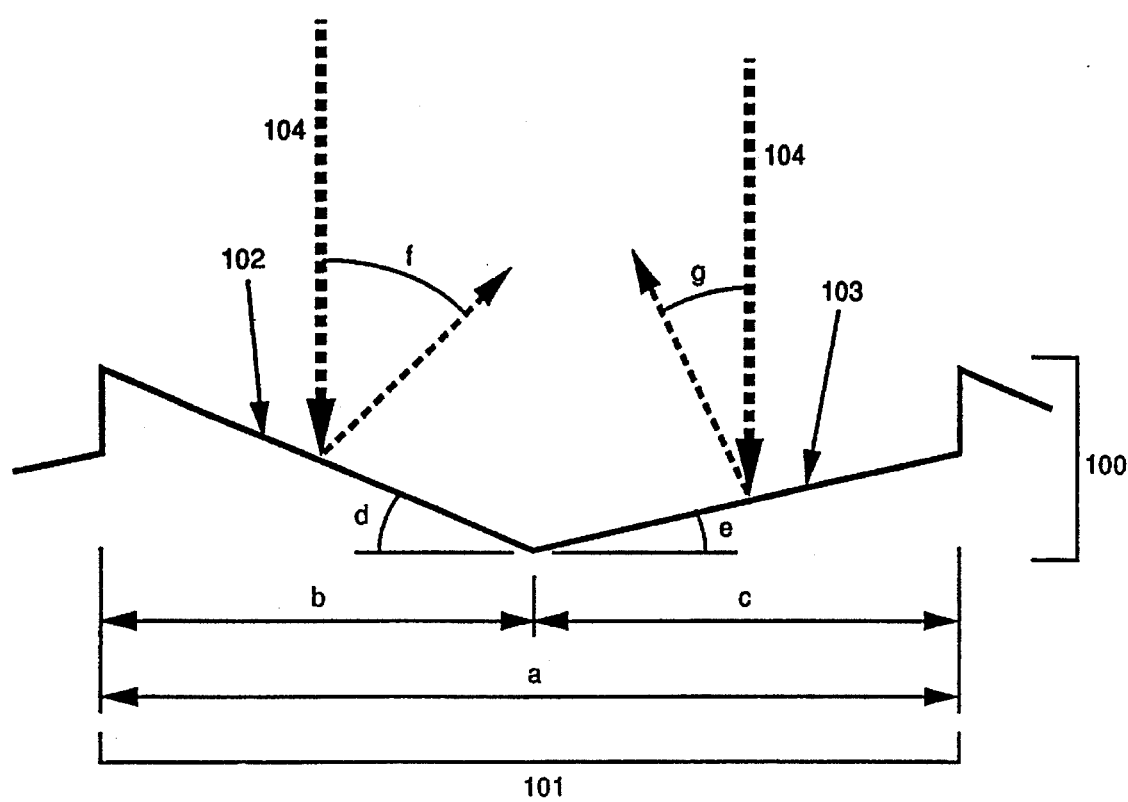
FIGS. 10(a) and 10(b) are schematic illustrations of an example of a specific reflective double blazed grating design and the diffractive properties of said double blazed grating.
Figure 10B:
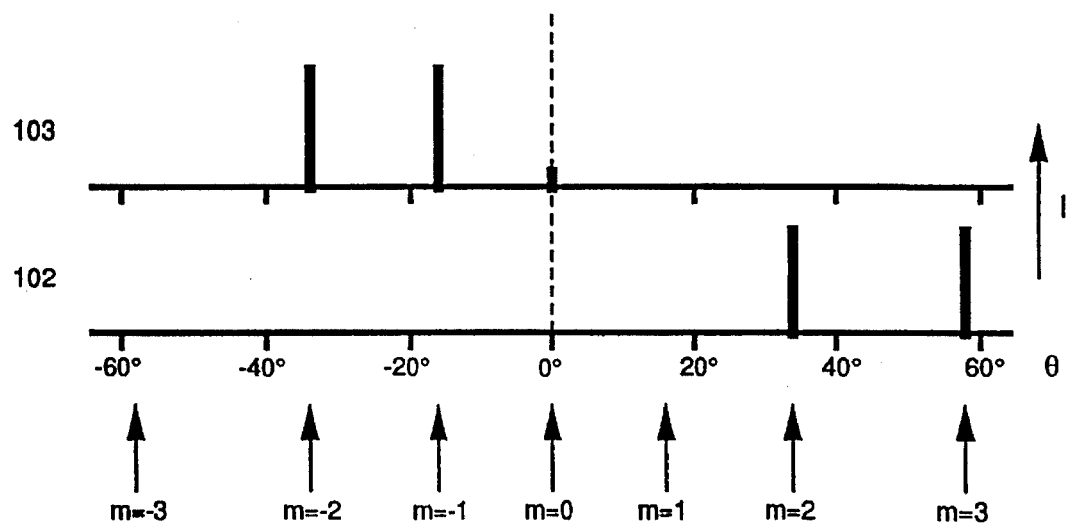

FIG. 10 is a schematic illustration of an example of a double blazed grating which is designed to produce four diffracted beams with significant optical power levels relative to the incident optical power level—two such beams result from each type of reflectrye facet in the grating structure. FIG. 10(a) illustrates the double blazed grating design in cross section, while FIG. 10(b) illustrates schematically and qualitatively the characteristics of the grating design illustrated in FIG. 10(a). Alight beam 104 of wavelength 660 nm is incident at right angles to the overall face of the double blazed grating 100.

The double blazed grating 100 is characterised by the fact that each of the ridges 101 in the grating consists of two planar reflectrye facets 102 and 103. The facets 102 and 103 have equal widths in this grating design- the widths being measured parallel to the overall face of the grating 100 and therefore perpendicular to the direction of the incident beam 104—but have different orientations.

The facets 102 have a width b of 1167.5 nm (i.e. one half of the ridge spacing "a" of 2335 nm), and a blaze angle d of 23.1°. Hence the facets 102 have a specular reflection angle f of 46.2°, which is half way between the direction of the m=3 diffraction order (58°) and the direction of the m=2 diffraction order (34.4°). Single slit diffraction theory, which is well known, indicates that diffraction from a single facet 102 will be substantial in the direction of both the m=3 diffraction order and the m=2 diffraction order, with significant but much weaker diffraction in the direction of the m=1 diffraction order, and negligible diffraction in the directions of the remaining diffraction orders. Hence the facets 102 will collectively result in significant diffracted power in the m=3 and m=2 diffraction orders, with a lower but significant level of diffracted power in the m=1 diffraction order, and negligible diffracted power in the remaining diffraction orders. The diffracted power levels in the m=3 and m=2 diffraction orders due to the facets 102 will be of a similar magnitude.

The facets 103 have a width c of 1167.5 nm (i.e. one half of the ridge spacing "a" of 2335 nm), and a blaze angle e of −12.7°. Hence the facets 103 have a specular reflection angle g of −25.4°, which is half way between the direction of the m=−1 diffraction order (−16.4°) and the direction of the m=−2 diffraction order (−34.4°). Single slit diffraction theory, which is well known, indicates that diffraction from a single facets 103 will be substantial in the direction of both the m=−1 diffraction order and the m=−2 diffraction order, with significant but much weaker diffraction in the direction of the m=0 diffraction order, and negligible diffraction in the directions of the remaining diffraction orders. Hence the facets 103 will collectively result in significant diffracted power in the m=−1 and m=−2 diffraction orders, with a much lower but significant level of diffracted power in the m=0 diffraction order, and negligible diffracted power in the remaining diffraction orders. The diffracted power levels in the m=−1 and m=−2 diffraction orders due to the facets 103 will be of a similar magnitude.

FIG. 10(b) shows in schematic and qualitative form the diffracted beam intensities produced in the directions of the diffraction orders by each of the facets 102 and 103 of the double blazed grating illustrated in FIG. 10(a) from the incident light beam 104, As in FIG. 9(b), the optical intensity I of the diffracted beams is plotted for a range of diffraction angles θ, with the possible diffraction orders (or "m" values) marked, as shown, according to table 1 above. The total resulting diffracted beam pattern is asymmetric about the m=0 diffraction order, with the highest levels of diffracted power in the m=3, m=2, m=−1 and m=−2 diffraction orders. Such a diffracted beam pattern cannot be produced or imitated by other diffraction grating designs such as the existing grating designs described above.

FIG. 11 is a schematic illustration of an example of a double blazed grating which is designed to produce two diffracted beams with significant optical power levels relative to the incident optical power level—one such diffracted beam is produced by each of the two types of reflective facet in the grating structure. FIG. 11(a) illustrates the double blazed grating design in cross section, while FIG. 11(b) illustrates schematically and qualitatively the characteristics of the grating design illustrated in FIG. 11(a). A light beam 114 of wavelength 660 nm is incident at right angles to the overall face of the double blazed grating 110.

The double blazed grating 110 is characterized by the fact that each of the ridges ill in the grating consists of two planar reflective facets 112 and 113. The facets 112 and 113 have equal widths in this grating design—the widths being measured parallel to the overall face of the grating 110 and therefore perpendicular to the direction of the incident beam 114—but have different orientations.

The facets 112 have a width b of 1167.5 nm (i.e. one half of the ridge spacing "a" of 2335 nm), and a blaze angle d of 29°. Hence the facets 112 have a specular reflection angle f of 58°, which corresponds to the m=3 diffraction order as set out in table 1 above. Hence the facets 112 will result in diffraction of the incident beam 114 principally into the m=3 diffraction order. Single slit diffraction theory, which is well known, indicates that diffraction from a single facet 112 will be significant in the direction of the m=2 diffraction order although considerably weaker than in the direction of the m=3 diffraction order, and that diffraction in the directions of the remaining diffraction orders will be very weak. Hence the facets 112 will collectively result in significant diffracted power in the m=3 diffraction order, with a significant but very much lower level of diffracted power in the m=2 diffraction order and negligible diffracted power in the remaining diffraction orders.

The facets 113 have a width c of 1167.5 nm (i.e. one half of the ridge spacing "a" of 2335 nm), and a blaze angle e of −8.2°. Hence the facets 113 have a specular reflection angle g of −16.4°, which corresponds to the m=1 diffraction order as set out in table 1 above. Hence the facets 113 will result in diffraction of the incident beam 114 principally into the m=−1 diffraction order. Single slit diffraction theory, which is well known, indicates that diffraction from a single facet 113 will be significant in the directions of the m=−2 and m=0 diffraction orders although considerably weaker than in the direction of the m=−1 diffraction order, and that diffraction in the directions of the remaining diffraction orders will be very weak. Hence the facets 113 will collectively result in significant diffracted power in the m=−1 diffraction order, with a significant but much lower level of diffracted power in the m=−2 and m=0 diffraction orders and negligible diffracted power in the remaining diffraction orders.

FIG. 11(b) shows in schematic and qualitative form the diffracted beam intensities produced in the directions of the diffraction orders by each of the facets 112 and 113 of the double blazed grating illustrated in FIG. 11(a) from the incident light beam 114. As in FIG. 10, the optical intensity I of the diffracted beams is plotted for a range of diffraction angles θ, with the possible diffraction orders (or "m" values) marked, as shown, according to table 1 above. The total resulting diffracted beam pattern is asymmetric about the m=0 diffraction order, with the highest levels of diffracted power in the m=3 and m=−1 diffraction orders. Such a diffracted beam pattern cannot be produced or imitated by other diffraction grating designs such as the existing grating designs discussed above.

Figure 11C:
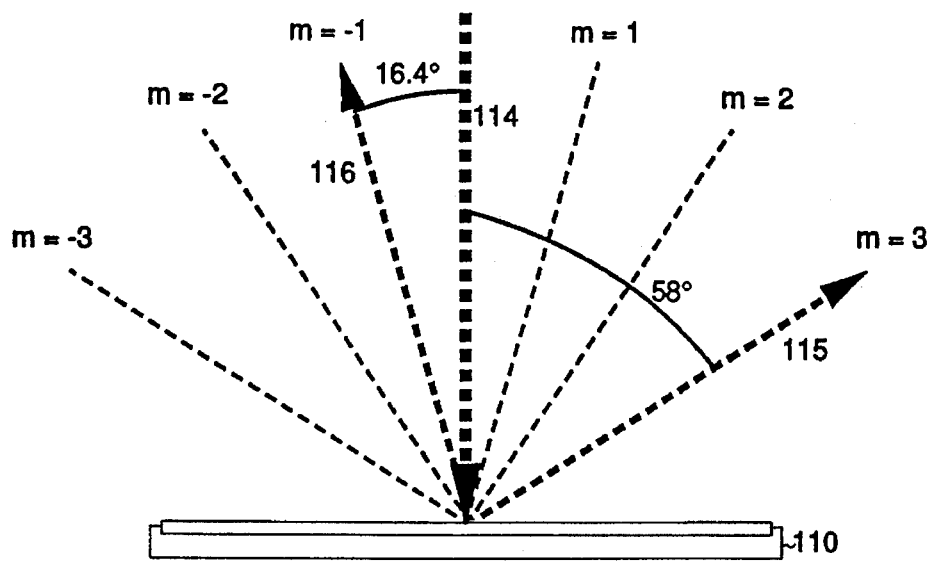

FIG. 11(c) is a schematic and qualitative illustration of a cross sectional view of the diffractive property of the double blazed grating illustrated in FIG. 11(a). The double blazed grating 110 produces from the 660 nm incident light beam 114 two significant diffracted beams 115 and 116 in the m=3 and m=−1 diffraction orders respectively.

It should be appreciated that the multiple blazed grating designs described above are examples only, and that other designs are possible.

For example, the grating designs described above could be modified to allow a different number of possible diffraction orders and/or to produce a different number of diffracted beams distributed in different ways among the possible diffraction orders. These modifications can be effected by modifying the ridge spacing in the grating structure, the width of the reflective facets in the grating structure, the orientation of the reflective facets and/or the number of different types of reflective facet.

Frequently the intended application for a multiple blazed grating will dictate the grating design, and in particular will dictate the number and angles of the possible diffraction orders, and the distribution of diffracted beams among the possible diffraction orders.

The above descriptions are in terms of reflective gratings. However it should be appreciated that the multiple blazed grating concept can also be implemented in the form of transmissive gratings.

Reader devices for multiple blazed gratings will in general be designed to confirm a combination of diffracted beams as corresponding to the correct design of multiple blazed grating. The confirmation, or authentication, process can involve different levels of sophistication.

The simplest reading technique involves simply confirming the presence of diffracted optical power in the appropriate diffraction orders and the absence of significant diffracted power in one or more of the remaining diffraction orders. In the case of multiple blazed gratings it may not be sufficient to confirm only the presence of diffracted power in certain diffraction orders, since in some cases this can allow imitation of the multiple blazed grating by a simple diffraction grating.

For example, the multiple blazed grating shown above in FIG. 9 produces significant diffracted power in the m=3, m=2, m=1 and m=−3 diffraction orders. A simple diffraction grating with the same ridge width "a" could instead be used to produce these diffracted beams, but would also produce diffracted power in the m=−1 and m=−2 diffraction orders. Hence by also confirming the absence of diffracted optical power in one or both of the m=−1 and m=−2 orders, the use of a simple grating to imitate the multiple blazed grating shown in FIG. 9 can be ruled out.

A more sophisticated reading technique involves performing the functions described above and in addition measuring and comparing the levels of optical power in the various diffracted beams. Although more complex, this technique allows the readers not only to rule out the use of conventional gratings to imitate multiple blazed gratings, but also allows the readers to distinguish feltably between multiple blazed gratings which produce similar diffracted beam configurations.

It should be appreciated that variations are possible on the preferred embodiments of multiple blazed gratings described above. For example, the above descriptions refer to planar reflective facets in the multiple blazed grating designs. However, this is not necessary for the facets to be planar, and they may instead have some other configuration. For example, the facets may be curved, and there may be no sharp discontinuity at the boundaries between different facets. Furthermore, the above description refers to the multiple blazed gratings in which the multi-faceted "ridges" are straight lines when viewed from above the diffractive surface. This need not be the case. Instead, the multi-faceted "ridges" may be curved in order to produce additional diffractive or other optical effects. Yet another variation is that the surface including the multiple blazed gratings may be divided into segments with the different segments each including a multiple blazed grating which may be the same as or different from the multiple blazed gratings in the neighbouring segments.

The multiple blazed gratings described above provide a means to produce from an incident light beam a unique combination of diffracted beams which cannot be imitated using conventional diffractive structures, and make use of diffractive surface structures which make copying or forging of such structures very difficult.

Another technology known as Pixelgram technology can be used instead of the multiple blazed grating technology to achieve unique diffracted beam patterns by means of diffractive structures which are difficult to copy or forge.

A Pixelgram is a known device described in patent documents and elsewhere. Although originally developed to produce visual verification images, Pixelgram can also be adapted to produce machine readable images such as are utilised in Diffraction Bar Code technology and related technologies.

A Pixelgram consists of a surface divided into a number of regions or pixels. Each pixel includes a diffractive surface structure which is designed to produce a predetermined diffractive effect under given lighting conditions.

Figure 12:
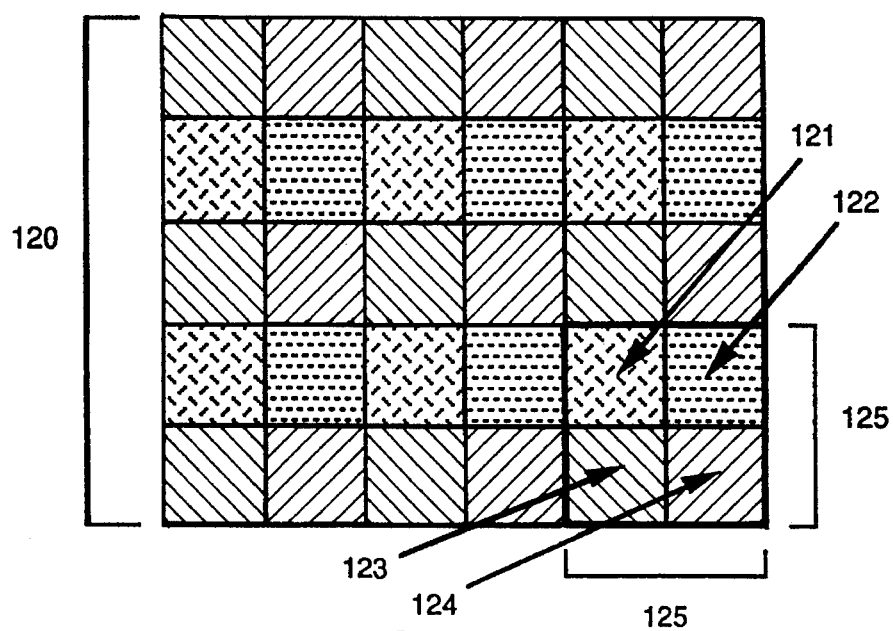
FIG. 12 is a schematic illustration of the surface of a Pixelgram diffractive structure.

The surface structure in each pixel consists of a set of surface perturbations or lines which are generally curved when viewed from above the surface of the pixel and which usually do not cross each other. The curved nature of the lines produces optical interference effects which prevent the known direct copying processes. Furthermore the very fine surface structure and curved nature of the lines in the Pixelgram technique makes forging of the pixels very difficult.

in terms of the producing a machine readable diffractive surface which can be utilised in the diffraction bar code technology and related technologies, the Pixelgram technology can be configured and utilised as follows. The surface of a Pixelgram is divided into a large number of pixels each of which will usually be square or rectangular. There will be a number of different pixel types making up the surface—for example four different square pixel types—with the surface of the pixelgram being divided into basic units, each such basic unit containing at least one of each pixel type. For example, if there are four different pixel types, a basic unit of the pixelgram surface may consist of these four pixel types arranged in a 2×2 fashion, or in a 4×1 fashion. FIG. 12 illustrates the situation in which the Pixelgram surface 120 is made up of four different square pixel types 121, 122, 123 and 124 arranged in a 2×2 configuration to form a basic unit 125. These basic units 125 are arranged in a repeating geometrical pattern across the surface of the Pixelgram, making up a "checkerboard" configuration.

Each pixel will be designed to produce from a specified incident optical reading beam one or more significant diffracted beams. The overall effect of an incident optical beam of the appropriate wavelength and orientation impinging on one or more of the abovementioned basic units 125 of the pixelgram surface is to produce a set of diffracted beams. For high security applications these beams will be configured such that they cannot be imitated using standard diffractive structures.

The above describes the basic principles of diffraction bar codes and the specialised diffractive structures which may be used to achieve high security for the diffraction bar code and related technologies. The following describes techniques for detecting specialised diffractive structures such as those described above and hence authenticating said specialised diffractive structures, along with techniques for recording data in a medium incorporating either conventional diffractive structures or said specialised diffractive structures, the data recording process thereby resulting in a diffraction bar code or a stored value memory.

The following refers to the detection of multiple blazed gratings.

Figure 13:
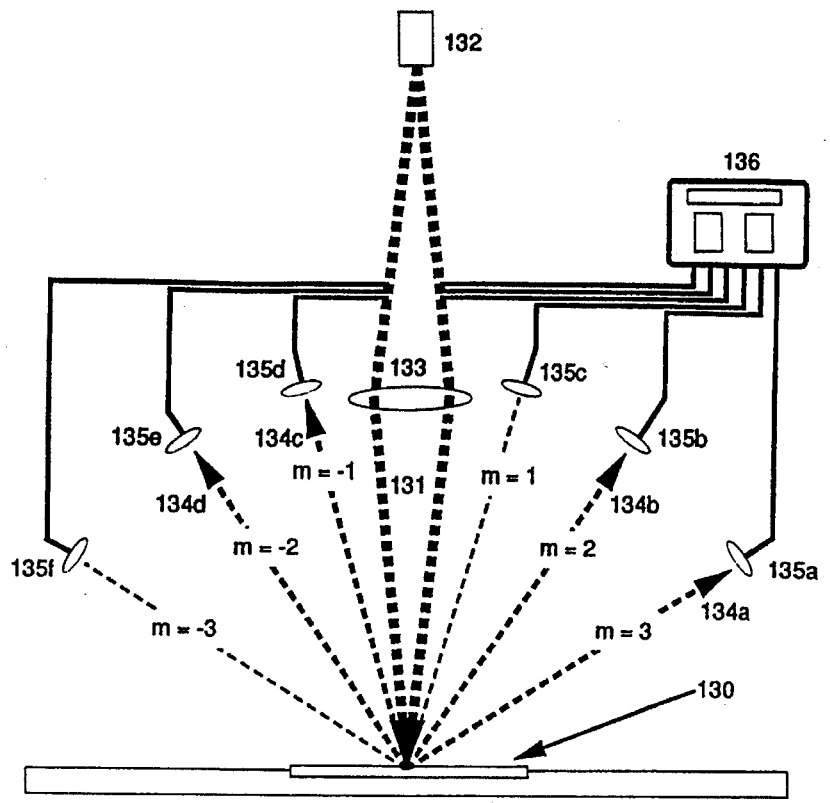
FIG. 13 is a schematic illustration of a first example of a technique for reading multiple blazed gratings.

FIG. 13 is a schematic illustration of a device for "reading" multiple blazed gratings of a particular design, and determining that a multiple blazed grating has the correct diffractive properties. Such a device could be used for example in reading and authenticating diffraction bar codes which incorporate multiple blazed gratings, or could be used for example to confirm an area of multiple blazed grating as having the correct diffractive property. FIG. 13 uses as an example the multiple blazed grating design described above in relation to FIG. 10 and hence with the possible diffraction orders set out in table 1 above. However, it should be appreciated that the same principles apply to reading any type of multiple blazed grating and the configuration illustrated in FIG. 13 is therefore an example only.

The triple blazed grating 130 is located relative to the reading device. For example, where the multiple blazed grating is incorporated into a card or document, the card or document could be either located and held in the reading device (e.g. an insertion reader) or could be moved through the reading device (e.g. a swipe reader). Alternatively, the reader device could simply be a hand held device with the reading apparatus of said hand held device brought into close proximity to the multiple blazed grating in the manner illustrated in FIG. 13.

A monochromatic (or approximately monochromatic) reading beam 131 of a wavelength appropriate to the design of the multiple blazed grating 130 is directed to the grating 130. (An incident wavelength of 660 nm is used in the above descriptions, although the multiple blazed gratings could be designed for other wavelengths.) The light beam 131 could for example be produced by a semiconductor laser 132 and brought to a focus at the grating 130 by a lens arrangement 133 as illustrated in FIG. 13. Alternatively, for example, the beam 131 could be a collimated (i.e. parallel) beam directed to the grating 130. As described above in relation to FIG. 10, this design of multiple blazed grating 130 in combination with the reading beam 131 results in six possible non-zero diffraction orders corresponding to m=±1, ±2, and ±3 with the diffraction directions listed above in Table 1. The reading beam 131 incident on the multiple blazed grating 130 results in four significant diffracted light beams 134a, 134b, 134c and 134d as described above in relation to FIG. 10. In this case the four significant diffracted beams correspond to the diffraction orders m=3, m=2, m=−1 and m=−2. In this proposed reader design optical detectors 135a, 135b, 135c, 135d, 135e and 135f are placed in positions corresponding to the directions of the m=3, m=2, m=1, m=−1, m=−2 and m=−3 diffraction orders respectively. The optical detectors 135a, 135b, 135d and 135e detect the light beams 134a (m=3), 134b (m=2), 134c (m=−1) and 134d (m=−2) respectively, producing electrical signals which are interpreted by processing electronics 136. The detectors 135c and 135f confirm an absence of significant diffracted optical power in the m=1 and m=−3 diffraction orders. Hence the reading device confirms the correct combination of diffracted beams by confirming both the presence of significant diffracted optical power levels in certain diffraction orders (m=3, m=2, m=−1 and m=−2 in this example) and also confirming an absence of significant diffracted optical power in certain other diffraction orders (m=1 and m=−3 in this example). In this way the use of a conventional grating design to imitate a multiple blazed grating can be ruled out.

A more sophisticated reading technique involves performing the functions described above and in addition measuring and comparing the levels of optical power in the various diffraction orders. Although more complex, this technique allows the readers not only to rule out the use of conventional gratings to imitate multiple blazed gratings, but also allows the readers to distinguish reliably between multiple blazed gratings which produce similar but not identical diffracted beam configurations.

Figure 14:
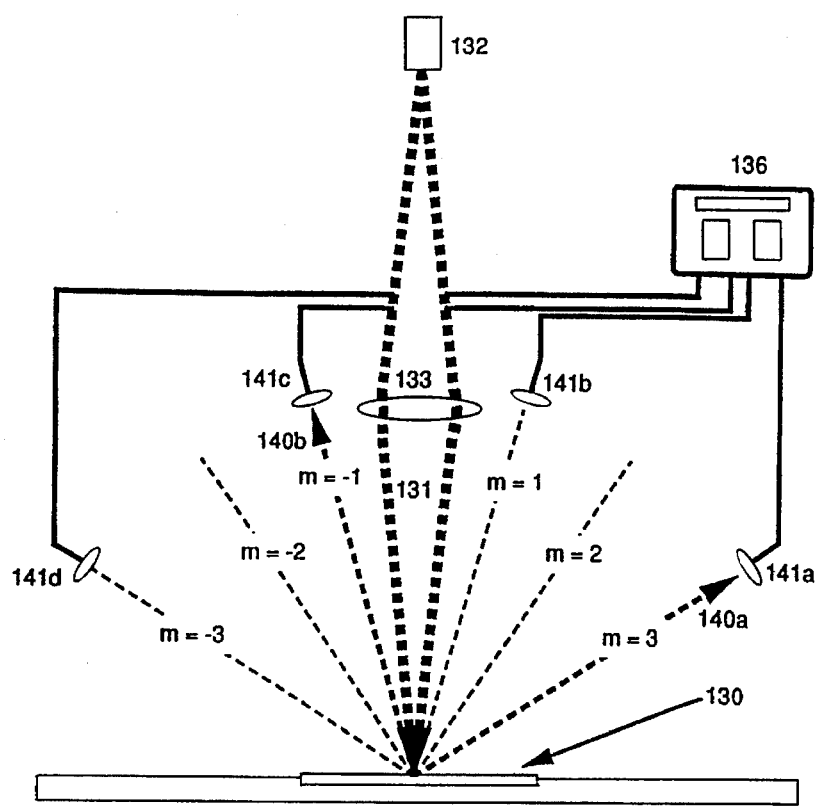
FIG. 14 is a schematic illustration of a second example of a technique for reading multiple blazed gratings.

FIG. 14 is a schematic illustration of a second reading device, in this case designed for reading multiple blazed gratings of the type described above in relation to FIG. 11 and hence with the possible diffraction orders set out in table 1 above for an incident reading beam wavelength of 660 nm. The reading device is designed to confirm that a multiple blazed grating has the correct diffractive properties.

The general principles of operation of the reading device illustrated in FIG. 14 are the same as described above in relation to FIG. 13, and the same numeric identifiers in FIGS. 13 and 14 imply a similar component or function.

The multiple blazed grating described above in relation to FIG. 11 is characterised by the fact that the strongest diffracted power levels, represented in FIG. 14 by the beams 140a and 140b, occur in the m=3 and m=−1 diffraction orders respectively, while negligible diffracted power occurs in the m=1 and m=−3 diffraction orders. Consequently the reader device illustrated in FIG. 14 includes only four optical detectors 141a, 141b, 141c and 141d corresponding respectively to the m=3, m=1, m=−1, and m=−3 diffraction orders as shown. Consequently when the reader device illustrated in FIG. 14 is used to read a multiple blazed grating of the type described above in relation to FIG. 11, the optical detectors 141a and 141c will detect significant levels of diffracted power in the m=3 and m=−1 diffraction orders respectively, while the optical detectors 141b and 141d will confirm an absence of any significant diffracted power in the m=1 and m=−3 diffraction orders respectively.

Hence the reading device in FIG. 14 confirms the correct combination of diffracted beams in this case by confirming both the presence of significant diffracted optical power levels in certain diffraction orders (m=3 and m=−1 in this example) and also confirming an absence of significant diffracted optical power in certain other diffraction orders (m=1 and m=−3 in this example). In this way the use of a conventional grating design to imitate a multiple blazed grating of the type described above in relation to FIG. 11 can be ruled out.

It should be appreciated that the reader device illustrated in FIG. 14 could also include optical detectors in the positions of the m=2 and m=−2 diffraction orders. These would allow a more sophisticated reading process which may result in a more reliable authentication of the diffraction properties, but has the disadvantage of increased cost due to the additional optical detectors and associated processing electronics.

As discussed above, if necessary the reader devices will be able to distinguish between similar multiple blazed gratings by measuring and/or comparing the diffracted optical power levels in the various possible diffraction orders. For example, the reading device described above in relation to FIG. 14 would be able to distinguish between the multiple blazed gratings described above in relation to FIGS. 10 and 11 by detecting the lower diffracted optical power levels in the m=3 and m=−1 diffraction orders resulting from the multiple blazed grating of FIG. 10 than from the multiple blazed grating of FIG. 11.

The principle of operation of the reader devices illustrated in FIGS. 13 and 14 can be extended to multiple blazed gratings involving a greater or lesser number of possible diffraction orders "m", and/or a greater or lesser number of actual diffracted beams arranged in different configurations among the possible diffraction orders.

The following describes a machine readable technique for detecting or "reading" an abovedescribed diffractive structure incorporating a Pixelgram.

The technique for reading a Pixelgram diffractive structure of the general type described above in relation to FIG. 12 is similar to the reading technique described above in relation to FIGS. 13 and 14 for reading a multiple blazed grating. There are, however, some significant differences.

The Pixelgram technique has the ability to produce diffracted beams in any orientation, rather than the beams being confined to a particular plane, as in the case of straight line multiple blazed gratings (such as the gratings discussed above in relation to FIGS. 9, 10 and 11) and simple straight line gratings. Hence in general the optical sensors used in the detection apparatus for Pixelgram diffraction gratings will be configured only to detect the presence of the diffracted beams, and will not be configured specifically to confirm the absence of one or more diffracted beams in other directions (as is done in the case of the multiple blazed grating reading devices described above in relation to FIGS. 13 and 14).

Figure 15:
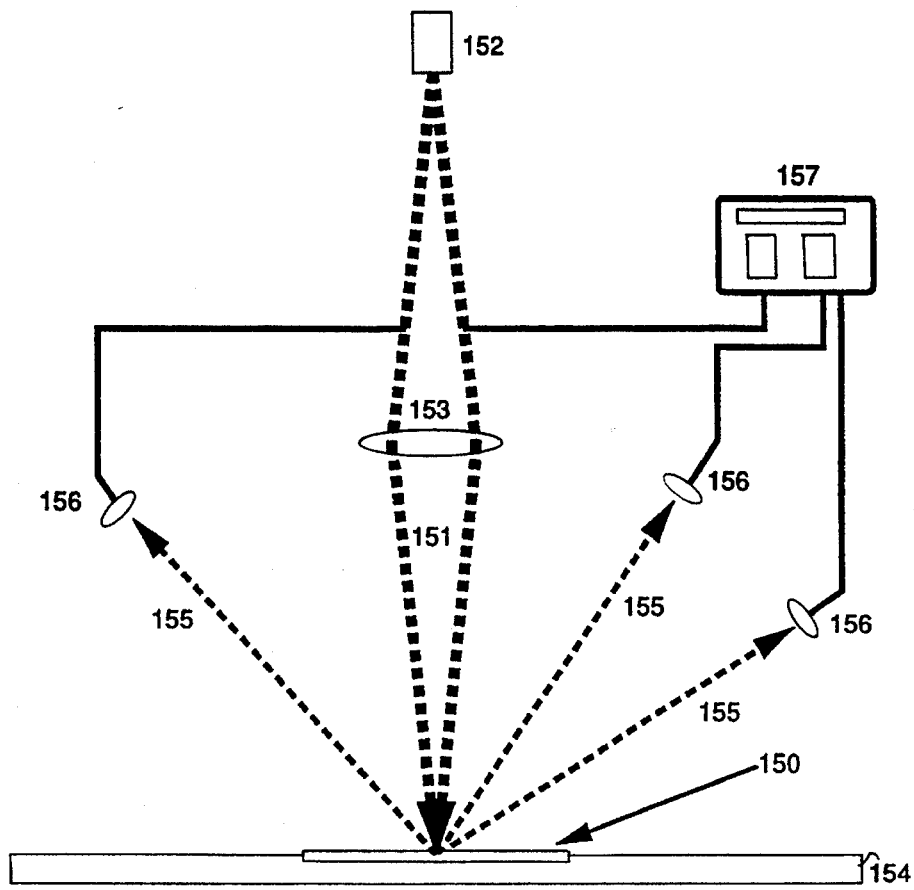
FIG. 15 is a schematic illustration of an example of a technique for reading Pixelgram gratings.

FIG. 15 illustrates a preferred embodiment of an apparatus used to read a Pixelgram grating structure of the type described above—in this case the apparatus is used to detect a Pixelgram structure 150 which produces three diffracted beams from an incident reading beam. A reading beam 151 from a source such as semiconductor laser 152 is focused by focusing optics 153 to a spot in the plane of the Pixelgram grating structure 150 which will usually be incorporated into a thin foil attached to the substrate medium 154. The Pixelgram grating 150 diffracts the reading beam 151 into three significant diffracted beams 155— additional weak diffracted beams may also be produced but will not affect the reading process as described herein. The three diffracted beams 155 are detected by three optical sensors 156. The sensors 156 each produce an electrical signal when illuminated by a diffracted beam with an optical intensity higher than a preset value. The processing electronics 157 is therefore able to interpret the electrical signals produced by the optical sensors 156 and hence determine when all three optical sensors are illuminated simultaneously by diffracted beams. Hence the reading apparatus shown in FIG. 15 is able to detect the presence of a Pixelgram grating of the type which produces the correct diffracted beam configuration.

It should be noted that the optical sensors 156 in FIG. 15 will usually not all be in the same plane, since a Pixelgram grating can produce diffracted beams in any direction.

Although the Pixelgram reading technique illustrated in FIG. 15 is similar to the multiple blazed grating reading technique illustrated in FIGS. 13 and 14, there are two principle differences in the technique for reading a Pixelgram grating structure. These are as follows.

Firstly, in order for the intended diffracted beam configuration to be produced, the reading optical beam—151 in FIG. 15—must be focused at the Pixelgram grating to a spot such that most of the spot is taken up in covering an integral number of the abovementioned basic units —125 in FIG. 12—of the Pixelgram surface. If a substantial proportion of the incident beam is taken up in illuminating only portions of the basic units, then the diffracted beam pattern will be distorted in some manner and may not be recognised by the reading apparatus. For example, if the incident beam illuminates say 1.5 basic units (i.e. if 50% of the beam is taken up in illuminating a non-integral number of the basic units), then the diffracted beam pattern can be expected to differ from the intended pattern in terms of the directions of the beams and/or the power distribution among the beams. This requirement has an impact on the shape of the focused reading beam spot. If the abovementioned basic unit of the Pixelgram surface is a 2×2 arrangement of square pixels, as illustrated above in FIG. 12, then the smallest allowable spot size would be approximately a square covering this 2×2 set of pixels. A more feasible focused spot configuration for the diffraction bar code application (in terms of producing the desired diffracted beam configuration) is a focused strip covering a column of said basic units in the Pixelgram surface. This is illustrated schematically in FIG. 16, where the focused reading beam spot 161 illuminates a column of said basic units 162 of the Pixelgram surface 160, the basic units 162 each consisting for example of a 2×2 arrangement of the four different types of pixel making up the Pixelgram surface, as illustrated in FIG. 12.

Figure 17:
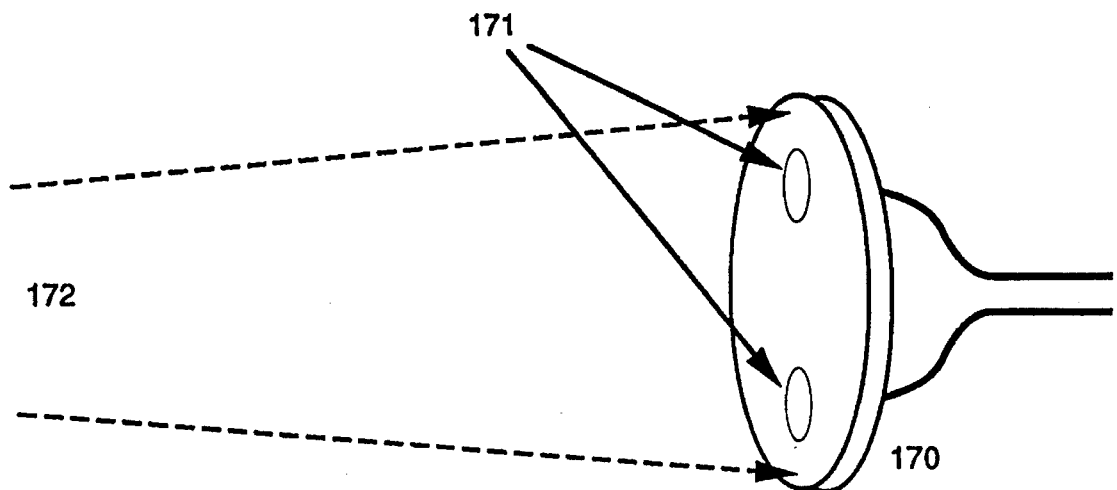
FIG. 17 is a schematic illustration of an example of an optical sensor configuration for use In a Pixelgram reading device.

Secondly, as described above, each pixel in the Pixelgram surface includes a set of curved lines. These curved lines are necessary to produce the optical interference effects which prevent copying of the Pixelgram structure via known optical techniques such as are used at present to fraudulently copy reflection holograms. In turn, however, these curved lines in the Pixelgram structure result in diverging diffracted beams, rather than narrow pencil-like diffracted beams. The optical detector arrangements used to detect each of the diffracted beams will preferably be able to confirm that each beam has a divergence appropriate to the pixel producing the beam. This is necessary in order to ensure that a counterfeit diffractive structure, using straight line grating pixels to produce narrow pencil-like diffracted beams, cannot be used successfully in a Pixelgram reading device. This confirmation process is carried out by using optical sensors 156 in FIG. 15, with each optical sensor 156 consisting of two or more separate optical detection regions. FIG. 17 illustrates a preferred embodiment of such an optical sensor 170, in this case consisting of two separate optical detector regions 171 separated by an appropriate distance in order to confirm the divergence of the diffracted beam 172 which will have a certain diameter at the position of the optical sensor 170. It should be appreciated that numerous variations are possible on the embodiment shown in FIG. 17. For example, the optical sensor could consist of a set of separate concentric circular optical detection regions. Another possible configuration is a straight line arrangement of a number of separate optical detection regions.

It should be appreciated that variations are possible on the techniques described herein for reading diffractive structures. In one such variation two or more different light beams, possibly with different wavelengths, are directed simultaneously in some combination or alternately to the same area or different areas on the diffractive structure to produce separately a number of specified diffracted beam configurations, which configurations may be confirmed and differentiated by a number of optical detectors.

The following describes a technique for reading diffraction bar code optical memories utilising a diffractive surface structure such as one of the structures described above.

As described above, a diffraction bar code consists of a series of parallel diffractive and non-diffractive strips arranged in a sequence so as to represent the recorded information. The diffractive strips in a bar code sequence are detected by an optical technique similar to the techniques described above in relation to FIGS. 13, 14 and 15. The non-diffractive strips in a diffraction bar code sequence are defined as strips which do not cause diffraction of an incident reading beam onto the appropriate optical detectors in the diffraction bar code reading apparatus.

The information recorded in a diffraction bar code sequence is read by detecting the sequence of diffractive and non-diffractive strips of the diffraction bar code. This sequence is detected by relative motion of the diffraction bar code and reading apparatus, which apparatus can determine the difference between a diffractive and non-diffractive strip in the diffraction bar code sequence. This relative motion causes a sequence of detected signals in the reading apparatus, with the sequence representing the stored diffraction bar code information.

Figure 18:
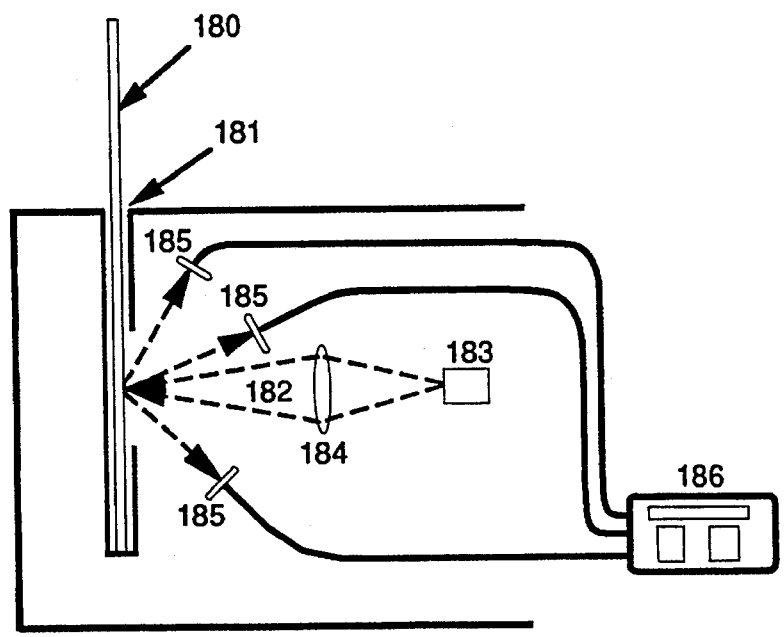
FIG. 18 is a schematic illustration of an example of a design for a swipe reader for use in reading diffractive structures and diffraction bar codes.

FIG. 18 is a schematic illustration of a technique for reading a medium containing a reflective diffraction bar code optical memory. For the purposes of this illustration, it is assumed that this medium is a card. The same technique applies also to documents containing diffraction bar codes. The Figure shows the reading apparatus end-on, so that the card 180 moves in a direction perpendicular to the page as it is read, with the diffractive and non-diffractive strips making up the bar code being perpendicular to the direction of card motion during the reading process, as is usual with conventional bar code techniques. As the card 180 is guided through the reader slot 181, a stationary light beam 182 from a source such as a semiconductor laser 183 is focused by a lens arrangement 184 either to a spot, or to a strip parallel to the diffractive and non-diffractive strips making up the diffraction bar code, in the region through which the diffraction bar code moves during the reading process, so as to be able to illuminate all or part of a single bar code strip. In the case of a Pixelgram diffraction bar code, the focused reading beam spot may need to be of a certain size and shape, as described above. When the light beam 182 is incident on a diffractive strip in the bar code sequence, all or part of the beam is diffracted onto a number of optical detectors 185—the exact number of detectors will depend on the diffractive property incorporated into the diffraction bar code. As the card 180 moves through the slot 181 the diffractive strips in the diffraction bar code produce a sequence of light signals at the optical detectors 185. The optical detectors 185 produce a sequence of electrical signals which are interpreted by processing electronics 186 to extract the card information. In some cases the card 1BO will be moved through the slot 181 manually by the user, such as in a swipe reader.

The reading technique illustrated in FIG. 1B can also be applied to insertion readers—such as in automatic teller machines—or hand held "wand" readers. In all cases relative motion of the diffraction bar code and the reading apparatus causes a sequence of diffracted light beams which are detected by a number of optical detectors and converted into a sequence of electrical signals.

Figure 19:
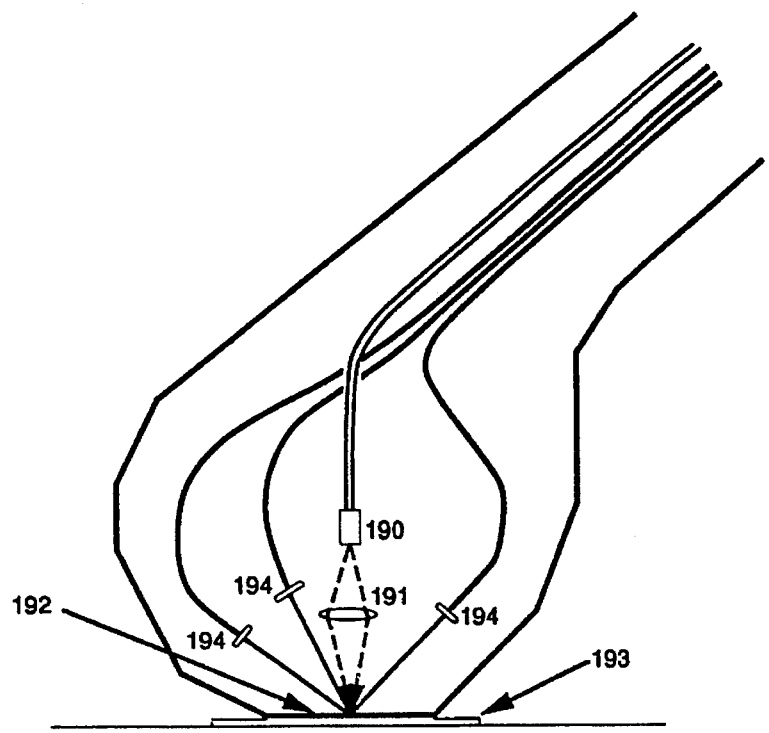
FIG. 19 is a schematic illustration of an example of a hand held reader device for use in reading diffractive surfaces and diffraction bar codes.

FIG. 19 is a schematic illustration of a hand held device intended for use in reading reflective diffraction bar code labels. In this context a diffraction bar code label is a diffraction bar code attached to an object or item to allow authentication and identification, and/or to provide information. The method of operation is essentially the same as for the reading technique described above in relation to FIG. 18. The main difference in this case is that the reader device is scanned over the diffraction bar code by hand, whereas in the technique described above the diffraction bar code is moved past a stationary reading beam. FIG. 19 illustrates a cutaway side view of the hand held reader. The output of a semiconductor laser 190 is focused by a lens arrangement 191 to a spot or a strip at the tip 192 of the reader so as to be able to illuminate part of a single strip in a diffraction bar code sequence. As the hand held reader is scanned over a diffraction bar code label 193 in a direction perpendicular to the strips making up the bar code, the diffractive strips in the diffraction bar code produce a sequence of diffracted light beams at the optical detectors 194 inside the hand held reader unit. The sequence of diffracted light signals thus produced is indicative of the information retained in the diffraction bar code label The optical detectors 194 produce a sequence of electrical signals which is interpreted by processing electronics to extract the information retained in the diffraction bar code label. It should be noted that the light source 190 need not be housed in the hand held reader unit—it could instead be remote from the unit, with light being piped from the light source into the hand held unit via one or more optical fibres.

The reading technique for diffraction bar code memories will in some implementations involve the diffraction bar code being located and held in a particular orientation with respect to the reading apparatus. For example, where the diffraction bar code is incorporated into a card, the orientation of the card during the reading process will in general be governed by the reading apparatus, as in a swipe reader or an insertion reader.

However, in some circumstances the orientation of the diffraction bar code will not be governed by the reading apparatus. For example, where the diffraction bar code is incorporated into a document or object, the reading apparatus may be in the form of a hand held reader device which is held by the user and brought into contact with, or swiped across, the diffraction bar code.

Figure 20:
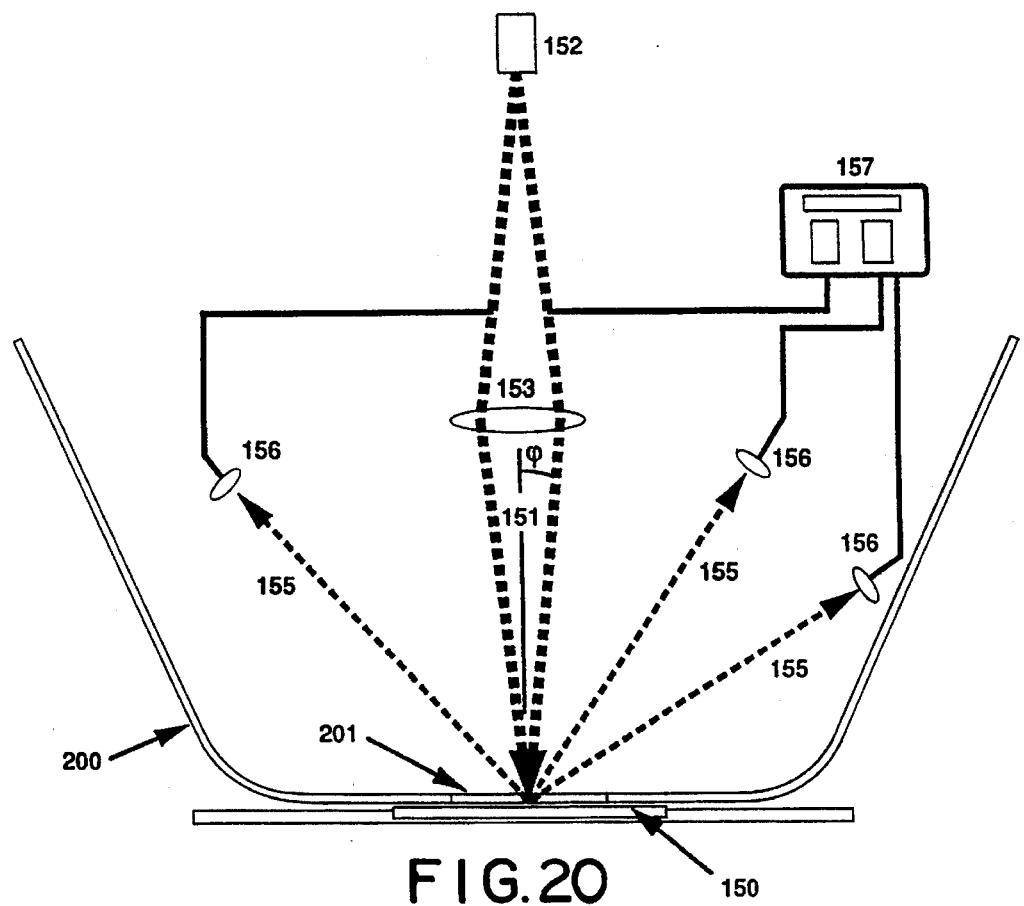
FIG. 20 is a schematic illustration of a possible design for the reading head of a hand held reader device.

FIG. 20 is a schematic illustration of the reading head of a hand held reader device designed to read a particular class (as described above) of diffractive structure and hence a particular class of diffraction bar code. This is one example of a reader head design—other designs will be employed for different classes of diffractive structure. The internal components in the reader device illustrated in FIG. 20 are essentially the same as in the reader device described above in relation to FIG. 15, and the same numeric identifiers imply a similar component or function. The hand held reader device illustrated in FIG. 20 additionally includes a reader head casing 200. In the tip of said casing 200 is a window 201 through which the reading beam and diffracted beams pass during the reading process. The hand held reader is swiped across a diffraction bar code by the user, thereby producing a sequence of diffracted beams resulting in a sequence of electrical signals in the same manner as described above in relation to FIG. 15. The sequence of electrical signals represents the diffraction bar code information and is interpreted by processing electronics 157.

In most reader devices, such as swipe readers or insertion readers, the relative orientation of the diffractive surface and reading apparatus is fixed during the reading process. However, in the case of hand held readers, the relative orientation of the reader device and diffractive surface is not governed by the reader device, but instead depends on the user of the hand held reader device. Consequently a hand held reader device must be able to tolerate or compensate for some degree of misalignment of the reading apparatus with respect to the diffractive surface. Two types of misalignment can be considered, as illustrated in FIG. 21.

Figure 21A:
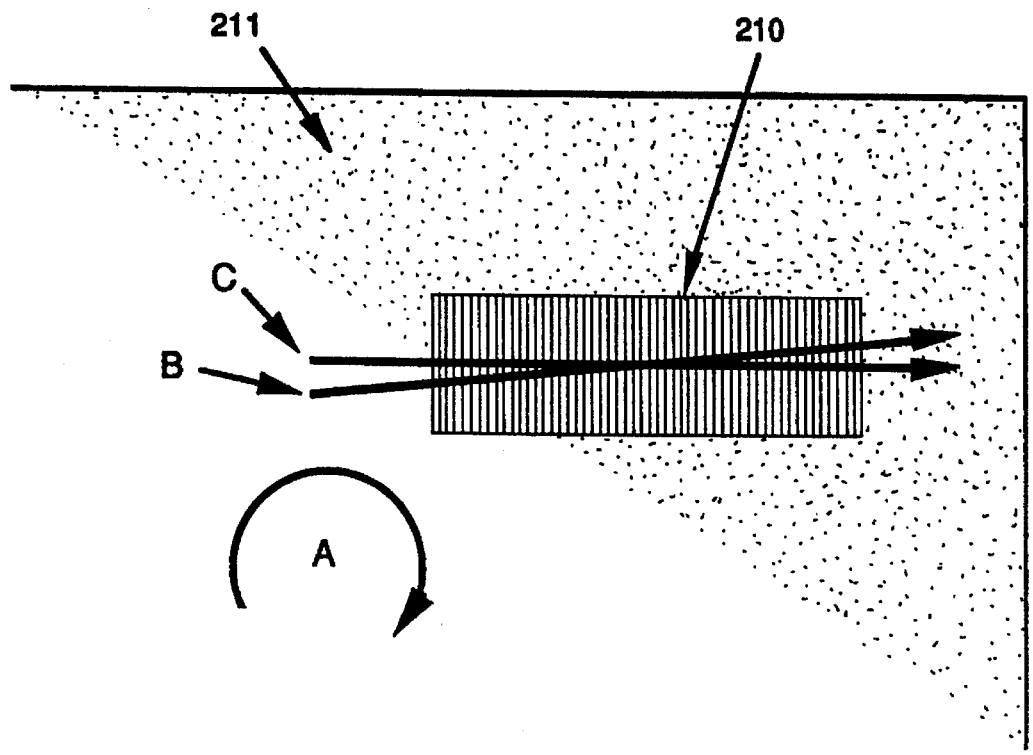
FIG. 21(a) is a schematic plan view of a diffraction surface over which a reading device is to pass.

The first is rotational misalignment of the reading apparatus and diffractive surface 210 on a card or document 211, as illustrated in FIG. 21(*a*). In this description, rotational orientation of the diffractive surface with respect to the reading apparatus refers to the rotational position of the diffractive surface about an axis defined by the reading beam—i.e. the beam 131 in FIG. 13. In FIG. 21(*a*) the letter A refers to the relative rotational orientation of the diffractive surface and reader device, while the letters C and B refer to the ideal scanning direction and misaligned scanning direction, respectively, for a hand held reader in the case where the diffractive surface 120 is a diffraction bar code. Rotational misalignment can occur, for example, when the scanning direction of a hand held reader over a diffraction bar code is incorrect, as illustrated by the letter B in FIG. 21(*a*). Rotational misalignment during reading of a diffractive structure must be taken into account since the reading beam is normally diffracted from a diffractive structure in a fixed direction relative to the diffractive structure, rather than relative to the reader head.

Consequently it is necessary for the reading technique to operate over a range of rotational orientations of a diffractive structure with respect to the reading apparatus, and possibly over all rotational orientations.

Figure 22:
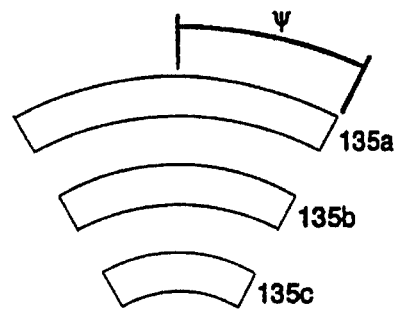
FIG. 22 is a schematic illustration of a possible layout for the optical detectors used in the reading apparatus of FIG. 13.
Figure 22:
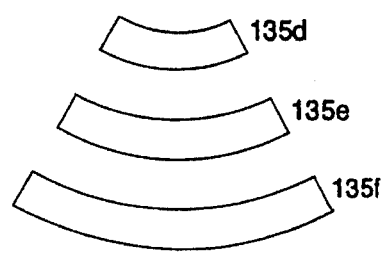

A degree of tolerance to rotational misalignment is made possible by shaping the optical detectors in the reader device in an arc centred on the reading beam. An example of this is illustrated schematically in FIG. 22, which for illustrative purposes only is based on the reading apparatus illustrated in FIG. 13. FIG. 22 shows the optical detectors 135*a*, 135*b*, 135*c*, 135*d*, 135*e*, and 135*f* as viewed looking along the reading beam 131, with each optical detector extended to form a circular arc centred on the focused reading beam spot 221. For clarity none of the other components in the reading apparatus of FIG. 13 is shown in FIG. 22. Using the configuration illustrated in FIG. 22 means that the optical detectors will detect the diffracted beams 134a, 134b, 134c and 134d shown in FIG. 13 over a range of rotational orientations of the multiple blazed grating 130 with respect to the reading apparatus which rotational orientations lie within an angle of ±Ψ (illustrated in FIG. 22) of the ideal rotational orientation.

Figure 23:
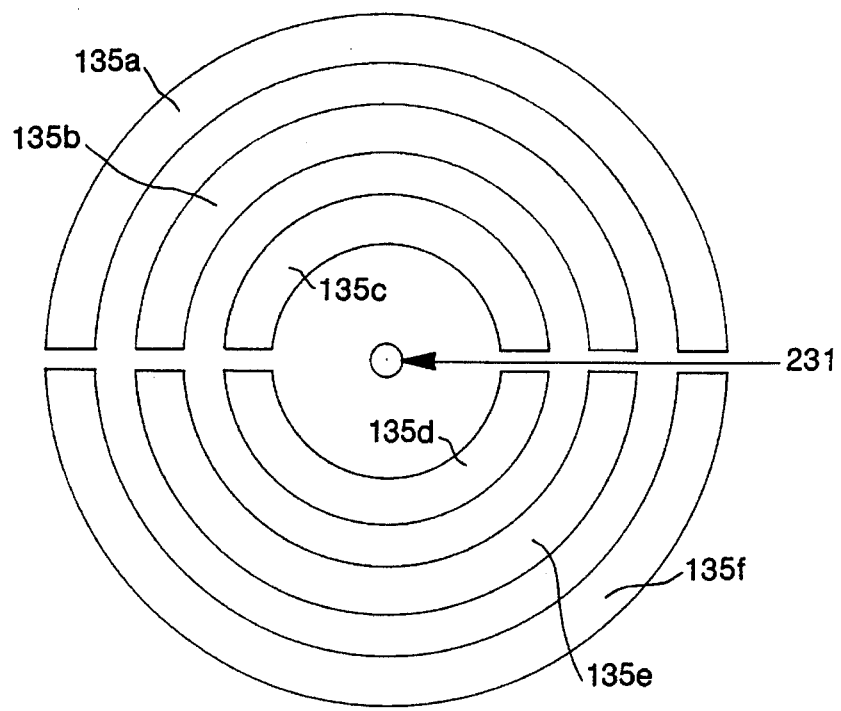
FIG. 23 is a schematic illustration of a second possible layout for the optical detectors used in the reading apparatus of FIG. 13.

In some applications the hand held reader will be used simply to confirm the diffractive properties of an area of diffractive surface which may for example be incorporated into a thin foil attached to an object without any bar code information recorded into said diffractive surface. In such applications confirmation of the diffractive properties of the foil authenticates the object. Reading of the diffractive foil in any rotational orientation can be achieved by extending the optical detectors used in the reading apparatus so that each forms a semicircular arc when viewed looking along the axis of the reading beam. An example of this is illustrated schematically in FIG. 23 which is based on the reading apparatus illustrated in FIG. 13. FIG. 23 shows the optical detectors 135a, 135b, 135c, 135d, 135e, and 135f as viewed looking along the reading beam 131, with each optical detector extended to form a semicircular arc centred on the focused reading beam spot 231. For clarity none of the other components in the reading apparatus of FIG. 13 is shown in FIG. 23. Using the configuration illustrated in FIG. 23 means that the optical detectors will detect the diffracted beams 134a, 134b, 134c and 134d shown in FIG. 13 regardless of the rotational orientation of the multiple blazed grating 130 with respect to the reading apparatus.

In those applications where the reading apparatus must be able to read the multiple blazed grating in any rotational orientation, and for which a detector configuration such as that illustrated in FIG. 23 is utilised, the processing electronics 136—illustrated in FIG. 13— which is used to process the electrical signals produced by the optical detectors in the reading apparatus, will be configured to allow reading of the multiple blazed grating 130—illustrated in FIG. 13—in any rotational position, taking into account that a 180° rotation of the reading apparatus with respect to the multiple blazed grating will result in a mirror image configuration of diffracted beams falling on the optical detectors. Hence, for example, in such applications a particular diffracted beam configuration and its mirror image (i.e. the same diffracted beam configuration rotated 180° on the optical detectors in the reading apparatus) could be regarded by the processing electronics 136 as equivalent.

In the case where a non-symmetrical arrangement of optical detectors is utilised in the reading apparatus, such as in the case of a Pixelgram diffractive structure, each optical detector will be extended to form a complete circle, and the abovedescribed situation regarding mirror image configurations will not apply.

In the case of a Pixelgram diffractive surface, an alternative scheme can be employed to allow confirmation in any rotational orientation of the diffractive properties of an area of Pixelgram diffractive surface which does not have diffraction bar code data recorded in it. As discussed above, such areas of diffractive material may be attached to a document or object to provide a means of authentication. In the above technique the optical detectors are extended to allow successful reading of the diffractive structure in any orientation. In the alternative technique now described there is no necessity to extend the optical detectors as described above. Instead, the Pixelgram diffractive surface, which is made up of a number of the abovedescribed basic units which are repeated in a "checkerboard" pattern across the surface, is modified. This modification is such that the diffractive structure within each basic unit is rotated a predetermined amount with respect to the diffractive structure in one or more of the neighbouring basic units, while at the same time the boundaries of the basic units and the pixels making up said basic units do not change in rotational orientation—i.e. only the diffractive structures within these boundaries have a rotated orientation. Hence for example the Pixelgram configuration illustrated in FIG. 12 may be modified such that the diffractive structure in each pixel of a basic unit 125 is rotated by a set amount with respect to the basic unit immediately to the left and also with respect to the basic unit immediately below in FIG. 12, while the overall configuration of the pixels and basic units is uniform across the Pixelgram surface. Over a sufficiently large area of the Pixelgram diffractive surface the rotation of the diffractive structures inside said basic units will complete a full 360°. Given that the direction of the diffraction process depends on the rotational orientation of the diffractive structure causing the diffraction process, it follows that provided a sufficiently large area of a Pixelgram diffractive surface is illuminated by an incident light beam, at least some of the basic units in the illuminated region will have a rotational orientation appropriate to the rotational orientation of a reader device being used to confirm the diffractive properties of said Pixelgram surface. Hence the reader device will be able to read or confirm the diffractive properties of the Pixelgram diffractive structure for any relative rotational orientation of such a Pixelgram surface and reader device.

The second type of misalignment which can occur during reading of a diffractive structure using a hand held reader is an angular misalignment, which refers to the fact that the reading beam may not be perpendicular to the diffractive surface during the reading process. Such angular misalignment is illustrated in FIG. 21(b), in which the hand held reader 212 can suffer an angular misalignment indicated by the letter D.

Ideally the hand held reader head, or more specifically the reading beam, should be perpendicular to the diffractive surface during the reading operation. However, since the reader is hand held this condition is unlikely to be met exactly. A certain amount of angular misalignment in the positioning of the head can be tolerated by using a suitably convergent reading beam. This is illustrated in the reading apparatus shown in FIG. 20, where the angle of convergence of the reading beam is Ψ, as shown. Consequently the direction of the reader head need only lie within ±Ψ of perpendicular to the diffractive surface for at least some of the incident reading beam to be oriented correctly. In addition, in the case of the abovedescribed multiple blazed gratings, the single slit diffraction effects (described above), which occur during reflection from each facet in a multiple blazed grating, cause an angular divergence in the reflected light, and this will also allow some tolerance in the angular alignment of the reader head. In the case of the abovedescribed Pixelgram gratings, the diffracted beams are also usually divergent, thus allowing some tolerance in the angular alignment of the reader head.

Figure 21B:
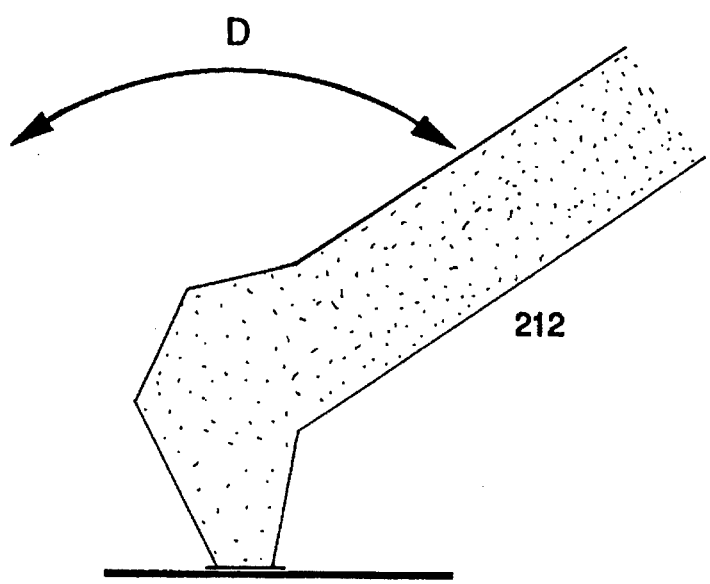
FIG. 21(b) is a schematic side elevation of a reading device.

An alternative technique to account for angular misalignment (see FIG. 21(b)) of a hand held reader head is to use a "self-aligning" hand held reader head. This simply refers to the use of a "floating" head on the hand held reader. This floating head will, when pressed against the surface of the diffractive structure, rotate or otherwise move to automatically assume the correct angular orientation. Small wheels or rollers could be incorporated into the base (i.e. the contact surface) of the floating head to allow repeated reading of a diffractive structure with minimal scratching.

It should be noted that the reading techniques described above in relation to FIGS. 13, 14, 15 and 20 result in automatic authentication of a diffraction bar code each time it is read by confirming that the diffractive properties incorporated into the diffractive strips of the diffraction bar code are correct. This authentication can be made very reliable since the diffractive structures used in the diffraction bar code and similar applications can be specifically designed to provide unique diffractive properties which are not produced by existing grating designs and are therefore not utilised in other applications.

Alternatively, the detection technique described above in relation to FIGS. 13, 14, 15 and 20 could for example be used simply to authenticate an area of diffractive structure as having the correct diffractive properties. This could be applicable, for example, if areas of reflective foil incorporating such diffractive structures are attached to documents or objects as security devices to allow confirmation that the document or object is authentic.

The following describes techniques for recording data in diffraction bar code and stored value optical memories.

Figure 24:
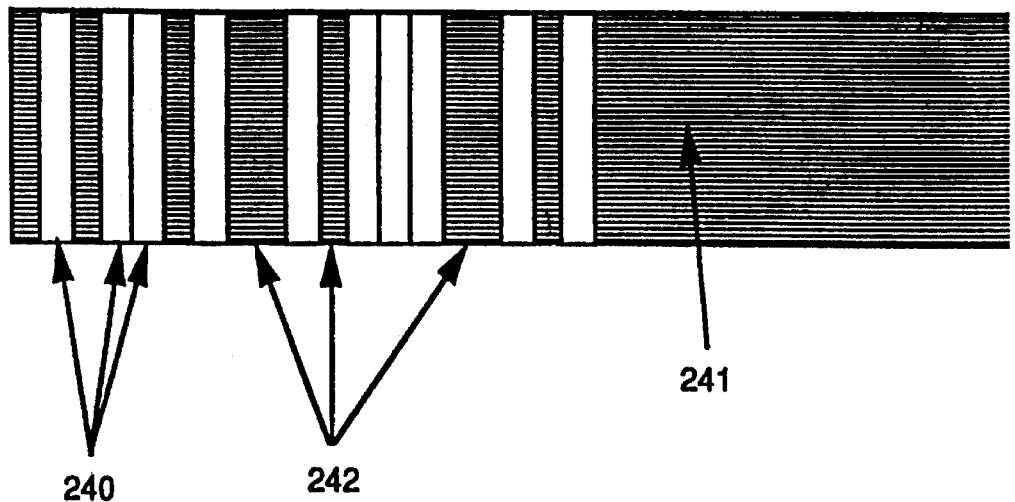
FIG. 24 is a schematic illustration of the general principle underlying some of the mechanical and optical techniques described herein for recording diffraction bar codes.

FIG. 24 is a schematic illustration of a partly recorded diffraction bar code and is intended to illustrate the general principle behind some of the techniques described below for recording diffraction bar codes. As described above, a diffraction bar code is made up of a sequence of parallel diffractive and non-diffractive strips. In the recording techniques described below, the non-diffractive strips 240 illustrated in FIG. 24 are recorded on a large "background" diffraction grating 241. This background diffraction grating could for example be an abovedescribed multiple blazed grating or an abovedescribed Pixelgram grating. The recorded non-diffractive strips 240, in conjunction with the remaining diffractive strips 242, make up the diffraction bar code. This general technique is usually preferable to the converse technique of recording the diffractive strips on a non-diffractive background, since it is easier to implement and has the further advantage of retaining foil production in a centralised location. This latter point is important since the foil production process requires access to the techniques used to incorporate the security features—in the form of specialised diffractive structures—into the diffractive medium which is usually in the form of a foil.

Figure 25:
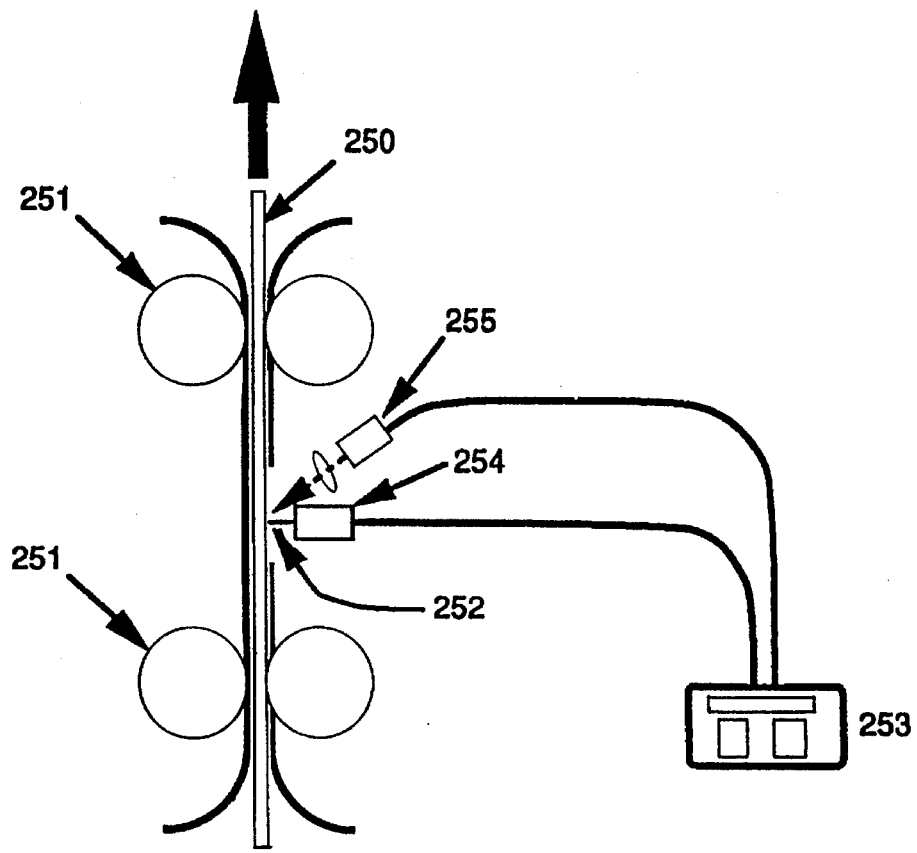
FIG. 25 is a schematic illustration of a stamping technique for recording diffraction bar codes and stored value memories.

FIG. 25 is a schematic illustration of a technique for recording reflective diffraction bar codes. The recording apparatus is shown viewed from above. It is assumed in FIG. 25 that the optical memory medium is incorporated into a data card 250, although this need not be the case. As described above in relation to FIG. 24, prior to recording the reflective diffraction bar code, the optical memory medium includes a single reflective diffraction grating previously recorded in the medium. This reflective diffraction grating forms a diffractive "background" for recording of the reflective diffraction bar code. The card 250 containing the optical memory medium is held and moved through the recording apparatus in a controlled manner. For example, the movement could be controlled by one or more pairs of rubber rollers 251 which control movement of the card through a slot. As the memory medium is moved through the apparatus, a stamping head 252 is controlled by an electronic control unit 253 to stamp a sequence of parallel, blank, non-diffractive strips into the "background" diffraction grating, thereby forming a diffraction bar code made up of the stamped non-diffractive strips and the remaining diffractive strips. The stamping process is designed to physically destroy—or de-emboss—a region of the "background" reflective diffraction grating. The stamping head 252 is a narrow blade, and when viewed from above appears as a thin line, as shown in FIG. 25. Movement of the stamping head is actuated by a driver unit 254 which responds to signals from the electronic control unit 253. For the stamping process to be effective the memory medium may need to be heated to facilitate plastic deformation in the region of the stamping head. The heating could, for example, be carried out by illuminating the region to be stamped with intense light from a laser such as the semiconductor laser 255. A continuous beam of light could be used, but pulses of light may be preferable since their use would confine the heating to a short period of time when stamping occurs, thereby avoiding problems due to heating of the rest of the memory medium or other parts of the data card. The stamping process may be further assisted by vibration of the stamping blade in a direction along the length of the blade. Stamping of a single blank non-diffractive strip could therefore occur as follows. The heating laser 255 emits one or more pulses of light which heat the region to be stamped. Immediately following this the stamping head 252 stamps a blank non-diffractive strip into the memory medium (the blade may be vibrated to assist this process), flattening or de-embossing the diffraction grating previously recorded in the medium and therefore destroying the diffractive property in the stamped region. Both the heating user 255 and the stamping head 252 are controlled by the electronic control unit 253 to produce a series of non-diffractive strips as the data card 250 is moved through the recording apparatus. These non-diffractive strips, along with the remaining diffractive strips, form a diffraction bar code sequence indicative of the information to be recorded in the diffraction bar code optical memory. Hence this recording process records the non-diffractive strips on a diffractive "background".

Figure 26A:
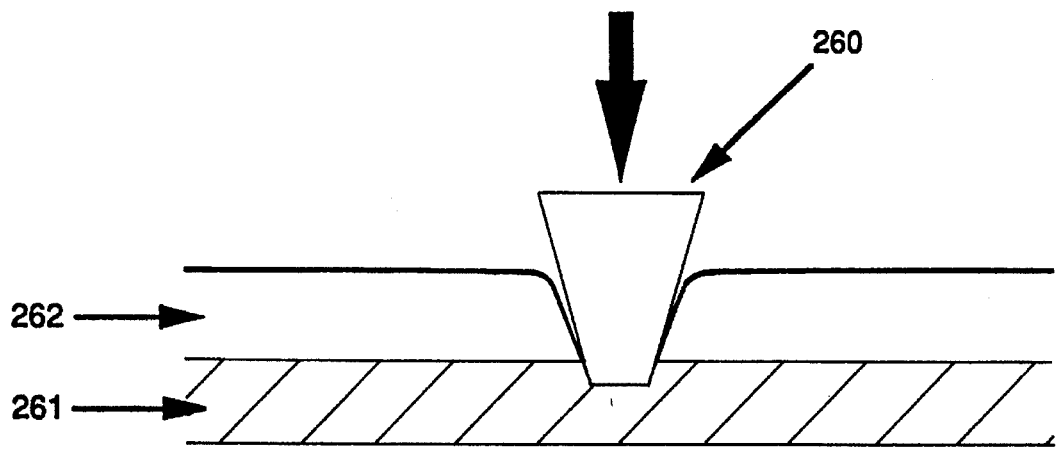
Figure 26B:
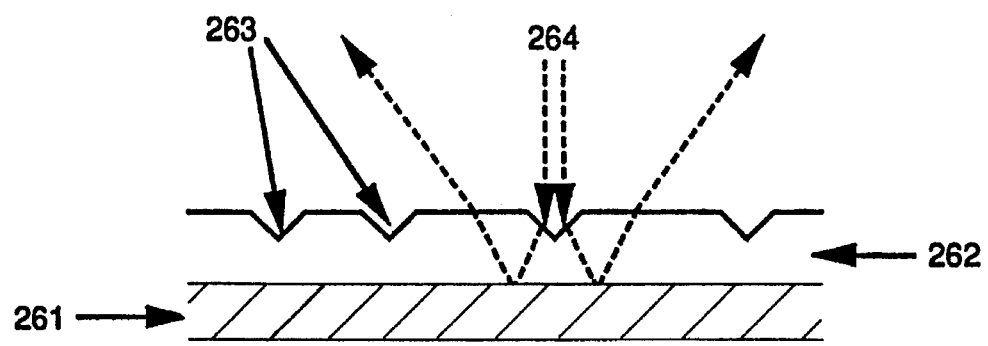
FIG. 26(b) illustrates a variation on the stamped non-diffractive strips.

Operation of the stamping head 252 in FIG. 25 is illustrated in more detail in FIG. 26(*a*), which is a schematic illustration of the stamping head 260 viewed end-on—i.e. the same view as is shown in FIG. 25. It should be understood that the stamping head is actually a thin blade which, when view end-on, could look as shown in FIG. 26. Commonly the background diffraction grating 261, on which the non-diffractive strips are stamped, will be coated with a thin transparent protective layer 262 during production. Ideally the stamping head 260 will penetrate the transparent protective layer 262 to physically destroy the diffraction grating in the stamped region, thereby resulting in a non-diffractive strip. However, it may not be necessary for the stamping head 260 to physically destroy part of the background diffraction grating 261. An alternative technique could involve damaging the transparent protective coating 262 sufficiently to disrupt the transmission of a light beam 264 through the coating 262 to the diffraction grating 261 and out again through the coating 262. It may be possible to achieve this disruption simply by roughening, scratching or grooving the protective coating 262—a process which may be assisted by vibrating the stamping head in the lengthwise direction (i.e. parallel to the blade and perpendicular to the page in FIG. 26) at high frequency during the stamping process. FIG. 26(*b*) is a schematic illustration of part of a recorded diffraction bar code in which the non-diffractive regions 263 are simply V-grooves (viewed end-on) in the surface of the transparent protective layer 262 and consequently the beams diffracted from the background diffraction grating 261 will not be directed to the optical detectors in a reading device. In this technique it is advantageous for the protective layer 262 to have a refractive index which differs as much as possible from that of air, in order to maximise the refractive disturbance to the reading beam 264.

Figure 27A:
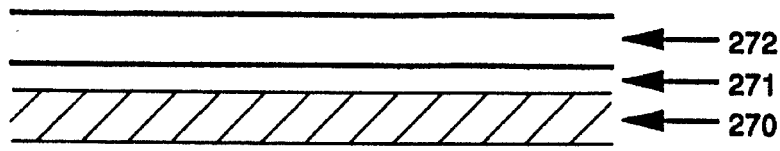
FIG. 27(a) is a schematic side elevation of a diffraction foil.
Figure 27B:
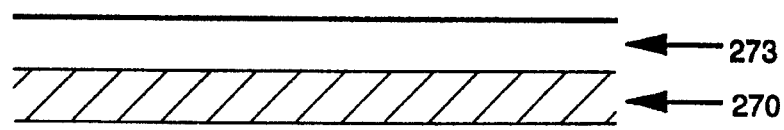
FIG. 27(b) is a schematic side elevation of a further diffraction foil.
Figure 27C:
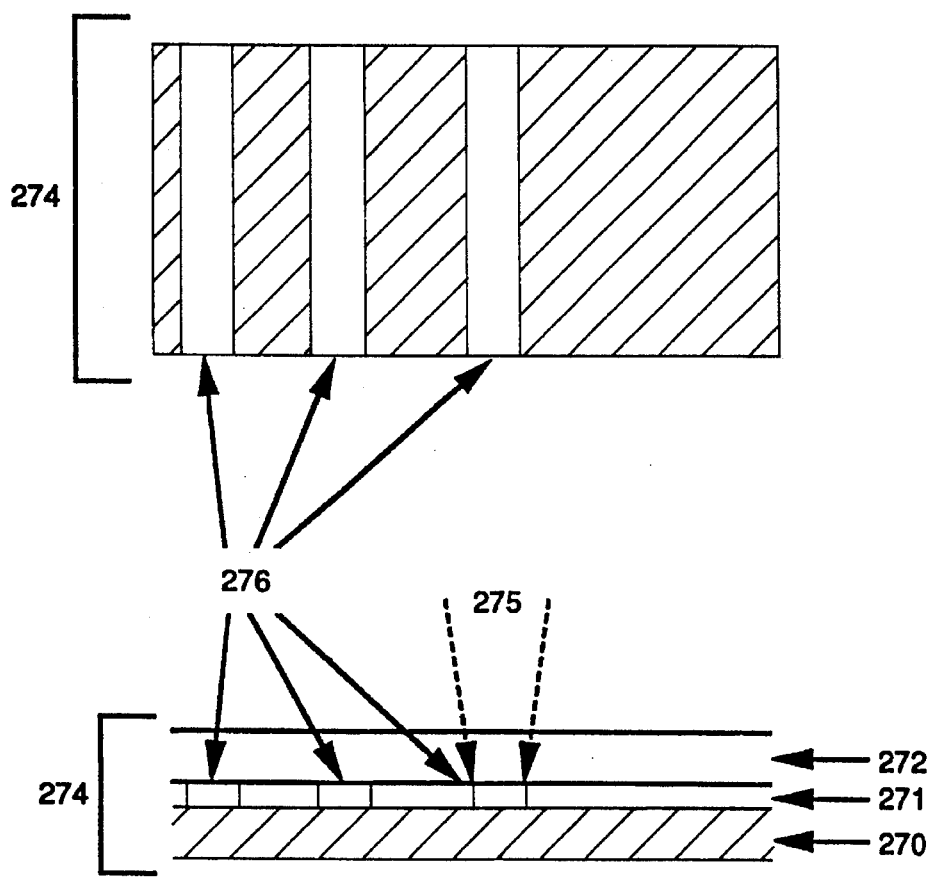
FIG. 27(c) is a schematic plan view and side elevation of a further diffraction foil.

An alternative all-optical technique for recording diffraction bar code data utilises a new photosensitive optical memory medium. FIG. 27 is a schematic illustration of the new photosensitive optical memory medium allowing optical recording of diffraction bar codes, and the general method of recording diffraction bar codes in said photosensitive memory medium. The photosensitive optical memory medium is a thin the bottom layer of which is a reflective diffraction grating. Over this diffraction grating layer are placed one or more layers which perform the functions of protecting the diffraction grating from mechanical damage and providing a means for a recording light source such as a laser to write opaque regions in this case in the form of parallel strips. Two preferred embodiments of the photosensitive optical memory medium are shown in cross section in FIGS. 27(*a*) and 27(*b*). In FIG. 27(*a*) the reflective diffraction grating 270, which could be a grating of one of the types described herein, is covered by a photosensitive layer 271 which is characterised by the fact that it can be made opaque to a reading beam by exposure to a suitable recording light beam, and the photosensitive layer 271 is covered by a transparent protective 272. In FIG. 27(*b*) the reflective diffraction grating 270, which could be a grating of one of the types described herein, is covered by a transparent protective layer 273 which is photosensitive, so that the layer 273 can be regarded as a combination of layers 271 and 272. In both cases the photosensitive material in its unrecorded state is designed to be transparent to light at the wavelength used to read the diffraction bar codes or other Information recorded in the photosensitive foil. Light at a different recording wavelength is used to record data in the photosensitive optical memory medium. At the recording wavelength the photosensitive material is designed to be absorptive in its unrecorded state, so that when illuminated by light from a recording light source the photosensitive material absorbs energy and undergoes an irreversible change causing it to become opaque to light at the reading wavelength. This change could occur for example by heating. The photosensitive layer could for example be made from a suitably designed polymer material. The protective layers 272 and 273 should preferably be made of a material with a refractive index as close as possible to that of air, in order to minimise any refractive disturbances to an incident light beam resulting from scratches and other surface irregularities. FIG. 27(*c*) illustrates the general method of recording diffraction bar codes in said photosensitive optical memory medium, and uses as an example the medium illustrated in FIG. 27(*a*). The memory medium 274 is shown in cross section and in a view from above. A recording beam 275 is to record opaque strips 276 in the photosensitive layer 271. The opaque strips 276 impede an incident reading beam in penetrating to, and being diffracted from, the diffraction grating layer 270, and hence act as non-diffractive strips in a diffraction bar code sequence. It should be appreciated that a transmissive photosensitive diffraction fell, analogous to the reflective photosensitive diffraction foil illustrated in FIG. 27, could also be utilised, with the only difference between the two foil types being the diffractive layer (270 in FIG. 27) which can be either reflective (as in FIG. 27) or transmissive.

Figure 28:
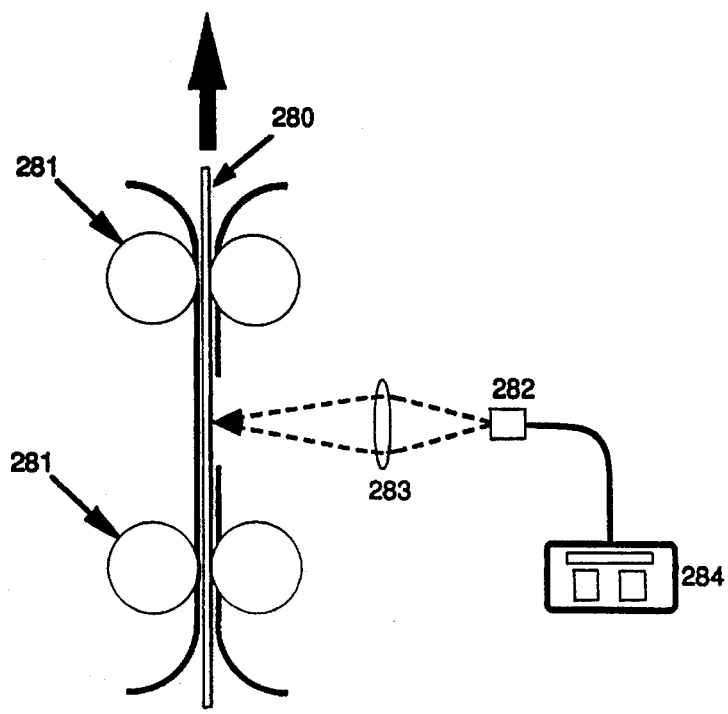
FIG. 28 is a schematic illustration of an optical technique for recording reflective diffraction bar codes in the photosensitive diffraction foil illustrated in FIG. 27.

FIG. 28 is a schematic illustration of a technique used to optically record diffraction bar codes or stored value data in the photosensitive optical memory medium described above in relation to FIG. 27. In FIG. 28 the recording apparatus is shown viewed from above. It is assumed in FIG. 28 that the optical memory medium is incorporated into a data card 280, although this need not be the case the memory medium may be incorporated into some other type of document. The card 280 containing the optical memory medium is held and moved through the recording apparatus in a controlled manner. For example, the movement could be controlled by one or more pairs of rubber rollers 281. As the memory medium is moved through the apparatus, a recording laser 282 is switched on and off to produce pulses of light. Each pulse of light is focused by a lens arrangement 283 to a narrow strip at the optical memory medium, with the narrow strip being perpendicular to the direction of card motion (and therefore also perpendicular to the page). As the card 280 moves through the recording apparatus the recording laser 282 is switched on and off by control electronics 284 to produce a series of parallel opaque, and therefore non-diffractive, strips in the photosensitive layer 271 or 273 (shown in FIG. 27) immediately above the reflective diffraction grating 270, thereby forming a diffraction bar code or stored value memory made up of these non-diffractive strips and the remaining diffractive strips.

The above mechanical and optical recording techniques could be carried out either with or without the optical memory medium incorporated into a data card. The above descriptions assume that the memory medium has been incorporated into a card, but this need not be the case.

Figure 29:
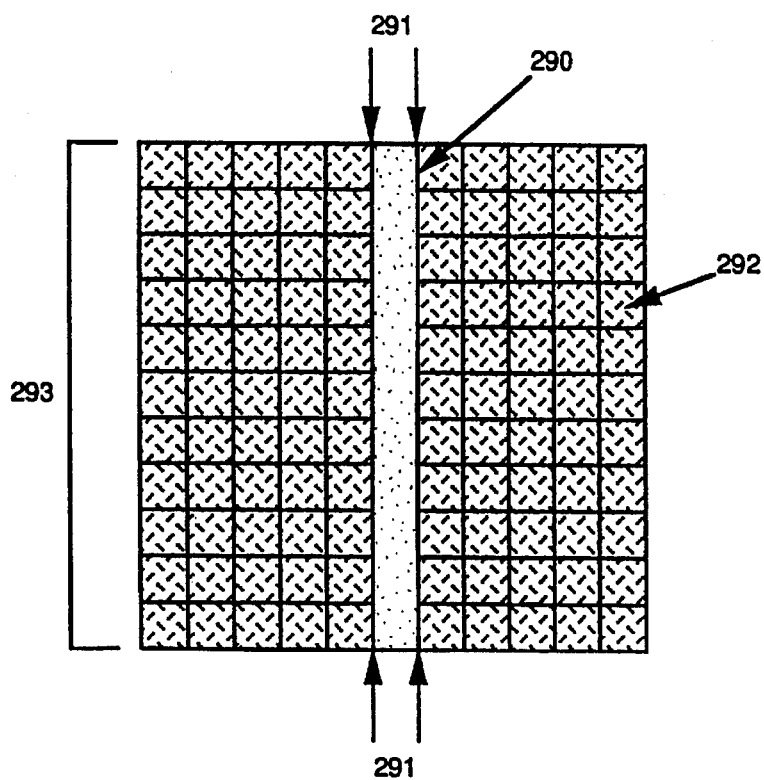
FIG. 29 is a schematic illustration of the general configuration of a non-diffractive strip recorded on a Pixelgram grating.

In the case where the abovementioned "background" diffraction grating is an abovedescribed Pixelgram diffraction grating, an additional consideration applies during the process—whether mechanical or optical —of recording data in the form of a diffraction bar code or a stored value memory utilising such a background grating. As described above, the Pixelgram diffraction grating in the diffraction bar code application will consist of a "checkerboard" layout of pixels. As illustrated in FIG. 29, it is important that during the data recording process the non-diffractive strips 290 are aligned with the edges 291 of the columns of the abovedescribed basic units 292 in the background Pixelgram diffraction grating 293. This is necessary since a portion of a pixel will result in a different diffracted beam pattern from a complete pixel, and hence if the recording process is not aligned with the columns of said basic units, errors may result subsequently during the reading process.

Figure 30:
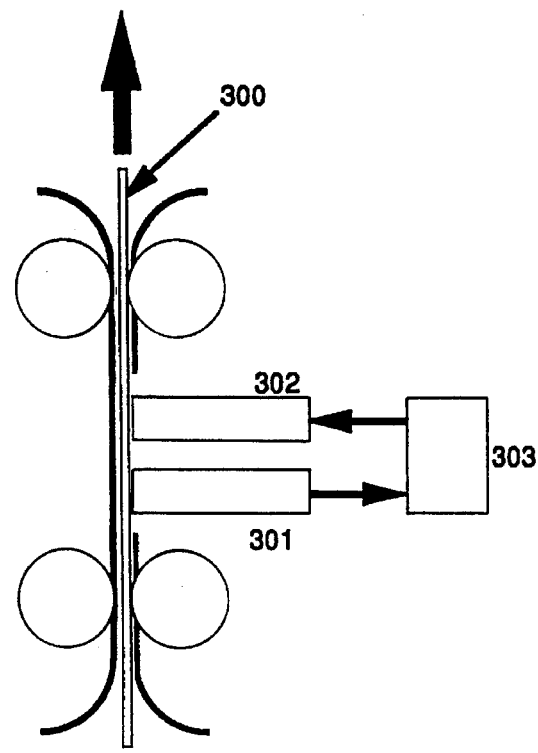
FIG. 30 is a schematic illustration of the general technique for recording diffraction bar codes and stored value memories in a Pixelgram diffractive surface.

Hence in the case of a Pixelgram diffraction grating, the data recording technique must include a means to determine the absolute position of the background diffraction grating relative to the recording device. This is illustrated in block diagram form in FIG. 30 for a general data recording device. As in the above descriptions of the recording techniques, it is assumed that the optical memory medium is incorporated into a data card, although this need not be the case. The card 300 is held and moved through the write-once apparatus in a controlled manner, as described above in relation to FIGS. 25 and 28. The reading apparatus 301 reads the background Pixelgram diffraction grating incorporated into the card 300, thereby establishing the position of the Pixelgram relative to the recording apparatus 302. The electronic control unit 303 uses the position information obtained from the reading apparatus 301 to control the recording apparatus 302, adding the new data to the pixelgram optical memory in the correct location—i.e. such that the recorded non-diffractive strips are aligned with the edges of the pixel columns as shown in FIG. 29. The reading and recording apparatus could be of the types described herein.

Figure 31:
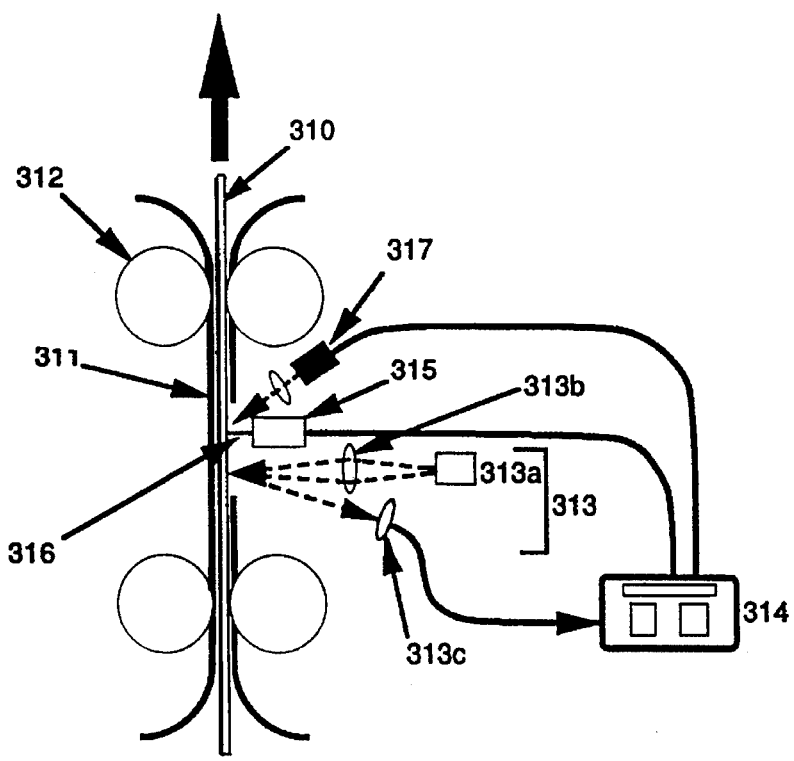
FIG. 31 is a schematic illustration of a stamping technique for recording diffraction bar codes and stored value memories in a Pixelgram diffractive surface.

FIG. 31 illustrates the data recording technique for a Pixelgram diffraction grating as described above in relation to FIG. 30 for the case of the mechanical data recording technique described above in relation to FIGS. 25 and 26. It is assumed in FIG. 31 that the Pixelgram diffraction grating is incorporated into a card or document 310. The card or document 310 is held by the apparatus and moved at a uniform speed through a slot 311. This could be achieved for example by one or more pairs of rubber rollers 312, as shown. A reader device 313, of the general type described herein, reads the Pixelgram diffraction grating on the card or document 310, thereby establishing the position of the grating relative to the recording apparatus. (Note that in FIG. 31 the reading device 313 is illustrated in simplified form—consisting of a reading laser 313a, focusing optics 313b and only one optical detector 313c.) The reading device 313 relays information concerning the Pixelgram grating position to the control electronics 314, which actuates the stamping head control unit 315 and hence the stamping head 316 to stamp non-diffractive strips aligned with the edges of the pixel columns on the Pixelgram diffraction grating, as described above in relation to FIG. 29. A heating laser 317 may be used to heat the region being stamped, as described above in relation to FIG. 25. The stamping head 316 will have a width equal to an integral number of widths of the abovedescribed basic units of the Pixelgram surface. The stamped non-diffractive strips and remaining diffractive strips form a bar code sequence, as described above.

Figure 32:
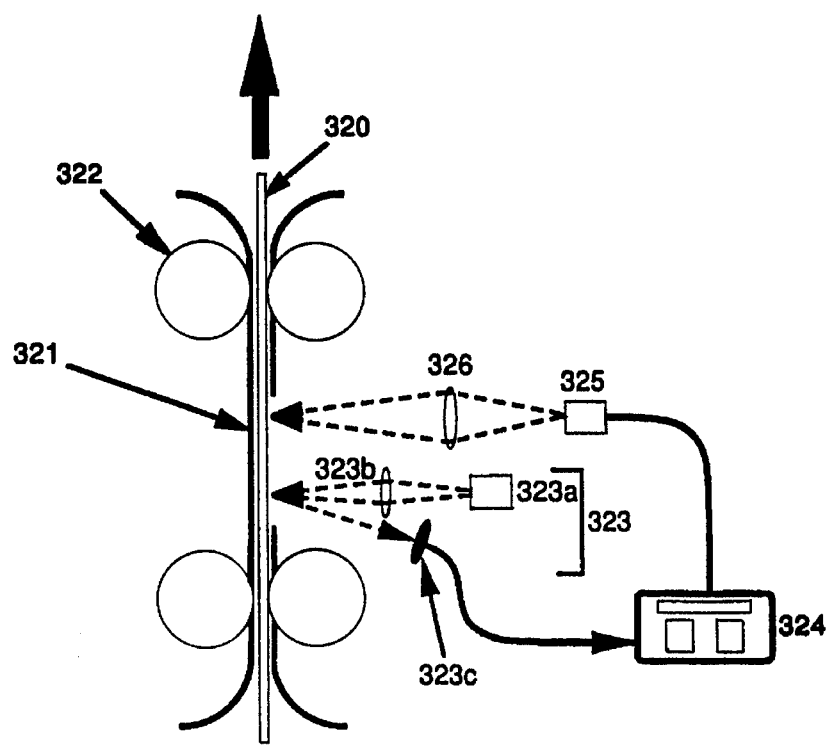
FIG. 32 is a schematic illustration of an optical technique for recording diffraction bar codes and stored value memories in a Pixelgram surface.

An analogous modification applies to the optical data recording technique described above in relation to FIG. 28. FIG. 32 illustrates the all-optical data recording technique for the case of a Pixelgram diffraction grating. It is assumed in FIG. 32 that the Pixelgram diffraction grating is incorporated into a card or document 320. The card or document 320 is held by the apparatus and moved at a uniform speed through a slot 321. This could be achieved for example by one or more pairs of rubber rollers 322, as shown. A reader device 323, of the general type described herein, reads the Pixelgram diffraction grating on the card or document 320, thereby establishing the position of the Pixelgram grating. (Note that in FIG. 32 the reading device 323 is illustrated in simplified form—consisting of a reading laser 323a, focusing optics 323b and only one optical detector 323c.) Information concerning the position of the Pixelgram grating is relayed to an electronic control unit 324 which actuates the recording laser 325 to produce pulses of light at the appropriate recording wavelength. These pulses of light are focused by the focusing optics 326 to a strip at the card or document 320, thereby recording non-diffractive strips aligned with the edges of the pixel columns on the Pixelgram diffraction grating. The focused recording beam will have a width at the Pixelgram surface equal to an integral number of widths of the abovedescribed basic units of the Pixelgram surface. The optically recorded non-diffractive strips and remaining diffractive strips form a bar code sequence, as described above. In the case of the optical recording technique, the reading and recording functions can be performed by a single read/erase head, as described below in relation to FIG. 36.

As described above, the diffraction bar code technology forms the basis for either read-only or write-once optical memories. The principle of operation behind the write-once memory technology is represented schematically and in block diagram form in FIG. 33. It is assumed in FIG. 33 that the optical memory medium is incorporated into a card, although this need not be the case. The card 330 is held and moved through the write-once apparatus in a controlled manner, as described above in relation to the data recording techniques. The reading apparatus 331 reads the contents of the optical memory on the card 330, thereby establishing the end point of the previously recorded data and hence determining the start point for the new data to be added. The electronic control unit 332 uses this information to control the recording apparatus 333, adding the new data to the optical memory beginning at the previously established start point. The reading and recording apparatus could be as described herein. A blank "guard band" may be left between the end of the previously recorded data and the start point for the new data, to avoid alignment problems. Also, each separately recorded data sequence may end with a unique code identifying the end of the sequence this would assist in write-once operation by making it easier to determine the end point for previously recorded data.

Figure 33:
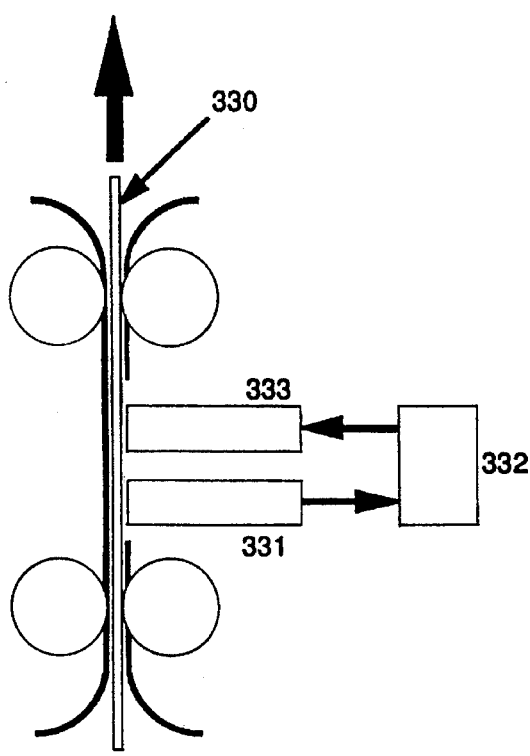
FIG. 33 is a schematic illustration of the general write-once technique for diffraction bar codes and stored value memories.

The technique illustrated in block diagram form in FIG. 33 is essentially the same as the technique illustrated above in FIG. 30. Consequently the write-once data recording apparatus for the mechanical and all-optical data recording techniques is essentially the same as described above in FIGS. 31 and 32 respectively, which figures refer to data recording on a Pixelgram diffraction grating. In both cases the apparatus includes a reading device which will be configured to read previously recorded data, and thereby determine the position on the diffraction bar code memory at which further data recording should commence.

In the case of the write-once data recording technique for a Pixelgram diffraction bar code, the reading device incorporated into the write-once apparatus must be able not only to read previously recorded diffraction bar code data, but also to read the Pixelgram diffraction grating in the unrecorded portion of the diffraction bar code memory in order to ensure that further data recording is aligned with the background Pixelgram grating, as described above.

The diffraction bar code technique is well suited to stored value systems which utilise stored value memories. A stored value system is one in which the user purchases a stored value memory device which represents usage of some service or facility up to a certain value. A good example can be found in many telephone systems, where users can purchase a stored value card which allows usage of the telephone system up to a specified value.

As described above, a stored value memory is decremented as the service or facility to which the memory provides access is used. Hence the stored value memory can be thought of as gradually being erased until finally the entire stored value memory is completely erased and is no longer usable. The diffraction bar code technology described herein is well suited to use as a stored value memory. Instead of being recorded with bar code data, a diffraction bar code memory when used as a stored value memory is decremented by successively recording adjacent non-diffractive strips via one of the data recording techniques described herein until the diffraction bar code memory has been entirely recorded with non-diffractive strips.

It should be appreciated that any of the diffraction bar code techniques described herein can readily be adapted for use as a stored value memory. The reading and data recording techniques used in the stored value application will be as described herein depending on whether or not a Pixelgram diffraction grating is utilised and whether a mechanical or all-optical data recording technique is utilised—the type of data recording technique depends on the type of diffraction grating medium, and specifically on whether or not the photosensitive optical memory medium described herein is utilised.

A region of a stored value memory corresponding to a single unit of value is referred to as a unit of said stored value memory. In a stored value memory the data recording process consists of decrementing the value of the memory and so is referred to herein as erasing. Hence a unit of a stored value memory which has been recorded is said to have been erased. The unerased portion of a stored value memory represents the remaining value of the stored value memory. Units of a stored value memory are erased as the stored value memory is used, until finally all of the stored value memory is erased.

When used as a stored value memory, the diffraction bar code technology in its preferred forms has four principal features which provide advantages over existing stored value memory technologies. These are:

the diffraction bar code technology can provide very high security against copying, forging and imitation through the use of specialised diffractive structures as described herein;

the diffraction bar code technology provides a high density of stored value units, making the technology generally more versatile and suitable for a wider range of applications;

the erasing process is permanent and cannot be reversed—this is very important and is especially true with the mechanical erasing technique;

the costs associated with the diffraction bar code technology are low.

The following describes an optical stored value system based on the abovedescribed photosensitive diffraction bar code optical memory. It should be appreciated, however, that this is only one example of a stored value system based on the diffraction bar code technology, and that other stored value systems could readily be adapted from the abovedescribed diffraction bar code technology—for example based on the abovedescribed mechanical diffraction bar code data recording technique. It should also be appreciated that the new techniques introduced herein, such as for example the combined read/erase head which moves along a guide rail relative to a stationary stored value optical memory, can readily be adapted to the abovedescribed diffraction bar code techniques.

Figure 16:
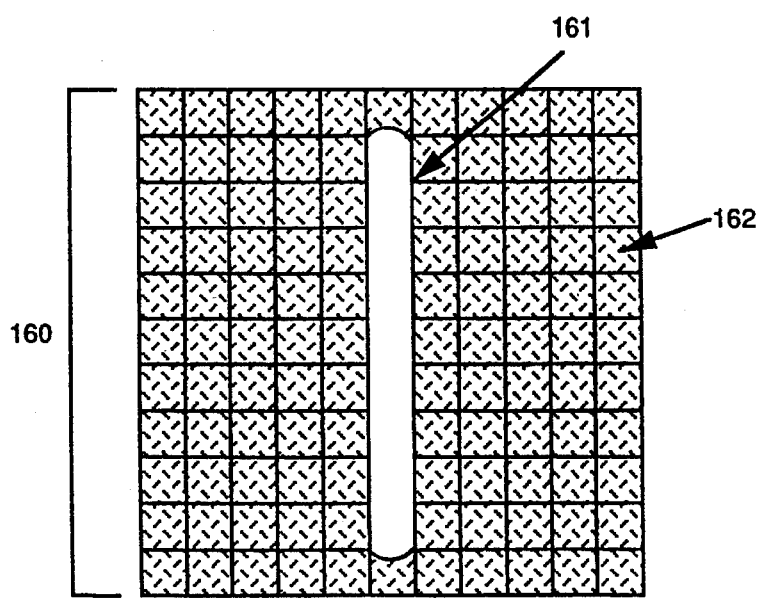
FIG. 16 is a schematic illustration of a possible configuration for a reading beam spot as used to read a Pixelgram grating.

Furthermore, as a general comment it should be noted that the abovedescribed Pixelgram diffraction grating has an advantage in relation to the stored value application in that the Pixelgram grating which is successively decremented, or erased, is at the time of production divided into a continuous sequence of stored value units corresponding to the pixel columns recorded on the surface of the Pixelgram grating, as illustrated in FIGS. 12 and 16. This has the advantage that the number of stored value units is fixed at the time of manufacture and is not subject to variation due to drift in the accuracy of the erasing apparatus.

The optical stored value system described herein utilises the photosensitive diffraction foil described above in relation to FIG. 27. The diffractive structure in such a photosensitive foil could be either of the multiple blazed grating type as described herein or of the Pixelgram type as described herein or of some other type such as a standard straight line diffraction grating or blazed grating.

The optical stored value memory described herein is assumed to be in the form of a card or document incorporating a diffraction foil—for example the photosensitive diffraction foil described herein—in the form of a narrow strip of said foil along said card or document.

Figure 34:
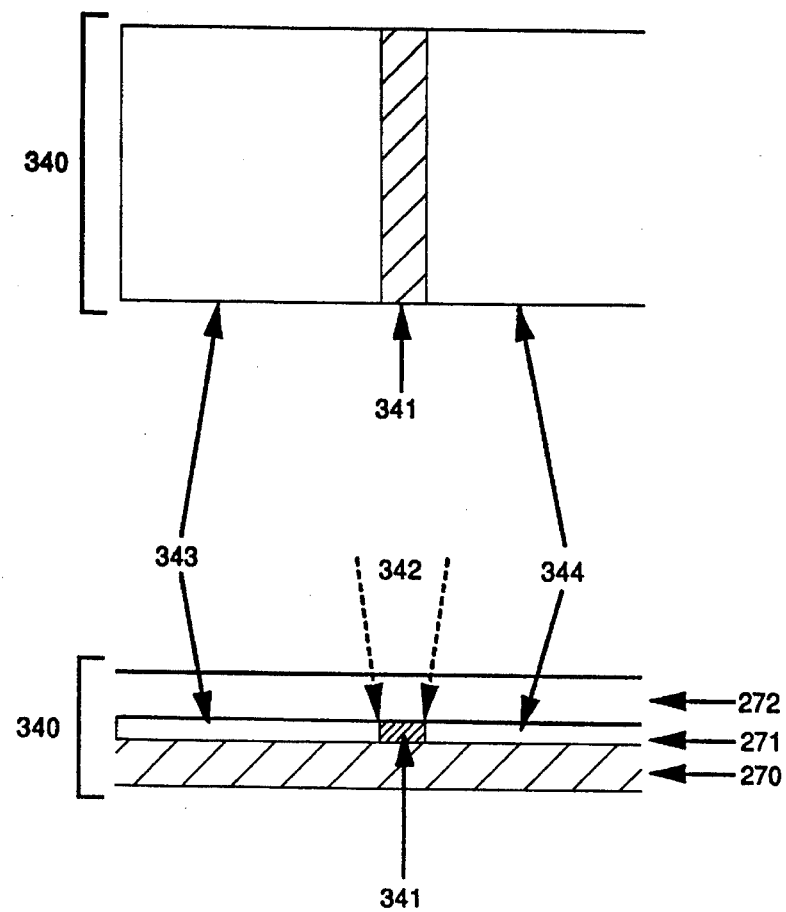
FIG. 34 is a schematic illustration of a new photosensitive diffraction foil and a technique for using said foil as a stored value optical memory.

FIG. 34 illustrates a preferred manner for decrementing the value of a stored value optical memory based on the photosensitive diffraction foil illustrated in FIG. 27. The unerased portion of a stored value memory represents the remaining value of the memory. Decrementing a stored value memory involves erasing a region of the memory depending on the value by which the memory is to be decremented. The decrementing process is carried out in multiples of the unit of value of the stored value memory. A region of the stored value optical memory corresponding to a unit of value is referred to as a unit. In FIG. 34 the stored value optical memory 340 is a long narrow band, a section of which is illustrated both in cross section and in front view. (The numerals 270, 271 and 272 have the same meanings as in FIG. 27.) Decrementing the value of the stored value memory 340 involves successively erasing parallel adjacent strips 341 by illuminating each strip with an erasing beam 342 at the erasing wavelength $W_E$, starting at one end of the memory 340 and proceeding to the other end as the memory is used. Each of the strips 341 represents a unit of value and is simply referred to as a unit. Hence the stored value optical memory will include an erased region 343 and an unerased region 344.

The strips 341 are perpendicular to the length of the long narrow band of optical memory medium 340. In this respect the erasing process is analogous to bar code recording, and has the advantage that it allows some tolerance in the lateral positioning of the memory 340 during the reading and erasing processes. The memory 340 no longer has any value when it has been entirely erased in this manner.

The capacity of a stored value optical memory based on the diffraction bar code technology, such as the stored value memory illustrated in FIG. 34, can be estimated as follows. A reasonable width for the strips 341 in FIG. 34 is 10 microns. Smaller widths are technically feasible taking into account the optical reading and erasing processes, and so 10 microns is a realistic figure. Each strip represents a single unit of stored value. Hence the density of stored value units will be 1000 per cm of stored value memory, and a single narrow band of stored value memory on a card the same size as a credit card could store in excess of 6000 units. This is very much greater than the capacities available from existing optical stored value memories. For example, one optical stored value system currently in use in some telephone systems provides only 120 units in a narrow band the length of a credit card.

Figure 35:
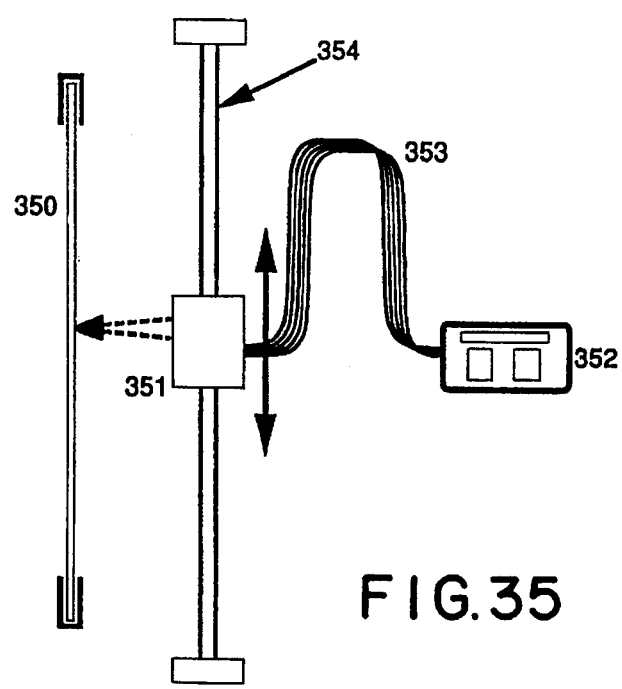
FIG. 35 is a schematic illustration of a technique for reading and erasing a stored value memory of the general type illustrated in FIG. 34.

FIG. 35 illustrates a view from above of a preferred embodiment of a read/erase device used in conjunction with the stored value card which is a card containing a narrow band of stored value optical memory. It is assumed that the stored value optical memory incorporated into the stored value card is of the type described above in relation to figures 27 and 34, and that the decrementing procedure described above in relation to FIG. 34 is utilised. The read/erase device shown in FIG. 35 operates as follows. The stored value card 350 is located and held in position. In FIG. 35 the stored value optical memory runs along the length of the card 350 and is therefore parallel to the page. Hence the strips (341 in FIG. 34), or units, in the stored value optical memory run perpendicular to the page. A read/erase head 351 is used to detect and erase the unerased units of the stored value memory. The read/erase head 351 is controlled by, and relays information to, the control electronics 352 via electrical leads 353. The read/erase head is described in more detail in FIG. 36.

The read/erase head 351 scans along the stored value memory on the card 350 by moving along the guide rail 354. When a stored value card 350 is first inserted into the read/erase device, the read/erase head 351 scans the stored value memory, starting at the unerased end and stopping as soon as the first erased unit is reached. In this way the control electronics 352 determines the number of unerased units in the stored value memory and hence the value remaining in the stored value card 350. The read/erase head then positions itself over the first unerased unit in the stored value memory, this being the unerased unit immediately adjacent to the last erased unit. As the read/erase device is operated, the read/erase head 351 begins sequentially erasing units according to instructions from the control electronics 352, starting with the first unerased unit and moving along the stored value memory as the erasing process proceeds.

Figure 36A:
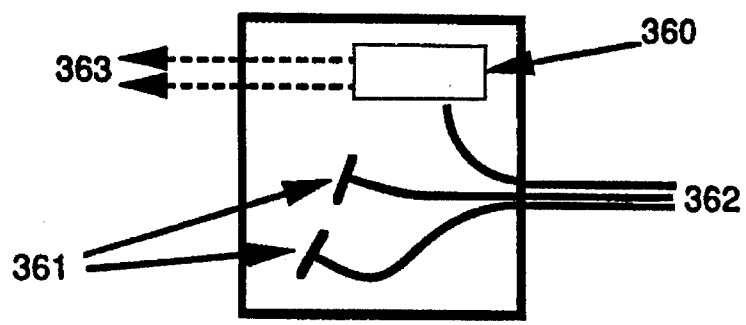
Figure 36B:
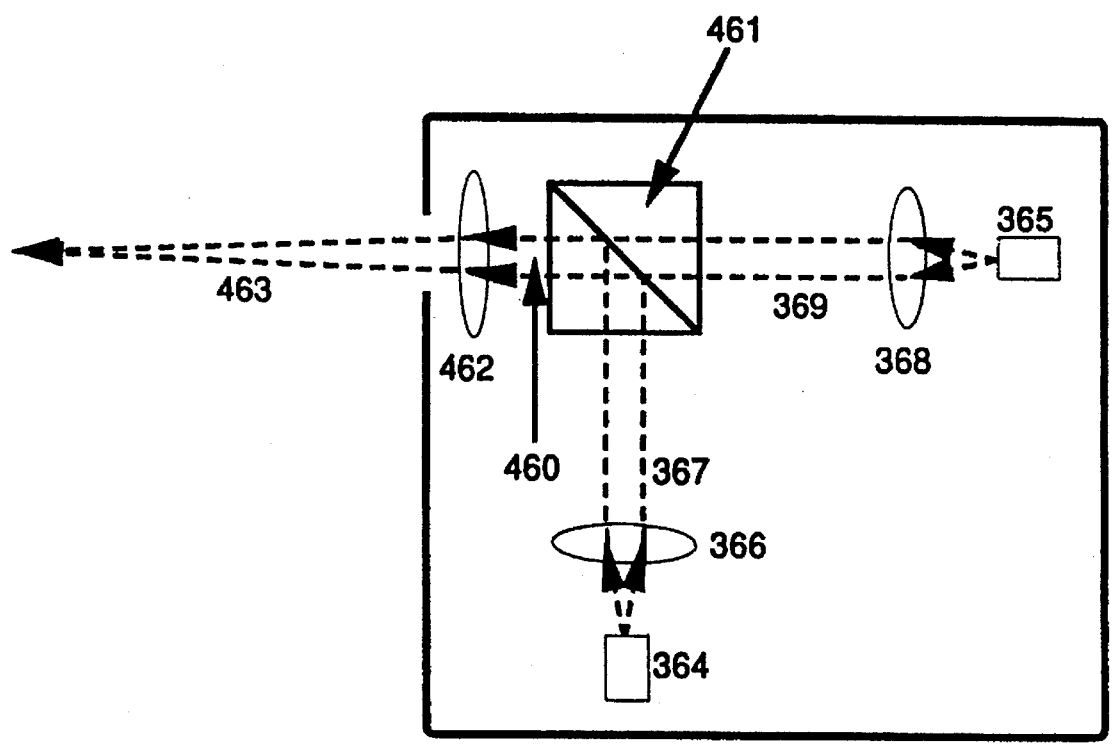
FIG. 36(b) is a schematic illustration of the key components included in the read/erase light source of the read/erase head illustrated In FIG. 36(a)

FIG. 36 illustrates a preferred embodiment of the read/erase head 351 shown in FIG. 35. FIG. 36(a) shows the read/erase head in side view, while FIG. 36(b) illustrates a preferred embodiment of the read/erase light source used in said read/erase head, as viewed from above.

As shown in FIG. 36(a), the read/erase head contains a read/erase light source 360 and a number of optical detectors 361 (in FIG. 36 only two optical detectors are shown—some read/erase heads will utilise more than two), and is controlled by the control electronics 352 shown in FIG. 35 via the electrical leads 362. The read/erase light source 360 can produce a laser output 363 at either the reading wavelength $W_R$ or the erasing wavelength $W_E$ or at both wavelengths simultaneously. During a scanning operation the read/erase head scans the stored value optical memory to detect unerased units. To do this the read/erase light source 360 produces a laser output 363 at the reading wavelength $W_R$, and the optical detectors 361 detect light diffracted from unerased units in the stored value memory and onto the optical detectors 361, as described above in relation to the reading techniques for diffractive surface structures of different types. During erasing, the read/erase head produces a laser output 363 at the erasing wavelength $W_E$. This output is direct to the stored value memory to erase unerased units. As described above, erasing occurs by transferring energy from the erasing light beam to the photosensitive layer in the stored value optical memory, thereby causing said layer to undergo a permanent change and become opaque to light at the reading wavelength $W_R$. In order to confine the energy transfer to the unit illuminated during the erasing procedure and to avoid heating of the surrounding material, the erasing laser could preferably be pulsed, i.e. switched on and off very rapidly.

The read/erase light source is illustrated in FIG. 36(b), which shows a view from above. It contains a reading laser 364 with an output wavelength $W_R$, and an erasing laser 365 with an output wavelength $W_E$. Both lasers will preferably be semiconductor lasers, which have the advantage of being compact and requiring little electrical power. Possible wavelengths for the lasers are 660 nm to 670 nm for the reading laser 364 and approximately 800 nm for the erasing laser 365, these wavelengths being accessible with commercially available low cost semiconductor lasers which provide sufficient output power. However, it should be appreciated that these wavelengths are examples only and that other wavelengths could be used.

The lens 366 is used to produce a collimated beam 367 from the output of the reading laser 364, while the lens 368 is used to produce a collimated beam 369 from the output of the erasing laser 365. The two collimated beams 367 and 369 are combined into a single beam 460 in a polarisation splitting cube 461, this being a well known device which can be used to combine two beams of orthogonal polarisations with virtually no loss. In general, the output from a semiconductor laser is almost completely plane polarised, and hence by aligning the polarisations of the reading and erasing lasers 364 and 365 correctly, the two beams 367 and 369 can be combined with almost no loss. The beams 367 and 369 are collimated for the beam combining process, and refocussed by a lens 462 (such as a cylindrical lens) on the output side of the cube 461 to produce a focused strip of light in the plane of the stored value optical memory. The difference in wavelengths between the reading and erasing lasers 364 and 365 will require that the optics for the reading and erasing beams be configured to focus both beams to a strip in the plane of the stored value optical memory foil. It should be appreciated that either or both of the reading and erasing lasers 364 and 365 could be switched on during normal usage of the read/erase device.

Fine positioning of the output beam 463 could be provided by a suitable micro-positioning mechanism, such as a solenoid movement control or a piezo-electric movement control (not shown), which could for example control the position and/or orientation of the output lens 462. The fine positioning control would be used to position the output beam 463 accurately over the next unerased unit in the stored value optical memory, and could be based on a feedback loop utilising the level of diffracted reading beam detected by the optical detectors 361 as the feedback signal. In this case coarse positioning of the output beam 463 would be provided by movement of the read/erase head 351 along the guide rail 354.

It should be appreciated that variations are possible on the stored value devices described above in relation to FIGS. 34, 35 and 36. For example, the above descriptions refer to a reflective diffraction foil, wherein the optical diffraction process occurs via a process of reflection. However, it should be appreciated that a similar stored value optical memory could be developed wherein the diffraction process occurs via a process of transmission of light through a diffraction foil. In other respects the operation and design of the stored value optical memory and associated read/erase device would be substantially as described herein, apart from the obvious differences resulting from the transmissive rather than reflective diffraction process.

The above techniques are described mainly in terms of a reflectrye diffraction process and hence refer mainly to reflective diffraction foils, diffraction bar code memories and stored value memories. The reflective technique is advantageous in circumstances where the diffraction bar code memory, or diffraction foil, is attached to an opaque object, since obviously a transmissive technique will not work such circumstances. Furthermore, the techniques for producing reflective diffractive surface structures are well developed for producing such objects as reflection holograms. However, there are a number of techniques which can in principle be adapted to produce either reflective or transmissive diffraction bar codes and optical stored value systems. Transmissive techniques are analogous to the abovedescribed reflective techniques but differ in that the diffractive or non-diffractive process occurs as light passes through the memory medium rather than being reflected from the medium. It should be appreciated that the reading processes in the case of a transmissive diffractive structure are analogous to the abovedescribed reading techniques for reflective diffractive structures, with the obvious differences resulting from the fact that in the case of a transmissive technique the diffracted beams are produced on the opposite side of the diffractive medium from the incident reading beam. The following describes two techniques which can in principle be utilised to record either reflective or transmissive optical memories.

Figure 37A:
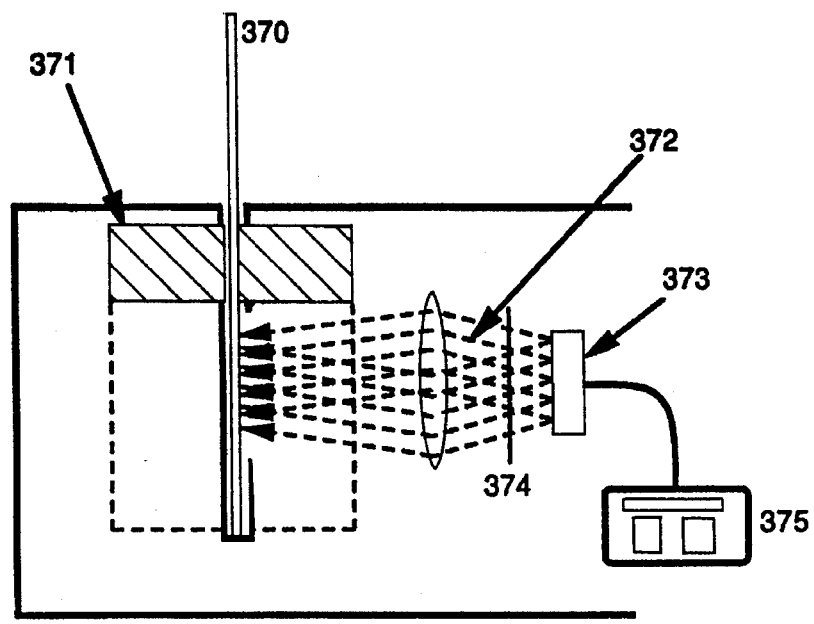
FIG. 37 is a schematic illustration of an optical technique for recording either reflective or transmissive diffraction bar codes or stored value memories.
Figure 37B:
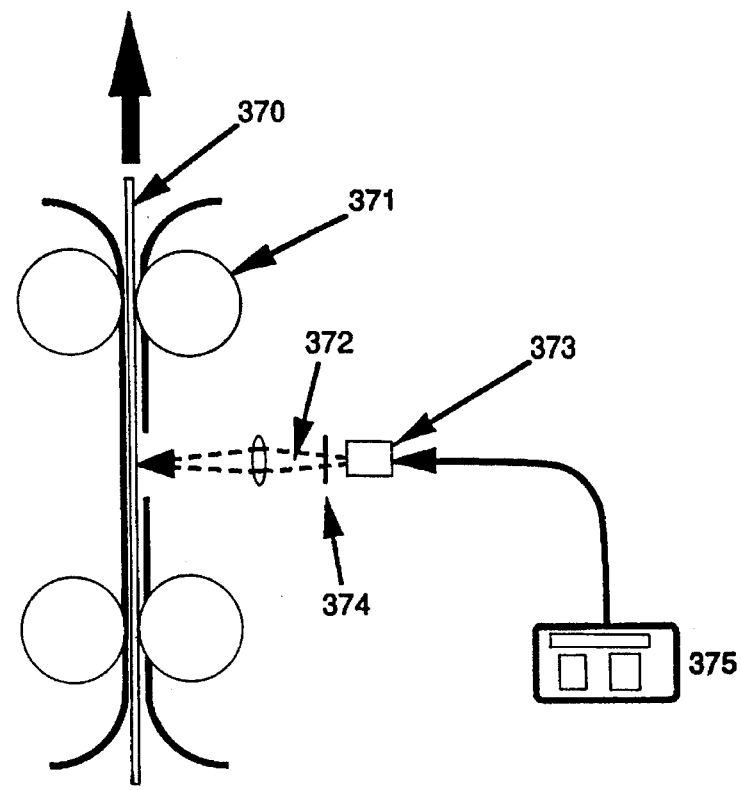

FIG. 37 shows a schematic illustration of a technique for optically recording a diffraction bar code or stored value memory which could in principle be either reflective or transmissive. In this technique the optical memory medium consists of a photopolymer or other suitable material which includes an intrinsic transmissive diffraction grating due to its molecular structure. This diffraction grating could be either reflective or transmissive depending on the material, so that in principle either a reflective or transmissive diffractive bar code memory or stored value memory could be recorded depending on the diffractive properties of the material. When exposed to an appropriate light beam, the photopolymer or other suitable material suffers "optical damage" which reduces or destroys the diffractive ability of the material in the "damaged" region. FIG. 37(a) shows the recording apparatus end-on, so that the optical memory medium moves into or out of the page during the recording process, while FIG. 37(b) shows the recording apparatus as viewed from above. In FIG. 37 it is assumed that the optical memory medium is incorporated into a card 370, although this need not be the case—the memory medium could for example be incorporated into a document of some type. The card 370 is held and moved through the recording apparatus in a controlled manner. For example, the movement could be controlled by one or more pairs of rubber rollers 371. The output 372 of a stationary light source is focused to a strip at the position of the memory medium on the card 370. In order to achieve high stored information densities, the focused strip will need to be very much longer than it is wide. To achieve the correct focused beam shape at the memory medium an array of semiconductor lasers 373 may be used as the light source, although a single semiconductor laser may be suitable in some applications. To obtain an accurate focused strip at the memory medium, a mask 374 may be placed at the output of the laser array 373, although this may not be required. As the memory medium on the card 370 is moved through the recording apparatus the laser array 373 is switched on and off by an electronic control unit 375 in a controlled manner so as to record a pattern of parallel non-diffractive strips (i.e. strips with reduced or destroyed diffractive ability) which in conjunction with the remaining diffractive strips form a diffraction bar code or stored value memory indicative of the information to be recorded in the optical memory medium on the card 370. Each of the strips recorded by the laser array 373 has reduced diffractive ability due to "optical damage" resulting from the optical beam 372 and as a result during the reading process does not cause significant diffraction of the reading beam onto the optical detectors in the reading apparatus. Hence this recording process records the non-diffractive strips in a diffractive "background" medium.

Figure 38:
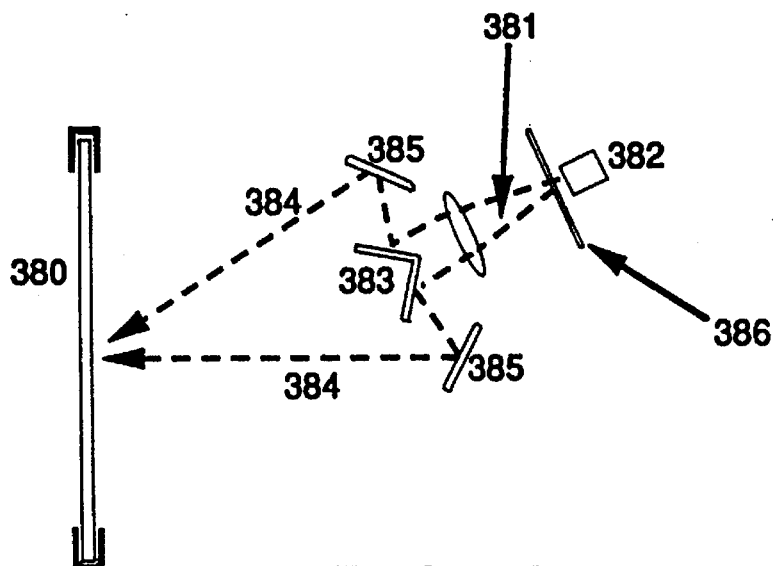
FIG. 38 is a schematic illustration of a technique for holographically recording diffraction bar codes.

FIG. 38 shows a schematic illustration of the second technique which in principle can be adapted for recording either reflective or transmissive diffractive bar code or stored value optical memories. In this technique the optical memory medium consists of a material into which a holographic diffraction grating can be written by interfering two or more light beams in the medium. FIG. 38 shows one possible configuration for a recording apparatus viewed end-on, so that the optical memory medium moves into or out of the page during the recording process. In FIG. 38 only two interfering beams are shown for simplicity, but it should be appreciated that more than two beams could be used during the recording process to produce a corresponding number of diffracted beams during the reading process, with the orientations of the diffracted beams dependent on the orientations of the interfering beams used during the recording process. The optical memory medium 380 is held and moved through the recording apparatus in a controlled manner. The output 381 of a stationary coherent light source 382 such as a semiconductor laser is separated via a beamsplitter 383 into two or more beams 384 which are brought together via mirrors 385 and focused to a strip at the position of the optical memory medium 380—in FIG. 38 the output of the light source 382 is separated into only two equal beams, but it should be appreciated that similar configurations can be employed to separate the output of the light source into a greater number of beams. A mask 386 similar to that shown in FIG. 37 could be placed at the output of the laser 382 in order to achieve an accurate strip shape for the interference pattern recorded in the optical memory medium 380, although this mask may not be necessary. As the memory medium 380 is moved through the recording apparatus the laser 382 is switched on and off in a controlled and predetermined manner so as to record a pattern of strips in the form of a bar code or some other pattern indicative of the information to be recorded in the optical memory medium 380. Each of the recorded strips contains a holographic diffraction grating which during the reading process results in diffraction of the reading beam onto one or more optical detectors. As described above, the number and orientations of diffracted beams produced during the reading process—and hence also the number and positions of the optical detectors in the reading apparatus—is governed by the number and orientations of interfering beams 384 used in the recording process. In this technique the recording process therefore records the diffractive strips on a non-diffractive background.

Figure 39:
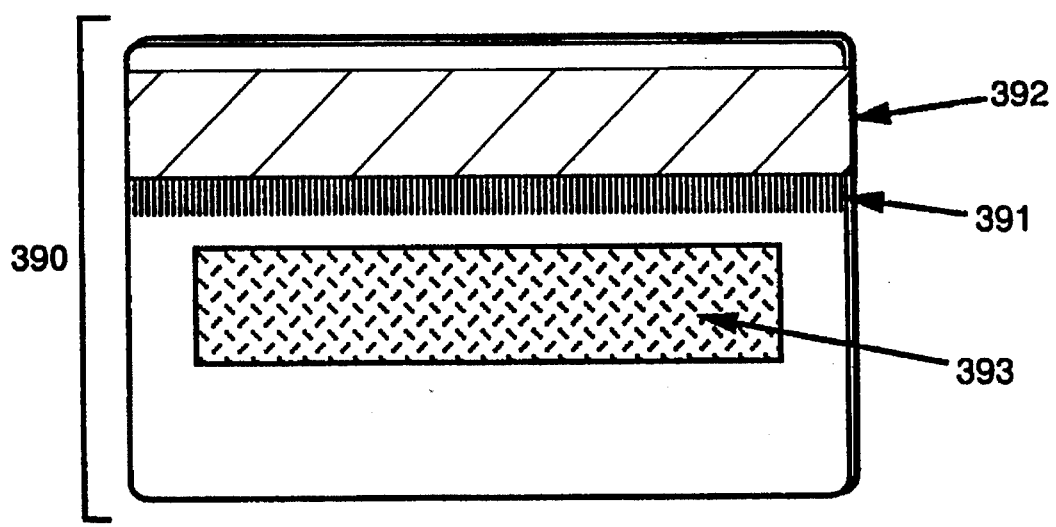
FIG. 39 is a schematic illustration of a possible layout for a hybrid card.

The diffraction bar code technology can be utilised in conjunction with other memory technologies to provide new technology solutions. For example, FIG. 39 illustrates a data card known herein as a hybrid card. The hybrid card 390 includes both a diffraction bar code optical memory 391 and a conventional magnetic stripe memory 392, and can be employed, for example, to overcome the fraud problems currently being experienced in the credit card industry. The diffraction bar code optical memory will most likely be in the form of a reflective foil attached to the card— the physical medium and means of attachment could for example be similar to that employed at present for reflection holograms on credit cards. Note that the diffraction bar code foil can in principle be attached in any position on the card where sufficient space exists. In the layout shown in FIG. 39, the diffraction bar code 391 is positioned between the magnetic stripe 392 and the signature panel 393, but it should be appreciated that other layouts are also possible. The diffraction bar code memory 391 retains the credit card information—and possibly also additional information—and provides card security since the diffraction bar code memory foil will include diffractive properties designed to prevent copying, forgery and imitation. The magnetic stripe also records the credit card information as at present and allows the hybrid cards to be read using either standard magnetic stripe card readers or hybrid card readers.

A typical hybrid card reader is illustrated in block diagram form in FIG. 40. FIG. 40 shows a swipe reader, although the same principles apply also to hybrid card insertion readers and hybrid card hand held readers. The hybrid card reader shown in FIG. 40 includes both a magnetic stripe reader 400 and a diffraction bar code reader 401— in FIG. 40 the diffraction bar code reader 401 is in front of and partially obscures the magnetic stripe reader 400. The diffraction bar code reader 401 will be as described herein and will be of the same class as the diffraction bar code memory used in the hybrid cards—the concept of "classes" of diffraction bar code memories is described herein. The hybrid card 402 is read as it is swiped through the card slot 403. As the card passes through the reading device, the magnetic stripe reader 400 and diffraction bar code reader 401 are able to read the data stored in the magnetic stripe and diffraction bar code memories respectively on the hybrid card 402, which data is transferred to processing electronics 404 for interpretation and further action.

In addition to the abovementioned credit card fraud, there is a growing problem with the fraudulent colour photocopying of travellers cheques and other valuable documents. This problem can be reduced or overcome via the use of an abovedescribed area of diffractive medium incorporated into such documents. The diffractive medium will be in the form of a thin foil attached to the document, with the foil incorporating a reflective or transmissive diffractive structure. In the case of a reflective diffraction foil, the presence of the foil can be detected via the use of one of the abovedescribed reading techniques which may be incorporated into a swipe reader or a hand held reader for example. In the case of a transmissive diffraction foil, the abovedescribed reading techniques can also be applied for example in the form of swipe readers or hand held readers, with modifications due to the fact that the diffraction process occurs via a transmissive rather than a reflective process so that the light source and optical detectors must be on opposite sides of the diffraction foil. The reading device confirms the diffractive properties of the diffraction foil and therefore authenticates the foil and the document—e.g. a travellers cheque—to which the foil is attached.

A simpler visual technique which does not require the use of a reading device could be used to provide security against colour photocopying of valuable documents such as travellers cheques. The visual technique relies on the diffractive properties of the diffraction foil to produce a substantial change in the colour of the region occupied by the diffraction foil during the colour photocopying process. This can be achieved as follows. A colour photocopier directs white light to the document being copied, and detects the levels of three colour components —commonly the red, green and blue components—in the light reflected from each of a number of "pixels" in the document surface to a set of optical sensors. (The "pixels" on the document surface are defined by the imaging resolution of the optical sensors employed in the colour photocopier.) The colour copying process relies on the fact that reflection of each colour component from each pixel in a document occurs in all directions for a diffusely reflecting surface such as paper. However, a diffractive foil can incorporate a diffractive structure which causes each of the three colour components of the incident light to be reflected in one or more different and well defined directions. The diffraction directions are given by equation 1 above for a simple straight line diffraction grating, from which it follows that different wavelength components will be diffracted in different directions from such a grating. Hence it is possible to design the diffraction foil such that the optical sensors in a colour photocopier will detect only some of the reflected colour components and will therefore copy the document with a substantial colour change to the regions occupied by the diffraction foil. FIG. 41 illustrates schematically the general principle underlying this technique. The document 410 incorporates a diffraction foil 411 which is illuminated by an incident white light beam 412 produced by a light source 413. The red 414, green 415 and blue 416 components of the reflected light are diffracted in the directions shown in FIG. 41, such that only the red component 414 falls on the optical sensors 417. The optical sensors 417 detect separately the levels of light of different predetermined colour components—commonly but not necessarily red, green and blue—reflected from a number of small regions, or pixels, on the surface of the document 410, which pixels are governed by the imaging optics in the optical sensors 417. Commonly the optical sensors 417 are arranged in a row perpendicular to the page in FIG. 41. In this example the colour photocopier will interpret the diffraction foil 411 as being red in colour and hence the copied document will be red in colour in the regions occupied by the diffraction foil 411. Under normal lighting conditions an authentic diffraction foil will be silver in colour, possibly also displaying a rainbow effect depending on the incident lighting. Hence the red colour of the copied loll region will be substantially different from the original document. It should be appreciated that the abovedescribed technique, which results in regions occupied by the diffraction foil 411 appearing red in colour after photocopying, is one example only of a general technique, and that a number of variations are possible. Firstly, the colour of the photocopied diffraction foil need not be red—the properties of the diffraction foil 411 could be designed such as to produce a different colour after photocopying. Secondly, the colour of the photocopied diffraction foil need not be uniform—the diffraction foil could be designed with regions of differing diffractive property so as to produce regions of different colour in the photocopied diffraction foil, thereby resulting in a multicoloured effect in the photocopied document in the regions occupied by the diffraction foil 411.

I claim:

1. In combination an optical reading device to read a diffracted light beam and a medium having a diffraction grating to produce a diverging diffracted light beam, said device comprising:

means for engaging said medium so that the grating is located at a predetermined position;

a light source positioned so as to direct in use at said medium a focused reading light beam to produce said diffracted light beam; and an optical sensor to be activated by said diverging diffracted light beam produced by the reading light beam and the grating, said sensor including at least two spaced detectors to provide signals indicative of the divergence of a diffracted beam illuminating the sensor.

2. The combination of claim 1, wherein said detectors consist of a set of separate concentric circular optical detectors.

3. The combination of claim 2, wherein said detectors are colinearly disposed.

* * * * *

UNITED STATES PATENT AND TRADEMARK OFFICE
CERTIFICATE OF CORRECTION

PATENT NO. : 5,461,239
DATED : October 24, 1995
INVENTOR(S) : Peter S. Atherton

It is certified that error appears in the above-indentified patent and that said Letters Patent is hereby corrected as shown below:

<u>ON THE TITLE PAGE</u>:

Change "[22] Filed: Dec. 3, 1993" to --[22] PCT Filed: May 29, 1992--.

After --[22] PCT Filed: May 29, 1992--, insert:

--[86]  PCT No.:       PCT/AU92/00252
        §371 Date:     Dec. 3', 1993
        §102(e) Date:  Dec. 3, 1993

[87]  PCT Pub. No.:  WO 92/22039
        PCT Pub. Date: Dec. 10, 1992--.

Signed and Sealed this

Nineteenth Day of November, 1996

Attest:

BRUCE LEHMAN

*Attesting Officer*  *Commissioner of Patents and Trademarks*